(12) United States Patent
Gordon et al.

(10) Patent No.: US 11,803,295 B2
(45) Date of Patent: Oct. 31, 2023

(54) CONTROL DEVICE AND METHOD TO CONTROL DIFFERENCE BETWEEN TARGET AND PERFORMANCE OUTPUTS USING FEEDBACK LOOP SYSTEM AND GRAPHICAL USER INTERFACE

(71) Applicant: Games Global Operations Limited, Douglas (IM)

(72) Inventors: Daniel B. Gordon, Douglas (IM); Rory Angus Harpur, Durban North (ZA)

(73) Assignee: Games Global Operations Limited, Douglas (IM)

( * ) Notice: Subject to any disclaimer, the term of this patent is extended or adjusted under 35 U.S.C. 154(b) by 37 days.

(21) Appl. No.: 17/491,760

(22) Filed: Oct. 1, 2021

(65) Prior Publication Data
US 2022/0171524 A1   Jun. 2, 2022

(30) Foreign Application Priority Data
Nov. 30, 2020   (GB) ...................................... 2018826

(51) Int. Cl.
*G06F 3/04847*   (2022.01)
*G06F 3/0481*   (2022.01)
(Continued)

(52) U.S. Cl.
CPC ...... *G06F 3/04847* (2013.01); *A63B 24/0087* (2013.01); *B25J 9/1674* (2013.01);
(Continued)

(58) Field of Classification Search
CPC ............... G06F 3/04847; G06F 3/0481; A63B 24/0087; A63B 2024/0068;
(Continued)

(56) References Cited

U.S. PATENT DOCUMENTS 10,699,517 B1 *   6/2020   Berman ............... G07F 17/3213
2006/0160595 A1 *   7/2006   Gerson ............... G07F 17/3265
                                                                463/16

(Continued)

OTHER PUBLICATIONS

United Kingdom Intellectual Property Office; Patents Act 1977: Report under Section 17(5)(b) for Application No. GB2018826.4 dated May 23, 2022.

*Primary Examiner* — Nhat Huy T Nguyen
(74) *Attorney, Agent, or Firm* — McDonnell Boehnen Hulbert & Berghoff LLP

(57) ABSTRACT

Methods and devices for a feedback loop system, associated with delivery of content related to a software application, are disclosed. A method includes determining, for the content, a difference between a target output and a performance output. The performance output is an aggregate of respective unit outputs for unit(s) of the content. The method includes determining an input value required to re-perform at least one of the units. The re-performance can modify the difference. The input value, based on a probabilistic calculation of possible outcomes of the re-performance, is normalized based on a pre-determined baseline input value. The method includes determining, based on the normalized input value, an adjusted unit output associated with the re-performance. The method includes generating, based on the respective unit outputs and the adjusted unit output, and providing for display on a GUI, a graphical display layout comprising a visual representation of the unit(s).

21 Claims, 21 Drawing Sheets

(51) Int. Cl.
  *G07F 17/32* (2006.01)
  *A63B 24/00* (2006.01)
  *B25J 9/16* (2006.01)
  *G07C 5/08* (2006.01)
  *G06N 20/00* (2019.01)
  *G07F 17/34* (2006.01)

(52) U.S. Cl.
  CPC ........... *G06F 3/0481* (2013.01); *G06N 20/00* (2019.01); *G07C 5/0841* (2013.01); *G07F 17/3213* (2013.01); *G07F 17/3227* (2013.01); *A63B 2024/0068* (2013.01); *A63B 2024/0096* (2013.01); *G07F 17/34* (2013.01)

(58) Field of Classification Search
  CPC ........... A63B 2024/0096; B25J 9/1674; G06N 20/00; G07C 5/0841; G07F 17/3213; G07F 17/3227
  See application file for complete search history.

(56) References Cited

U.S. PATENT DOCUMENTS

2006/0252495 A1* 11/2006 Gerson ............... G07F 17/3262
  463/20
2020/0312085 A1* 10/2020 Rottcher ............. G07F 17/3213

* cited by examiner

| Symbol | Multiplier - 3 symbols | Multiplier - 4 Symbols | Multiplier - 5 Symbols |
|---|---|---|---|
| J | 0.5 | 1 | 1.5 |
| Q | 1 | 2 | 3 |
| K | 1.5 | 3 | 4.5 |
| A | 2 | 4 | 6 |

| Symbol | Multiplier - 3 symbols | Multiplier - 4 Symbols | Multiplier - 5 Symbols |
|---|---|---|---|
| J | 0.5 | 1 | 1.5 |
| Q | 1 | 2 | 3 |
| K | 1.5 | 3 | 4.5 |
| A | 2 | 2 | 6 |

CONTROL DEVICE AND METHOD TO CONTROL DIFFERENCE BETWEEN TARGET AND PERFORMANCE OUTPUTS USING FEEDBACK LOOP SYSTEM AND GRAPHICAL USER INTERFACE

REFERENCE TO RELATED APPLICATION

This application claims priority to United Kingdom Patent Application No. 2018826.4, filed Nov. 30, 2020. United Kingdom Patent Application No. 2018826.4 is incorporated herein by reference in its entirety.

FIELD

The present disclosure relates generally to devices, systems and methods for a feedback loop system associated with delivery of content related to a software application. More particularly, the disclosure is directed to devices, systems and methods for controlling the difference between a target output and a performance output though a feedback loop system by way of an interactive graphical user interface.

BACKGROUND

Feedback loop systems are used in a variety of different industrial settings. Generally, a control device for the feedback loop system may control an apparatus that is performing a task. The performance of the task may be associated with a target performance score. The control device receives feedback that may be classified as a positive feedback, a negative feedback, or a neutral feedback. Based on the feedback received, the control device adjusts one or more parameters of the apparatus, so as to achieve a performance score within a threshold of the target performance score.

In many instances, the task may need to be performed one or more times to reach within the threshold of the target performance score. In such instances, the feedback may be based on an output of re-performing the task, or an output of re-performing a component of the task. In turn, a decision to re-perform may depend on several factors. For example, the task may be associated with an initial input value, and the decision to re-perform may be based on an additional input value required to re-perform the task or a component thereof. As another example, the decision to re-perform may be based on an expected output value of the re-performance. In yet another example, the decision to re-perform may be based on a difference between an expected output value of the re-performance, and the target performance score.

Different industries use feedback control systems to train and/or improve performance of an industrial component. For example, autonomous, semi-autonomous, and/or non-autonomous vehicles, such as, for example, automobiles, aircrafts, watercrafts, space crafts, and so on, undergo performance testing. Also, for example, a robotic component may undergo performance testing. A robotic arm may be subjected to several performance tests.

In another example, a software application may control an exercise equipment (e.g., a treadmill, an exercise bicycle, rowing machine, and so forth), and a user may use the exercise equipment to perform an exercise workout. The workout itself may comprise one or more units. For example, a workout on a treadmill may include a total distance, and one or more units of the workout may include shorter time intervals where the treadmill is set at a certain speed and incline. The user performing the workout may have a target performance score (e.g., a threshold heart rate, a threshold number of calories burnt, etc.) and each unit of the workout may contribute to a total performance output. Re-performing some of these units may enable the user to achieve the target performance score. However, re-performing a unit may have an associated input value in terms of time, and an expected performance output.

Another example, where a feedback control system may be useful is in a gaming environment. An online game, for instance, may be associated with an overall target score (e.g., to graduate from one level to next higher level). At each level, there may be several components that a user may play. One or more of these components may be replayed to improve a game score. Wager games may be an example where specific components can be replayed to improve an overall performance score. Replaying a component may be associated with a replay value and an expected change in a performance score.

Gaming devices come in a variety of forms, including for example, a mechanical slot machine. A mechanical slot machine may include one or more reels, each of which includes a fixed pattern of symbols distributed around a circumference of the reel. Each of these reels may be considered to be an element that forms part of an outcome event, or a game. When a gaming device receives a bet input (for example, by placing a coin in the machine), the player is allowed to spin the reels. Each reel then comes to rest, typically with either one of the symbols, or a space in between symbols, in alignment with a pay line. A predefined symbol or a predefined combination of symbols that are aligned with the pay line can result in the gaming device providing a pay output. In one example, the slot machine may include three reels, and the pay line may be a horizontal line disposed across a center of each of the three reels In another example, a mechanical slot machine may present symbols in a matrix arrangement, with each symbol changing during a spin of the reels according to the fixed pattern of symbols on the reels. For example, the slot machine may have five columns and three rows of symbols, for a total of fifteen symbols. Such slot machines often have multiple pay lines, each being defined by a collection of positions within the matrix. For example, the slot machine may have three pay lines, each corresponding to one row of the matrix.

While slot machines were traditionally mechanical, modern slot machines often take the form of a video gaming machine (for example, as a dedicated gaming machine located in a casino) that includes a graphical user interface (GUI), and that may emulate a mechanical slot machine. With a video gaming machine, the GUI may display an image of one or more reels or a matrix as described above, together with animation effects to simulate a spin of the one or more reels, or a spin of the columns or rows of the matrix. A computer software program, which may reside in the video gaming machine, may randomly select one or more symbols in response to a spin instruction, and may display the selected one or more symbols on the display.

A modern slot machine may also be used over a computer network, such as by a user using a client machine that is connected to a server machine over the computer network. In this instance, the server machine may perform the reel spins and may send the resulting symbols to the client machine for display.

Some gaming machines may provide a user with the opportunity to, at a cost, identify and re-play one or more elements of a multi-element random outcome event instead of re-playing all available elements via a new iteration of the game. This may be, for example, a re-spin of one or more of the reels instead of re-spinning all available reels. New positions may then be randomly selected for the reels identified and re-spun by the user, while the unidentified reels remain in their previous positions. This may increase the user's odds of obtaining a prize. As an example, when a user has landed four out of a possible five symbols on a pay line, the user may wish to re-spin only the reel wherein the appropriate symbol does not appear on the pay line. It should, however, be noted that a cost associated with re-spinning such single reel may be significant, given that a user's chance of obtaining a significant pay output due to four of a possible five symbols already appearing on the pay line being significantly higher than normal. It may be undesirable for a user to spend a significant amount on re-spinning individual reels when the cost associated with such a spin is significant.

SUMMARY

In a first implementation, a control device is provided. The control device is for a feedback loop system associated with delivery of content related to a software application. The control device includes a memory device and a processor in communication with the memory device. The memory device stores instruction code that when executed by the processor causes the control device to perform operations. The operations include determining, for the content, a difference between a target output and a performance output. The performance output is an aggregate of respective unit outputs for one or more units of the content. The operations also include determining an input value required to re-perform at least one of the units. The re-performance modifies the difference. The input value is based on a probabilistic calculation of possible outcomes of the re-performance. Additionally, the operations include normalizing the input value based on a pre-determined baseline input value. Furthermore, the operations include determining, based on the input value as normalized, an adjusted unit output associated with the re-performance. Furthermore still, the operations include generating, based on the respective unit outputs and the adjusted unit output, a graphical display layout comprising a visual representation of the one or more units. Finally, the operations include providing for display, on an interactive graphical user interface, the graphical display layout.

In a second implementation, a method is provided. The method is a computer-implemented method for a feedback loop system associated with delivery of content related to a software application. The method includes determining, for the content, a difference between a target output and a performance output. The performance output is an aggregate of respective unit outputs for one or more units of the content. The method also includes determining an input value required to re-perform at least one of the units. The re-performance can modify the difference. The input value is based on a probabilistic calculation of possible outcomes of the re-performance. Additionally, the method includes normalizing the input value based on a pre-determined baseline input value. Furthermore, the method includes determining, based on the normalizing, an adjusted unit output associated with the re-performance. Furthermore still, the method includes generating, based on the respective unit outputs and the adjusted unit output, a graphical display layout comprising a visual representation of the one or more units. Finally, the method includes providing for display, on an interactive graphical user interface, the graphical display layout.

In a third implementation, a computer-readable medium is provided. The computer-readable medium comprises computer-implementable instructions configured to cause a processor of a control device for a feedback loop system associated with delivery of content related to a software application, to perform operations. The operations include determining, for the content, a difference between a target output and a performance output. The performance output is an aggregate of respective unit outputs for one or more units of the content. The operations also include determining an input value required to re-perform at least one of the units. The re-performance can modify the difference. The input value is based on a probabilistic calculation of possible outcomes of the re-performance. Additionally, the operations include normalizing the input value based on a pre-determined baseline input value. Furthermore, the operations include determining, based on the normalizing, an adjusted unit output associated with the re-performance. Furthermore still, the operations include generating, based on the respective unit outputs and the adjusted unit output, a graphical display layout comprising a visual representation of the one or more units. Finally, the operations include providing for display, on an interactive graphical user interface, the graphical display layout.

In a fourth implementation, a control device for a feedback loop system associated with delivery of content related to a software application is provided. The control device includes a memory means and a processing means in communication with the memory means. The memory means stores instruction code executable by the processing means. The control device includes means for determining, for the content, a difference between a target output and a performance output. The performance output is an aggregate of respective unit outputs for one or more units of the content. The control device also includes means for determining an input value required to re-perform at least one of the units. The re-performance modifies the difference. The input value is based on a probabilistic calculation of possible outcomes of the re-performance. Additionally, the control device includes means for normalizing the input value based on a pre-determined baseline input value. Furthermore, the control device includes means for determining, based on the input value as normalized, an adjusted unit output associated with the re-performance. Furthermore still, the control device includes means for generating, based on the respective unit outputs and the adjusted unit output, a graphical display layout comprising a visual representation of the one or more units. Finally, the control device includes means for providing for display, on an interactive graphical user interface, the graphical display layout.

Aspects, advantages, and/or alternatives of the foregoing implementations will become apparent to those of ordinary skill in the art by reading the following detailed description, with reference where appropriate to the accompanying drawings. An intent of providing this summary and other descriptions and figures provided herein is to illustrate implementations by way of example only and, as such, numerous variations are possible. For instance, rearranging, combining, distributing, eliminating, and/or otherwise changing structural elements and process steps is possible while remaining within the scope of the implementations as claimed.

BRIEF DESCRIPTION OF THE FIGURES

FIG. 16 is an example pay table, in accordance with at least some of the example implementations.

FIG. 17 is an example modified pay table, in accordance with at least some of the example implementations.

DETAILED DESCRIPTION

I. Introduction

Figure 1:
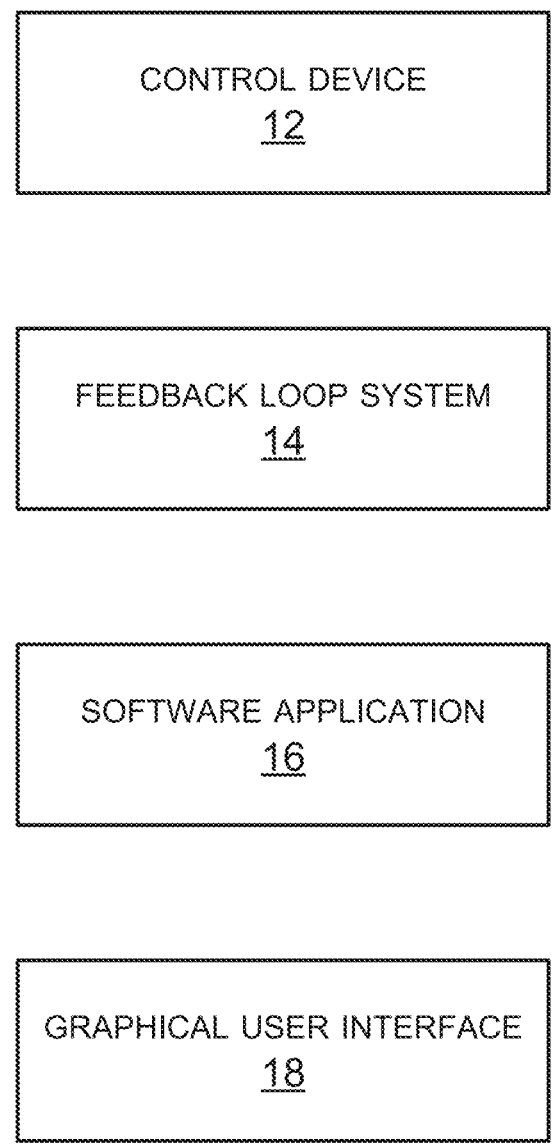
FIG. 1, FIG. 2, FIG. 3, FIG. 4, FIG. 5, FIG. 6, FIG. 7, FIG. 8, and FIG. 9 show block diagrams of an example system, in accordance with at least some of the example implementations.

This description describes several example implementations, at least some of which pertain to improved methods and systems for controlling delivery of content related to a software application. The software application, when executed, can perform operations with respect to any of a variety of devices or machines. As an example, the device can be or include one or more variations from among a mechanical device, an electronic device (e.g., an electrical device), a hydraulic device, a vacuum device, or a pneumatic device. As a particular example, the device can include an exercise machine, such as a treadmill, an elliptical machine, a rowing machine, or a stationary exercise bicycle. As another particular example, the device can include an automobile device, such as an anti-lock brake device that controls hydraulic pressure to distributed brake calipers based on, among other inputs, a wheel speed sensor input corresponding to each wheel and a brake pedal switch input. Other example devices pertaining to the example implementations are described throughout this description.

Additionally or alternatively, at least some of the implementations include aspects of a control device and/or include performing operations related to a control device. Those operations can include determining a difference between a target output and a performance output. The performance output can be an aggregate of respective unit outputs. An input value for re-performing at least one of the individual units can be determined based on a probabilistic calculation of possible outcomes of the re-performance. An output value can be determined based on the input value once normalized using a baseline input value. A visual representation pertaining to one or more of the individual units can be output in a graphical user interface. In accordance with the example devices discussed above, the graphical user interface can present the visual representation for guiding a driver of an automobile including the automobile device or a user of the exercise equipment.

Throughout this description, the articles "a" or "an" are used to introduce elements of the example implementations. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

II. Example Architecture

FIG. 1 is a block diagram of a system implementation 10 that includes a control device 12, a feedback loop system 14, a software application 16, and a graphical user interface 18. A description of details and examples pertaining to the system implementation 10 follows hereafter.

Figure 2:
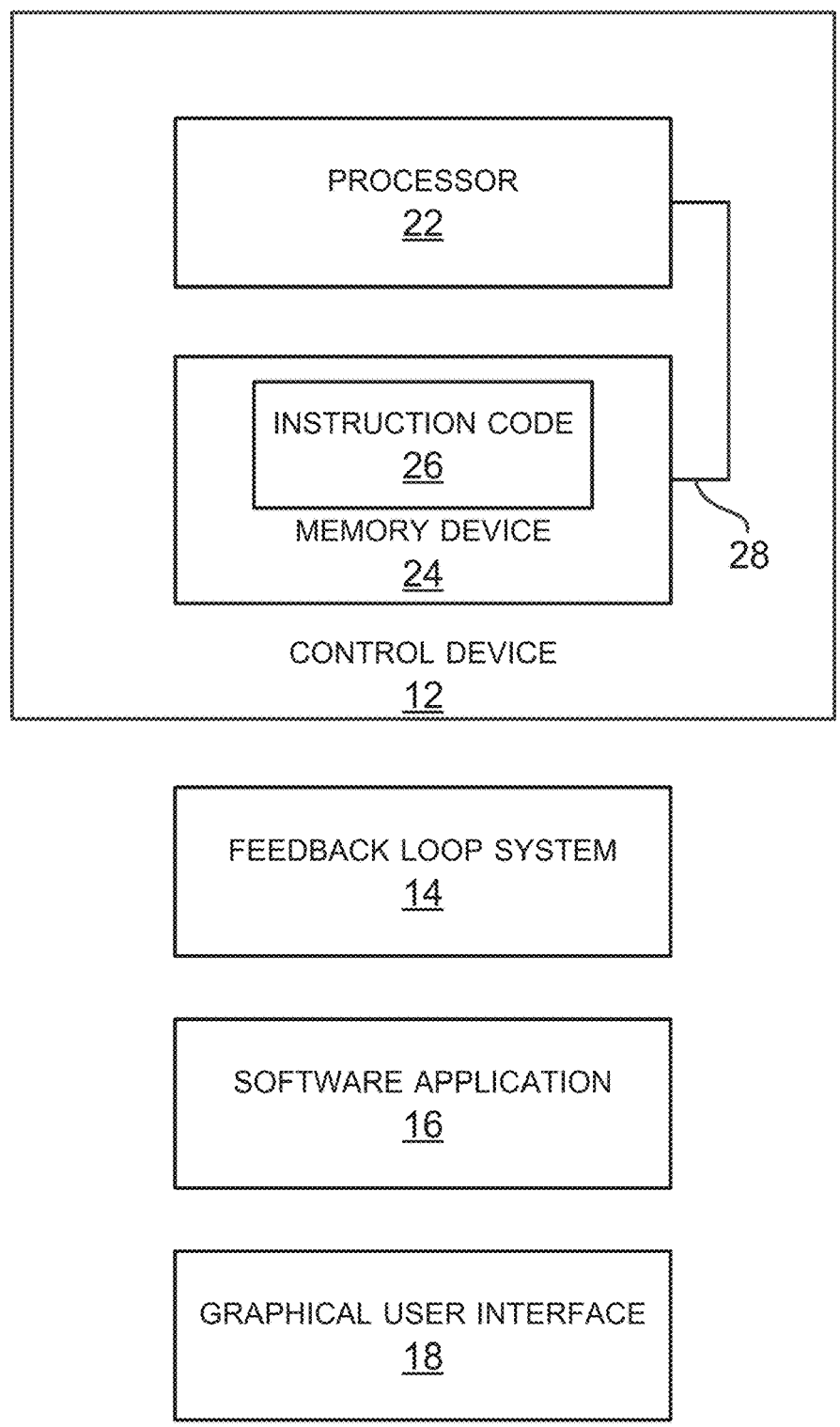

Next, FIG. 2 is a block diagram of a system implementation 20 that is an example implementation of the system implementation 10 shown in FIG. 1. The system implementation 20 includes the control device 12, the feedback loop system 14, the software application 16, and the graphical user interface 18. In accordance with implementations based on the system implementation 20, the control device 12 includes a processor 22 and a memory device 24. The memory device 24 includes instruction code 26.

A communication link 28 operatively couples the processor 22 and the memory device 24 to each other. The operative coupling of the processor 22 and the memory device 24 allows the processor 22 and the memory device 24 to communicate with each other.

In at least some implementations, the graphical user interface 18 is part of the software application 16 and/or the instruction code 26. The graphical user interface 18 provides an interface between a user and the processor 22. In at least some of those implementations, the graphical user interface 18 also includes and/or is displayed on one or more display devices having one or more display screens. In some implementations, the display device includes a touch screen display device. In at least some implementations, the one or more display devices includes a light emitting diode (LED) display, an organic LED (OLED) display, a liquid crystal display (LCD), a plasma display, a cathode ray tube, or some other type of display device.

The processor 22 or any other processor described in this description can include one or more processors. The processor 22 can include one or more general purpose processors and/or one or more special purpose processors (e.g., one or more from among a display driver integrated circuit (DDIC), a digital signal processor (DSP), a tensor processing units (TPU), a graphics processing unit (GPU), or an application specific integrated circuit (ASIC)). The processor 22 is operable to execute program instructions, such as the instruction code 26 or any other instructions described in this description to perform one or more operations described in this description.

The memory device 24 or any other memory device described in this description can include one or more memory devices. Each memory device of the memory device 24 can include a non-transitory computer-readable storage media. The non-transitory computer-readable storage media can include a volatile and/or a non-volatile storage component, such as optical, magnetic, organic or other memory or disc storage, which can be integrated in whole or in part with one or more processors of the processor 22. In some implementations, the memory device 24 is implemented using a single physical device (e.g., one optical, magnetic, organic or other memory or disc storage unit), while in other implementations, the memory device 24 is implemented using two or more physical devices.

The processor 22 can read and/or access computer-readable content stored and/or programmed into the memory device 24. The processor can write content into the memory device 24.

The feedback loop system 14 is associated with delivery of content. In at least some implementations, the feedback loop system 14 is associated with delivery of content related to the software application 16.

The communication link 28 can include a wired communication link and/or a wireless communication link. In at least some implementations, a wired communication link includes one or more electrical or optical circuits, harnesses, and/or data buses. In at least some implementations, a wireless communication performs wireless communication using a radio frequency signals modulated using any of a variety of modulation techniques, frequency ranges, and/or protocol standards.

The instruction code 26 can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language.

The instruction code 26 is executable by the processor 22 to cause the control device 12 and/or some component to the control device 12 to perform operations.

In accordance with at least a first implementation, the operations include a first set of operations. The first set of operations includes determining, for the content, a difference between a target output and a performance output. The performance output is an aggregate of respective unit outputs for one or more units of the content.

The first set of operations also includes determining an input value required to re-perform at least one of the units. The re-performance can modify the difference. The input value is based on a probabilistic calculation of possible outcomes of the re-performance. Additionally, the first set of operations also includes normalizing the input value based on a pre-determined baseline input value.

Furthermore, the first set of operations includes determining, based on the input value as normalized, a potential adjusted unit output associated with the re-performance. Furthermore still, the first set of operations includes generating, based on the respective unit outputs and the adjusted unit output, a graphical display layout comprising a visual representation of the one or more units. Finally, the first set of operations also includes providing for display, on an interactive graphical user interface, the graphical display layout.

In accordance with at least a second implementation, execution of the instruction code 26 by the processor 22 causes the control device 12 and/or some unit(s) of the control device 12 to perform the first set of operations and a second set of operations.

The second set of operations includes receiving, by way of the interactive graphical user interface (e.g., the graphical user interface 18), a re-performance instruction indicating the at least one unit for re-performance. The second set of operations also includes responsive to the receiving of the re-performance instruction, providing the at least one unit for re-performance. Finally, the second set of operations also includes responsive to an outcome of the re-performance, updating the performance output based on the adjusted unit output.

In accordance with at least a third implementation, execution of the instruction code 26 by the processor 22 causes the control device 12 to perform the first set of operations and a third set of operations.

The third set of operations includes determining an input value required for one or more combinations of units. Each combination comprises, for each unit, an option to re-perform the unit or an option not to re-perform the unit. Providing for display the graphical display layout comprises providing for display the input value required for the one or more combinations of units.

In accordance with at least a fourth implementation, execution of the instruction code 26 by the processor 22 causes the control device 12 to perform the first set of operations and a fourth set of operations.

The fourth set of operations includes receiving a user indication to re-perform the at least one unit. The normalizing of the input value comprises normalizing the input value for a combination of the one or more combinations of units. The combination includes an option to re-perform the at least one unit.

In accordance with at least a fifth implementation, execution of the instruction code 26 by the processor 22 causes the control device 12 to perform the first set of operations and a fifth set of operations.

The fifth set of operations includes receiving a user indication not to re-perform a unit different from the at least one unit. The normalizing of the input value comprises normalizing the input value for a combination of the one or more combinations of units. The combination includes an option not to re-perform the unit different from the at least one unit.

In accordance with at least a sixth implementation, execution of the instruction code 26 by the processor 22 causes the control device 12 to perform the first set of operations and a sixth set of operations.

The sixth set of operations includes receiving, by way of the interactive graphical user interface, a sequence of re-performance instructions indicating respective units for re-performance. The sixth set of operations also includes responsive to receiving of each instruction of the sequence of re-performance instructions, repeatedly providing the respective units for re-performance. Finally, the sixth set of operations includes responsive to an outcome of a repeated re-performance of the at least one unit, updating the performance output based on potential adjusted unit outputs for each re-performance.

In accordance with at least a seventh implementation, execution of the instruction code 26 by the processor 22 causes the control device 12 to perform the first set of operations and a seventh set of operations.

The seventh set of operations includes receiving a user preference for the pre-determined baseline input value. The seventh set of operations also includes setting the pre-determined baseline input value based on the user preference.

In accordance with at least an eighth implementation, execution of the instruction code 26 by the processor 22 causes the control device 12 to perform the first set of operations and an eighth set of operations.

The eighth set of operations includes training a machine learning model to determine, based on a history of user behavior data, a likelihood that a user will select an option to re-perform the at least one unit. The normalizing of the input value comprises applying the trained machine learning model to predict the input value as normalized. Providing for display the graphical display layout comprises providing for display the predicted input value as normalized.

In accordance with at least a ninth implementation, execution of the instruction code 26 by the processor 22 causes the control device 12 to perform the first set of operations and a ninth set of operations.

The ninth set of operations includes training a machine learning model to determine, based on a history of user behavior data, a likelihood that a user will select a combination of the one or more units. The combination comprises, for each unit, an option to re-perform or an option not to re-perform the unit. The ninth set of operations also includes applying the trained machine learning model to predict that the combination has a likelihood of selection that is above a predetermined threshold. Providing for display the graphical display layout comprises recommending the predicted combination.

In accordance with at least a tenth implementation, execution of the instruction code 26 by the processor 22 causes the control device 12 to perform the first set of operations and a tenth set of operations.

The tenth set of operations includes training a machine learning model to determine, based on a history of user behavior data, the target output for a user. The tenth set of operations also includes applying the trained machine learning model to predict the target output. Finally, the tenth set of operations includes responsive to an outcome of a re-performance, updating the performance output based on the adjusted unit output. Providing for display the graphical display layout comprises providing a difference between the predicted target output and the updated performance output.

In accordance with any or all of the eighth to tenth implementations, wherein the user behavior data is associated with a plurality of users.

In accordance with any or all of the first to tenth implementations, the software application controls performance testing of a mechanical device, the one or more components comprise one or more modules of the performance testing, and the performance output is a measurable output for the performance testing. In accordance with at least some of those implementations, the performance testing of the mechanical device comprises a performance testing of a vehicle on a track. Alternatively, the performance testing of the mechanical device comprises a performance testing of a mechanical robot performing a task.

In accordance with any or all of the first to tenth implementations, the content alternatively comprises gaming content, the one or more units comprise one or more plays of the gaming content, and the performance output is an output for the gaming content. As an example, the content can include one or more from among online gaming content, reel-based slot play content, bingo content or scratch card content.

In accordance with any or all of the first to tenth implementations, the software application alternatively controls an exercise equipment, the one or more units comprise one or more modules of an exercise workout performed with the exercise equipment, and the target output is a measurable fitness goal for the exercise workout. As an example, the content can include one or more from among healthcare related content, fitness regimen content, diet regimen content, or medication dosage content.

In accordance with any or all of the first to tenth implementations, the input value is maintained below one or more of a credit value, a monetary value, a factor related to the content, a percentage of an account value, and a percentage of a spending limit.

In accordance with any or all of the first to tenth implementations, the determining of the input value comprises: multiplying an initial input value by a probability of a desirable outcome of the re-performance, and dividing an output of the multiplying by the target output. In accordance with at least some of those implementations, the normalizing of the input value comprises multiplying the input value by a numerical factor that is greater than 0 and less than 1. In some cases, this numerical factor could be greater than 1. Alternatively, the normalizing of the input value comprises dividing the pre-determined baseline input value by the determined input value.

In accordance with any or all of the first to tenth implementations, the graphical display layout comprises a virtual environment simulating performance of the one or more units.

In accordance with any or all of the first to tenth implementations, the content comprises gaming content. Additionally, the control device is a multimedia gaming server streaming the gaming content.

Figure 3:
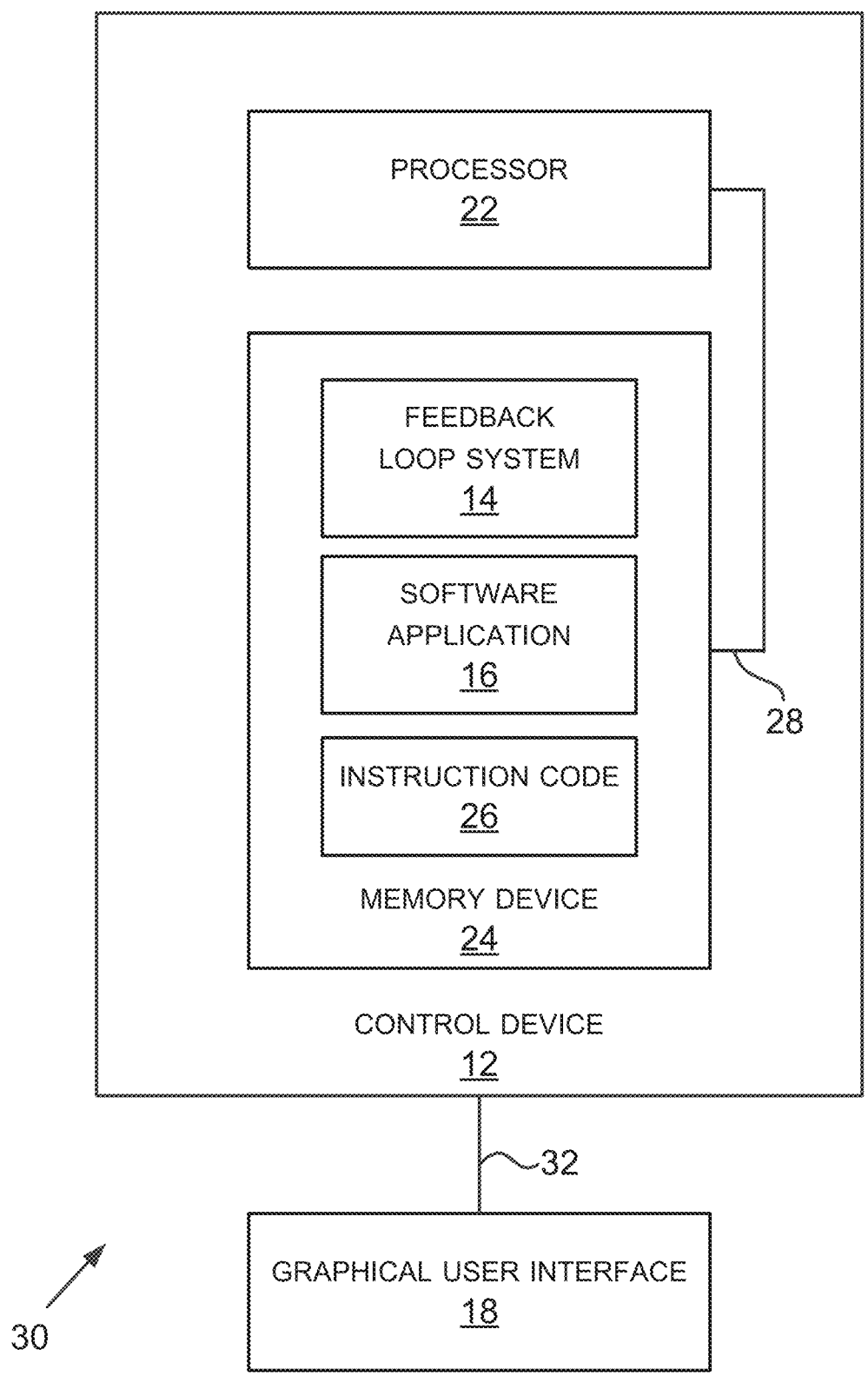

Next, FIG. 3 is a block diagram of a system implementation 30 that is another example implementation of the system implementation 10 shown in FIG. 1, as well as an example implementation of the system implementation 20 shown in FIG. 2. In the system implementation 30, the control device 12 includes the processor 22, the memory device 24, and the communication link 28. The memory device 24 includes the feedback loop system 14, the software application 16, and the instruction code 26. A communication link 32 operatively couples the control device 12 and the graphical user interface 18 to each other. As an example, the communication link 32 can include a high-definition multimedia interface (HDMI) cable, a local area network, or the internet.

Figure 4:
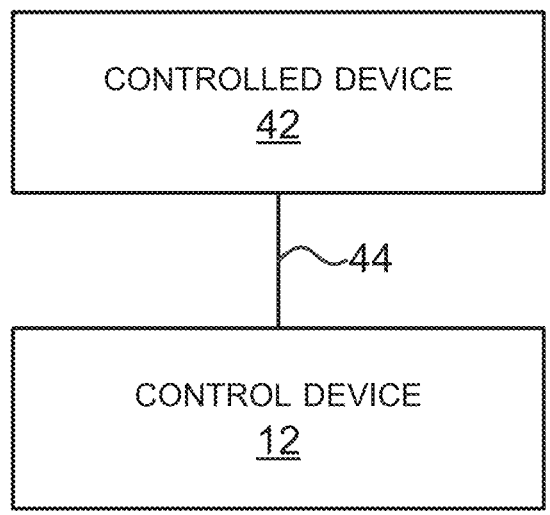

Next, FIG. 4 is a block diagram of a system implementation 40 that is an example implementation of the system implementation 10, 20, 30 without showing various components shown in FIG. 1 to FIG. 3, such as the feedback loop system 14, the software application 16, or the graphical user interface 18. The system implementation 40 includes the control device 12, a controlled device 42, and a communication link 44 that operatively couples the control device 12 and the controlled device 42 to each other. The communication link 44 can include a wired communication link and/or a wireless communication link. As an example, the communication link 44 can include an HDMI cable, a local area network, or the internet.

In at least some implementations, the controlled device 42 includes one or more from among a mechanical device, an electronic device, a pneumatic device, a hydraulic device, or a vacuum device. As an example, the controlled device 42 can include a vehicle, a mechanical robot, a robotic component such as a robotic arm, an exercise equipment, or a gaming machine, such as a mechanical slot machine.

As an example, the controlled device 42 can include a four-channel hydraulic control unit for an anti-lock brake system on an automobile. The control device 12 can be arranged as an anti-lock brake system (ABS) electronic control unit (ECU). The four-channel hydraulic control unit can include a pump and four valves (e.g., one valve for each of four brake calipers on the automobile. The ABS ECU can include a software application operable to assist the automobile to slow down without the wheels of the automobile locking up. The ABS can vary an amount of brake fluid in a brake line leading to a brake caliper (and hence a pressure in the brake line) so as to find an optimal braking rate without allowing the wheels to lock up.

A performance output for the ABS can be the current vehicle speed and a target performance can be a vehicle speed less than the current speed. The target performance can, for example, be based on a distance a brake pedal has been depressed. The content to be delivered by the ABS can include brake fluid. The units of content can be brake fluid within respective brake lines leading to each brake caliper. A re-performance of at least one of the units can include increasing an amount of brake fluid in the a brake line leading to a brake caliper if the corresponding wheel is not locking up or decreasing an amount of brake fluid in the brake line if the wheel is locked up. The input value can be a pressure value within the brake line leading to a brake caliper. The output value can be a control signal to a valve in the hydraulic control unit. The graphical display layout can include a light indicative of the ABS being engaged.

Figure 5:
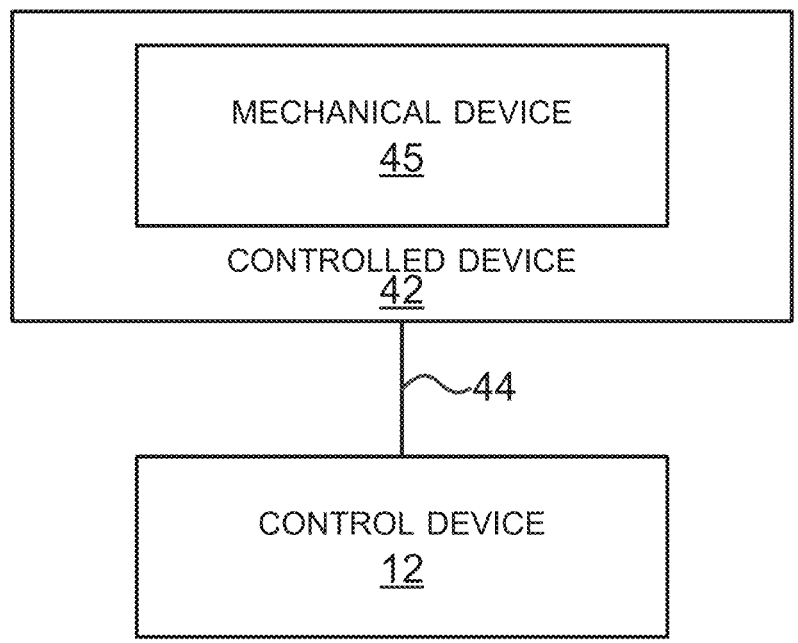

Next, FIG. 5 is a block diagram of a system implementation 50 that is an example implementation of the system implementation 40 shown in FIG. 4. As shown in FIG. 5, the controlled device 42 includes a mechanical device 45. As an example, the mechanical device 45 can include a mechanical vehicle component, a mechanical robot, a robotic component such as a mechanical robotic arm, a treadmill lift arm, an elliptical exercise equipment lift arm, or a mechanical slot machine.

Figure 6:
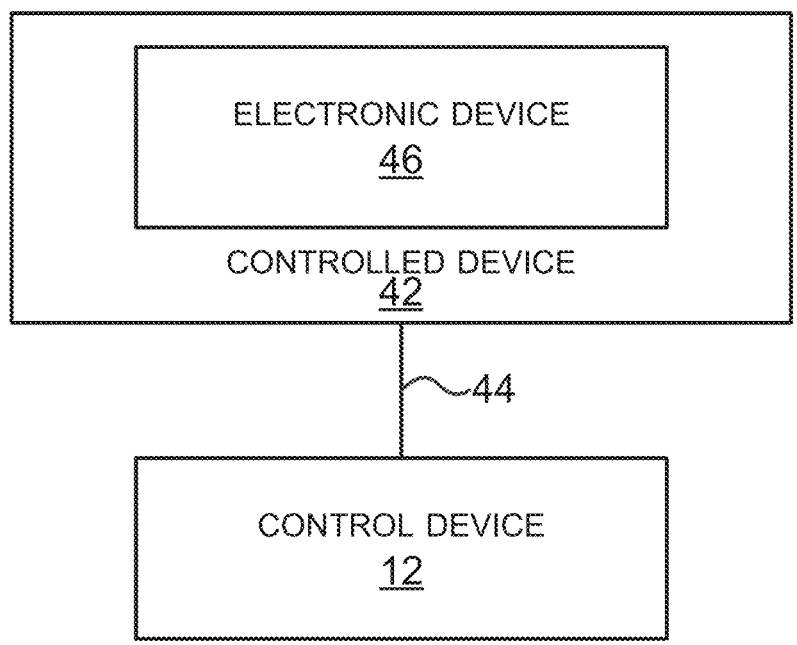

Next, FIG. 6 is a block diagram of a system implementation 60 that is another example implementation of the system implementation 40 shown in FIG. 4. As shown in FIG. 6, the controlled device 42 includes an electronic device 46. As an example, the electronic device 46 can include an electronic vehicle component (e.g., a pump or motor) or an electronic gaming machine, such as an electronic slot machine.

Figure 7:
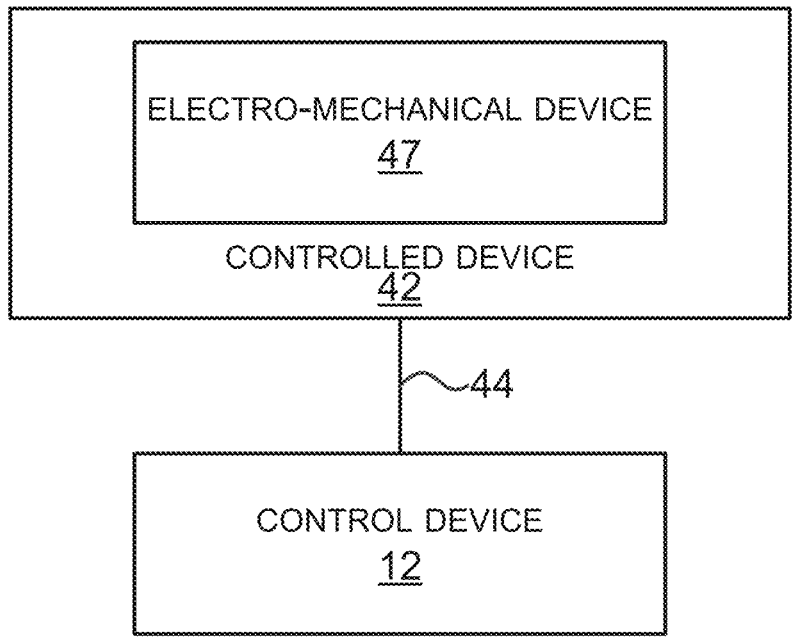

Next, FIG. 7 is a block diagram of a system implementation 70 that is another example implementation of the system implementation 40 shown in FIG. 4. As shown in FIG. 7, the controlled device 42 includes an electro-mechanical device 47. As an example, the electro-mechanical device 47 can include an electro-mechanical vehicle component (e.g., a pump or motor), an electro-mechanical robot, an electro-mechanical component such as an electro-mechanical robotic arm, or an electro-mechanical gaming machine, such as an electro-mechanical slot machine.

Figure 8:
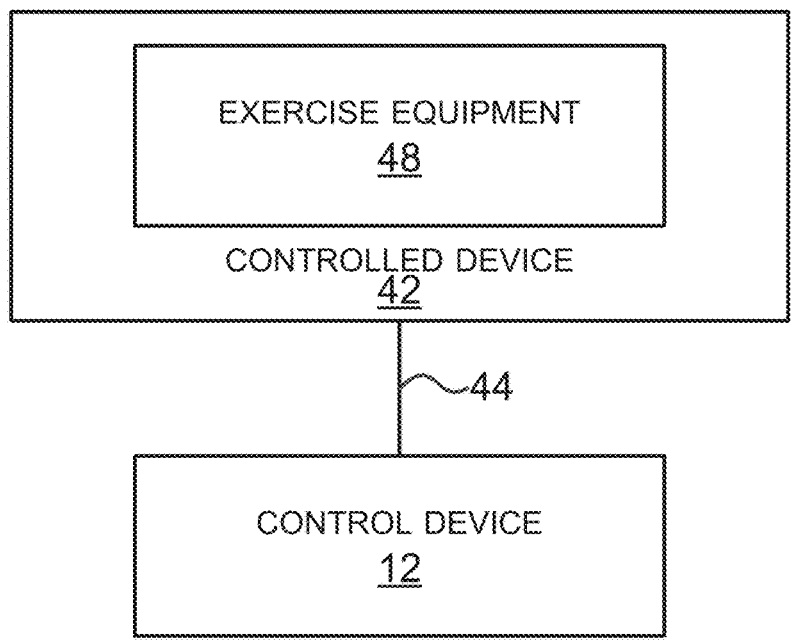

Next, FIG. 8 is a block diagram of a system implementation 80 that is another example implementation of the system implementation 40 shown in FIG. 4. As shown in FIG. 8, the controlled device 42 includes an exercise equipment 48. As an example, the exercise equipment 48 can include a treadmill, an elliptical machine, a rowing machine, or a stationary exercise bicycle.

In accordance with an implementation in which the exercise equipment 48 is a treadmill, the control device 12 can include a software application for controlling aspects that affect a target and performance output. Those aspects on the treadmill can, for example, include a motor that controls a speed and direction of a treadmill belt on which a user walks, jogs or runs. Those aspects on the treadmill can also include a linear actuator that controls an incline level of a treadmill deck relative to a default level of the treadmill, which may or may not be horizontal. The target output can, for example, be a threshold number of calories burnt, and the performance output can, for example, be a cumulative number of calories burnt since a start of a workout session on the treadmill. The units of content can be a quantity of calories burnt for a unit of time (e.g., calories per minute).

Assuming the target output is 900 calories for a 60 minute treadmill workout, the units of content for the first five sessions can be five, five, ten, ten, and fifteen calories per minutes. After five minutes, the performance output is forty-five calories. The difference between target and performance outputs is thus 855 calories. In some implementations, the input value can be a speed of the motor and can be normalized based on the currently-selected incline level of the treadmill deck. In other implementations, the input value can be the incline level of the treadmill deck and can be normalized based on a currently-selected speed of the motor. An adjusted unit output for a current workout session can be calculate and output on a graphical user interface. The adjust unit output can represent a quantity of calories to be burnt during the current workout session to keep the user on track for meeting the target output.

Figure 9:
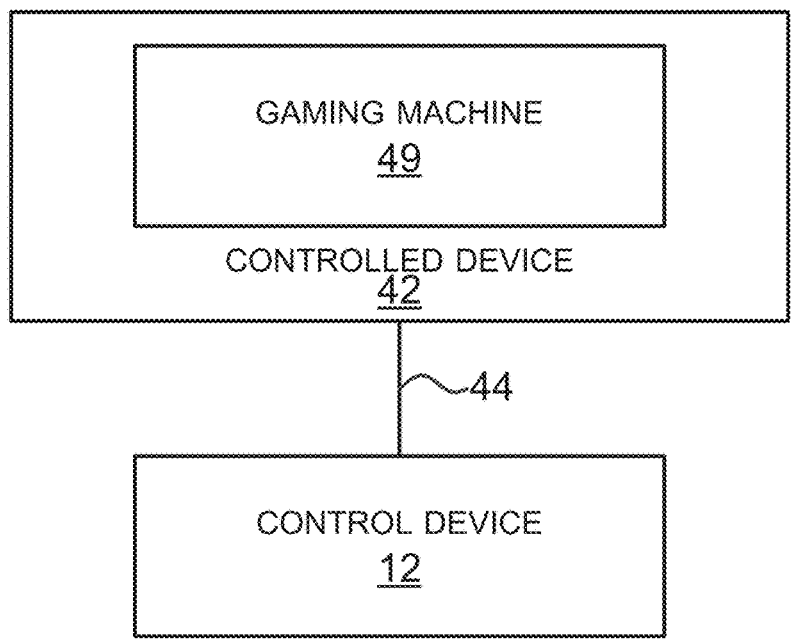

Next, FIG. 9 is a block diagram of a system implementation 90 that is another example implementation of the system implementation 40 shown in FIG. 4. As shown in FIG. 9, the controlled device 42 includes a gaming machine 49. As an example, the gaming machine 49 includes a slot machine, such as a multi-reel slot machine operable to perform a reel-based slot game.

In accordance with an implementation in which the gaming machine 49 is operable to perform a reel-based slot game, the target output is based on a return-to-player (RTP) value (described below), the units are spins of one or more reels, the unit outputs are pay outputs provided by the gaming machine 49, the performance output is an aggregate of the pay outputs, the input value is an initial cost to re-spin the one or more reels, the probabilistic calculation of possible outcomes is a likelihood of achieving potential pay outputs, and the adjusted unit output is an adjusted pay output. In at least some instances, a pay output is zero and in other instances a pay output is a value greater than zero. In at least some implementations, the baseline input value is a factor between 0 and 1.

III. Example Methods

Figure 10:
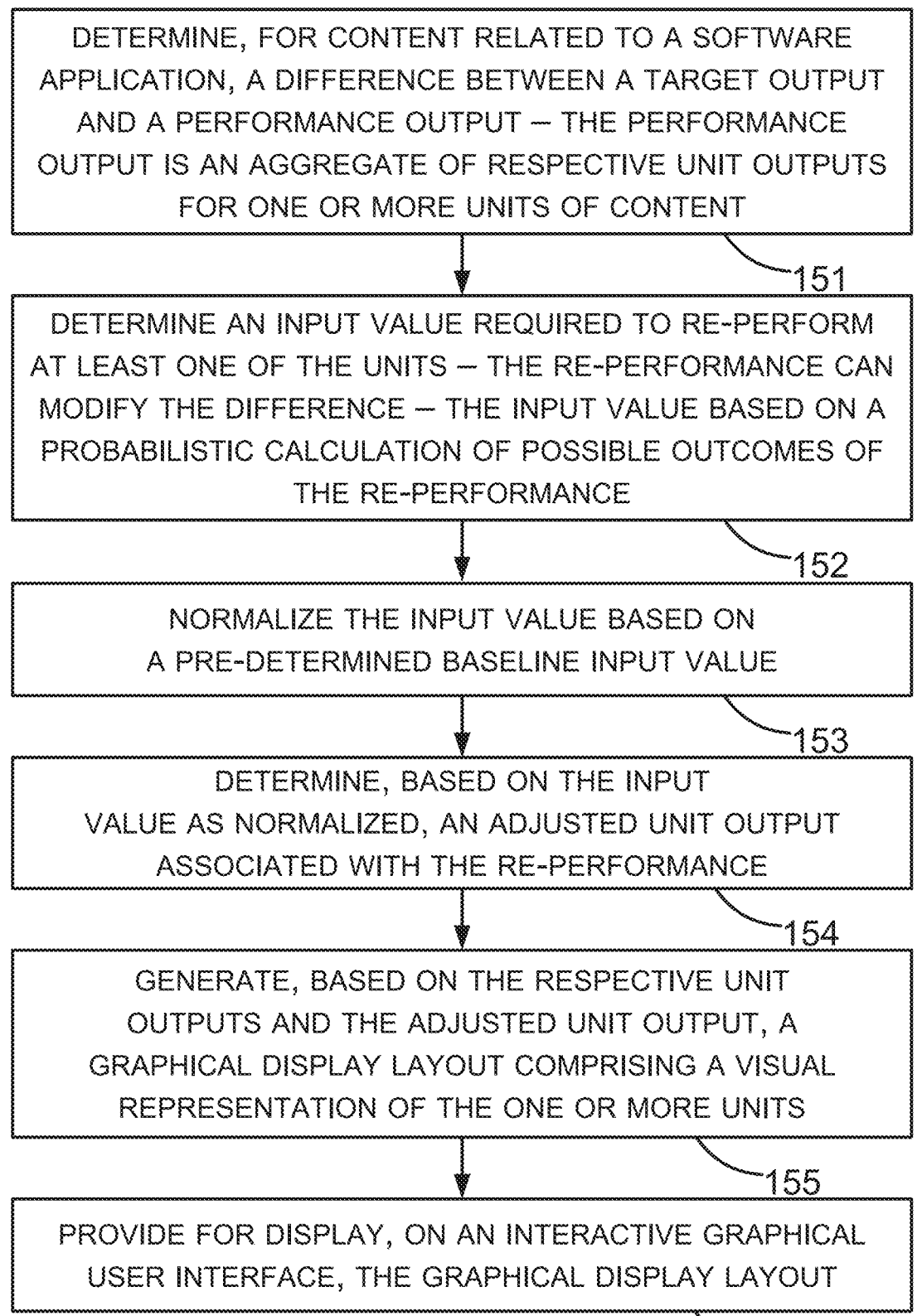
FIG. 10 is a flowchart showing an example method, in accordance with at least some of the example implementations.

Next, FIG. 10 depicts a flowchart showing operations of a method 150. The method 150 and/or the operations of the method 150 can be performed by a control device, such as a control device described in this description, or by one or more components of such a control device. In at least some implementations, the control device that performs the method 150 and/or that includes components to perform the operations of the method 150 can include a control device for a feedback loop system associated with delivery of content related to a software application.

Block 151 includes determining, for the content, a difference between a target output and a performance output. The performance output is an aggregate of respective unit outputs for one or more units of the content.

Next, block 152 includes determining an input value required to re-perform at least one of the units. The re-performance modifies the difference. The input value is based on a probabilistic calculation of possible outcomes of the re-performance.

Next, block 153 includes normalizing the input value based on a pre-determined baseline input value.

Next, block 154 includes determining, based on the input value as normalized, an adjusted unit output associated with the re-performance.

Next, block 155 includes generating, based on the respective unit outputs and the adjusted unit output, a graphical display layout comprising a visual representation of the one or more units.

Next, block 156 includes providing for display, on an interactive graphical user interface, the graphical display layout.

In at least some implementations, the operations of the method 150 correspond to the first set of operations described above with respect to processor 22 and the instruction code 26. In other words, in at least some implementations, the method 150 can be performed by the processor 22 executing the instruction code 26 to perform the first set of operations.

In at least some implementations, a further method including the operations of the method 150 may also include receiving, by way of the interactive graphical user interface, a re-performance instruction indicating the at least one component for re-performance. This further method may also include, responsive to the receiving of the re-performance instruction, providing the at least one component for re-performance. This further method may also include, responsive to an outcome of the re-performance, updating the performance output based on the adjusted component output.

In at least some implementations, a further method including the operations of the method 150 may also include receiving, by way of the interactive graphical user interface, a re-performance instruction indicating the at least one unit for re-performance. This further method may also include, responsive to the receiving of the re-performance instruction, providing the at least one unit for re-performance. This further method may additionally include, responsive to an outcome of the re-performance, updating the performance output based on the adjusted unit output.

In at least some implementations in the form of a method including the operations of the method 150, the software application controls performance testing of a mechanical device, the one or more units comprise one or more modules of the performance testing, and the performance output is a measurable output for the performance testing. Additionally, the performance testing of the mechanical device can include a performance testing of a vehicle on a track or a performance testing of a mechanical robot performing a task.

In at least some implementations in the form of a method including the operations of the method 150, the content includes gaming content, the one or more units comprise one or more plays of the gaming content, and the performance output is an output for the gaming content.

In at least some implementations in the form of a method including the operations of the method 150, the software application controls an exercise equipment, the one or more units comprise one or more modules of an exercise workout performed with the exercise equipment, and the target output is a measurable fitness goal for the exercise workout.

In at least some implementations, a further method including the operations of the method 150 may also include determining an input value required for one or more combinations of units. Each combination comprises, for each unit, an option to re-perform the unit or an option not to re-perform the unit. Providing for display the graphical display layout comprises providing for display the input value required for the one or more combinations of units.

In at least some implementations, a further method including the operations of the method 150 may also include receiving a user indication to re-perform the at least one unit. Normalizing the input value can include normalizing the input value for a combination of the one or more combinations of units. The combination includes an option to re-perform the at least one unit.

In at least some implementations, a further method including the operations of the method 150 may also include receiving a user indication not to re-perform a unit different from the at least one unit. Normalizing the input value can include normalizing the input value for a combination of the one or more combinations of units. The combination includes an option not to re-perform the unit different from the at least one unit.

In at least some implementations, a further method including the operations of the method 150 may also include receiving, by way of the interactive graphical user interface, a sequence of re-performance instructions indicating respective units for re-performance. This further method may also include, responsive to receiving of each instruction of the sequence of re-performance instructions, repeatedly providing the respective units for re-performance. This further method may additionally include, responsive to an outcome of a repeated re-performance of the at least one unit, updating the performance output based on potential adjusted unit outputs for each re-performance.

In at least some implementations, a further method including the operations of the method 150 may also include receiving a user preference for the pre-determined baseline input value, and setting the pre-determined baseline input value based on the user preference.

In at least some implementations in the form of a method including the operations of the method 150, the input value is maintained below one or more of a credit value, a monetary value, a factor related to the content, a percentage of an account value, and a percentage of a spending limit.

In at least some implementations, a further method including the operations of the method 150 may also include multiplying an initial input value by a probability of a desirable outcome of the re-performance, and dividing an output of the multiplying by the target output. Additionally, normalizing the input value can include multiplying the input value by a numerical factor that is greater than 0 and less than 1. In some cases, this numerical factor could be greater than 1. Alternatively, normalizing the input value can include dividing the pre-determined baseline input value by the determined input value.

In at least some implementations, a further method including the operations of the method 150 may also include training a machine learning model to determine, based on a history of user behavior data, a likelihood that a user will select an option to re-perform the at least one unit. Normalizing the input value can include applying the trained machine learning model to predict the input value as normalized. Moreover, providing for display the graphical display layout comprises providing for display the predicted input value as normalized.

In at least some implementations, a further method including the operations of the method 150 may also include training a machine learning model to determine, based on a history of user behavior data, a likelihood that a user will select a combination of the one or more units, wherein the combination comprises, for each unit, an option to re-perform or an option not to re-perform the unit. This further method may also include applying the trained machine learning model to predict that the combination has a likelihood of selection that is above a predetermined threshold. Providing for display the graphical display layout comprises recommending the predicted combination.

In at least some implementations, a further method including the operations of the method 150 may also include training a machine learning model to determine, based on a history of user behavior data, the target output for a user. This further method may also include applying the trained machine learning model to predict the target output. This further method may include, responsive to an outcome of a re-performance, updating the performance output based on the adjusted unit output. Moreover, providing for display the graphical display layout comprises providing a difference between the predicted target output and the updated performance output.

In at least some implementations in the form of a method including the operations of the method 150, the user behavior data is associated with a plurality of users.

In at least some implementations in the form of a method including the operations of the method 150, the graphical display layout may include a virtual environment simulating performance of the one or more components.

In at least some implementations in the form of a method including the operations of the method 150, the content may include gaming content. The control device 12 may be a multimedia gaming server streaming the gaming content.

In at least some implementations in the form of a method including the operations of the method 150, the software application pertains to a reel-based slot game. In at least some of those implementations, the target output is based on an RTP value, the units are spins of one or more reels, the unit outputs are pay outputs provided by the gaming machine 49, the performance output is an aggregate (e.g., sum or weighted average) of the pay outputs, the input value is an initial cost to re-spin the one or more reels, the probabilistic calculation of possible outcomes is a likelihood of achieving potential pay outputs, and the adjusted unit output is an adjusted pay output. In at least some instances, a pay output is zero and in other instances a pay output is a value greater than zero. In at least some implementations discussed in this paragraph, the baseline input value is a factor greater than 0 and less than 1. In at least some implementations discussed in this paragraph, the baseline input value is a factor greater than or equal to 1.

In at least some of the implementations discussed in the preceding paragraph, the reels are arranged like any reels described in this description. For example, the reels can include a quantity of symbols that remains fixed for all units or that increases or decreases between the units. In at least some of the implementations discussed in the preceding paragraph, the graphical display layout includes a three by five matrix of symbols in which the graphical display layout includes three rows and five columns of symbols. In at least some of the implementations discussed in the preceding paragraph, the reel-based slot game includes one or more pay lines the processor uses to determine the unit outputs. In at least some of the implementations discussed in the preceding paragraph, the reel-based slot game includes no paylines and the processor determines the pay outputs based on certain symbols landing on adjacent reels. In at least some of the implementations discussed in the preceding paragraph, the processor determines pay outputs when a specified quantity of scatter symbols land in any position in the displayed symbol matrix and on any one or more reels (e.g., any row on any one or more reels).

IV. Example Implementations Regarding Gaming Machines

A. Introduction Regarding Gaming Machine Implementations

At least some of the example implementations pertain to gaming machines. This description describes, among other things, example embodiments including, but not limited to, implementations pertaining to performing aspects of an outcome event using a machine with an interactive user interface configured to provide rapid response times. The machine can display a variety of symbols representing elements of a multi-element outcome event. Any one or more of the elements may be individually selected for re-playing or holding upon user instruction and at a cost. The cost may be a standard, normalized re-play cost, which may be initially calculated based on an expected outcome resulting from an overall outcome resulting from the re-playing any of the one or more elements. The calculated cost may then be normalized so that a user's expectations of cost of each re-play may be met. As a result of re-playing some of the multiple elements, a user may receive a relative advantage. This relative advantage may be used to calculate an initial re-play cost, and the relationship between the initial re-play cost and the normalized re-spin cost may be used to adjust a potential regard for a particular potential re-play outcome.

By way of example, a user interface may allow a user to re-play only one, or any combination of multiple elements, for example multiple reels of a reel-type slot game provided on a gaming machine when the reels are in any position. At the same time, it will be apparent that elements (units or reels) that are not re-played (re-spun, in this instance) are held in their current position. Accordingly, embodiments may be provided wherein a user selects which element (reels) are to be re-played (re-spun), and embodiments wherein a user may select which elements (reels) are to remain in a current position (i.e., that are held in position).

Regardless of the selection made, an element must either be re-played, or remain in position.

Some implementations may specify the cost of all elements to be adjusted by normalizing, while some implementations may only specify normalizing to reduce the cost of any re-played element. In some implementations, a user may be allowed to adjust aspects of normalizing, for example the extent and/or value of normalizing to be applied. Where a potential pay output (for example a pay table or an achievable aspect of the pay table) associated with the game is adjusted according to the factor used to normalize the cost of the re-spin, the graphical user interface 18 may be operable to display the adjustments made to the pay table in a timely fashion so that the user experience is not negatively affected by being provided with delayed information, for example so that a user only achieves a lower value pay output without the adjusted pay table having been displayed on the graphical user interface.

Other, non-limiting examples of multi-element games in which only some of the elements may be re-played may include bingo, scratch card games, and the like.

In an example implementations, a reel-type slot game may be provided to a user by a gaming machine. Upon receipt of a spin instruction received from the user, all reels of the machine may be spun to provide an initial result when the reels come to rest. The spin instruction may be performed at a bet input specified by the user or by the gaming machine. The number of reels may be denoted as N. N may be more than 1. The initial result may be a result that results in a pay output or not, and a pay output may be made to the user as applicable in the event of a pay output. A user may improve their chances of a further pay output by holding some reels in their current, initial condition, and may alter the position of one or more other reels in order to obtain a more favorable overall reel position, generally a reel position that translates into a pay output or that activates a bonus feature or game. The goal may be a bigger pay output than a pay output that was achieved with the current, initial reel position. Alternatively, the user may reach a specific pay output which may be to trigger a bonus round or feature game and which requires a specific set of reel positions.

The gaming machine may determine initial re-spin costs corresponding to different re-spin combinations of reels. In some examples, an initial re-spin cost may be determined for each possible subset of the N reels. In particular, the machine may calculate the initial costs of re-spinning each individual reel and also any combination of up to N−1 reels. It will be apparent that for a specific reel combination that is re-spun, the remaining reels will be held in their current condition. The calculation of initial re-spin costs may therefore either be expressed by indicating the reels that are re-spun, or the reels that are held. The resultant costs will be the same, irrespective of the way in which the selection is described. These costs may be based at least on the expected overall reel position after such re-spin or hold and will be further explained below. The calculation may be for re-spinning a combination of up to N−1 reels (and, as explained above, for holding a combination of up to N−1 reels), as re-spinning all N reels, and therefore holding no reels, may be at a bet level which the user may set as for an initial spin.

References in this specification to "spinning only some reels", "re-spinning some reels", or similar phrases implies that the remaining reels are held in their current condition and do not spin.

The gaming machine may be further configured to normalize at least some of the costs associated with re-spinning any one or more reels. Some embodiments may involve normalizing the costs for all reels or all combination of reels. This may result in all re-spins having a cost of, for example, 10 credits. This may be the same cost as a user's original bet input placed on the initial game. In other embodiments, only re-spins that would result in a higher cost than the user's original bet, or a higher cost than some pre-determined or pre-set cost, may be normalized. This may ensure that a user does not spend an amount significantly more than what they have spent on their original bet input on re-spinning a single, or a combination of several, reels. As a result, a user may budget and may be in a position to better manage their expected expenditure by setting up appropriate limits to their bets for each possible re-play event.

In order to balance the reduced cost of a re-playing an element of the game, the potential pay output achievable with a pay output with a normalized re-play cost may be adjusted. If, for example, a user is able to achieve a pay output of 1,000 credits by re-playing a specific element, the cost for re-playing that specific element may initially be calculated to be 50 credits. The initial bet input may, however, have been 10 credits. It may be undesirable for the user to spend five times more on re-playing a single element, and the user or a provider of the game may have set up limits to the game accordingly. Now, the 50-credit cost may be normalized by reducing it by a factor of five to only 10 credits. To ensure that the user does not achieve a pay output that is out of line with the cost of the re-spin, the potential pay output of 1,000 credits may be similarly reduced by the factor of five, and may be set to 200 credits.

The gaming machine 49, 102 may display on the graphical user interface 18 the cost to select and add one or more of the elements of the gaming machine 49, 102 to a selected combination for re-playing or holding, depending on the implementation of selection. If, for example, the gaming machine 49, 102 includes five elements, for example five reels that may be re-spun, a separate cost may be shown to select and add each of the five elements for re-playing or for holding.

If an element is selected for re-playing, the cost to select and add one or more of the remaining elements to a selected combination for re-playing may then be displayed on the graphical user interface 18. This cost may be higher, lower, or the same as the cost to re-play the currently selected element or elements, but may have already been calculated by the gaming machine 49, 102 and any appropriate normalizing costs may have been included in such calculations. Such cost may replace a cost at which a previous element was selected and added, or may be added thereto. Where applicable, pay table adjustments may also be displayed on the graphical user interface 18.

If the gaming machine 49, 102 receives a selection to hold any of the elements, the cost to select and add one or more of the remaining elements to a selected combination for holding may then be then displayed on the graphical user interface 18. This cost may be higher, lower, or the same as the cost to hold the currently selected element or elements, but would have already been calculated by the gaming machine 49, 102 and while taking into account any normalizing to be applied. Such cost may replace a cost at which a previous element was selected and added, or may be added thereto. Again, a change in a pay table and/or a change in a potential pay output may also be displayed on the graphical user interface 18.

If a user instruction to re-play a selected element or elements is received by the gaming machine 49, 102, the selected element or elements are re-played until a newly calculated value or symbol therefore is displayed on the graphical user interface 18. This may, for example, include a spinning reel that comes to rest. The re-play may occur at the cost previously calculated by the gaming machine 49, 102 and shown on the graphical user interface 18, which may be a normalized cost. The cost displayed on the graphical user interface 18 at a time of selecting and adding the element or elements for re-playing is charged for the re-play thereof.

After re-playing the selected elements, the gaming machine 49, 102 may again calculate re-play costs for re-play combinations of elements (e.g., the cost to re-play any of the elements or any combination of up to N−1 elements), and a method in accordance with the example implementations may repeat in the same manner as described above.

Advantageously, the systems and methods disclosed herein can allow a display of a gaming machine 49, 102 to provide an interactive user interface (e.g., the graphical user interface 18) with rapid response times to inform a user of a cost to re-play an element of a multi-element outcome event (whether at a pre-determined, normalized cost or not), as well as inform the user of a potential adjusted pay output that could result from such re-play. This may guide a user to make an informed decision on whether or not to select an element for re-playing, as the combination of a predetermined cost may limit the user's expenditure whilst the adjusted pay output may alter a user's appetite for such expenditure. By adjusting the pay table as appropriate and in line with the normalizing applied to the re-play cost, the game's return-to-player (RTP) particulars and aspects may remain unaffected. Additionally, by allowing a selection of more than one element for re-playing, the user interface (e.g., the graphical user interface 18) provides the user with notable freedom in locking the position of some elements, while changing the position of other elements. This may allow a user to progress towards a specific overall element position quicker than if only a single element was changed at a time. Where an experience of a particular feature is desired by a user, the normalized cost may allow the user to reach such experience without excessive expenditure, even though a pay output associated with such feature may be reduced.

Notably, re-play costs (whether at a normalized or an initial value), and any applicable pay table adjustments, may be pre-determined before a selection of one or more elements to re-play or hold is received by the gaming machine 49, 102. Accordingly, the graphical user interface 18 can provide real-time cost and/or pay table updates in response to user selections received by the gaming machine 49, 102.

In some implementations, re-play costs and associated pay table adjustments may be determined as soon as a spin is complete. In other implementations, re-play costs may be computed after a randomized element position for each element is determined for a play of the game, but before animation of the play is complete on a display of a computing device (e.g., the graphical user interface 18). In such implementations, re-play costs or at least a portion of the re-play costs may be computed in parallel with the animation. As an example, as soon as an element is selected for re-spinning (regardless of whether re-spinning of the element begins in response to selection of the element or after a re-spin button 326 is selected), the processor 22, 104 (shown in FIG. 11) can begin calculating prospective re-play costs corresponding to further possible re-spins of the currently selected element or any other element. For implementations that use the re-spin button 326, the animation does not begin until the processor 22, 104 detects that the re-spin button 326 has been selected.

The prospective re-play costs can depend upon which symbols of the currently-selected element land on a row displayed on the graphical user interface 18 and how many different symbol types are on a virtual reel strip corresponding to the selected element. The processor 22, 104 may calculate prospective re-play costs based on an assumption that each different symbol types of the virtual reel strip corresponding to the selected element lands on a row displayed on the graphical user interface 18. Each symbol type includes a common symbol. For example, a first symbol type of the virtual reel strip may be a King ("K") symbol and the virtual reel strip may include four "K" symbols. In at least some implementations, the processor 22, 104 calculates the prospective re-play costs for one symbol of each symbol type rather than repeating the calculation for another symbol of the same symbol type.

For implementations in which the element selected to re-spun begins spinning automatically in response to selection of the element, or under circumstances in which a user selects the re-spin button 326 shortly after selection of the element, and/or when there is a large number of prospective re-play costs to be calculated, the processor 22, 104 can calculate some or all of the prospective re-play costs during the animation of the selected element spinning. In some implementations, the processor 22, 104 can initiate the animation, and while the animation is occurring, the processor 22, 104 can execute the instruction code to calculate some or all of the prospective re-play costs during the animation. If the processor 22, 104 began calculate the prospective re-play costs before initiating the animation, the processor 22, 104 may process an interrupt occurring in response to a selection of the re-spin button 326, service the interrupt, at least in part by initiating the animation, and then continue calculating the calculate additional prospective re-play costs during the animation.

Furthermore, in some implementations, the processor 22, 104 may use a minimum amount of time to display an animation of an element spinning during a re-spin of the element. As an example, the minimum amount of time may be three seconds. In some implementations, however, the processor 22, 104 may extend the time that the graphical user interface 18 displays the animation of the element spinning if the processor 22, 104 has not completed calculating the prospective re-play costs. In this fashion the latencies associated with the calculations and the animations overlap, thus hiding some or all of the latency associated with the calculation from the user.

Further, in some implementations, a remote server may perform the play and/or determine re-play costs before communicating such information to a gaming device over a communication network. Because of potential communication delay, pre-determining re-play costs and pay table adjustments for different re-play combinations may be particularly beneficial in order to provide a responsive user interface in the context of a gaming device which receives information from a remote server in order to operate the user interface.

B. Example Architecture Pertaining to Gaming Machine Implementations

Figure 11:
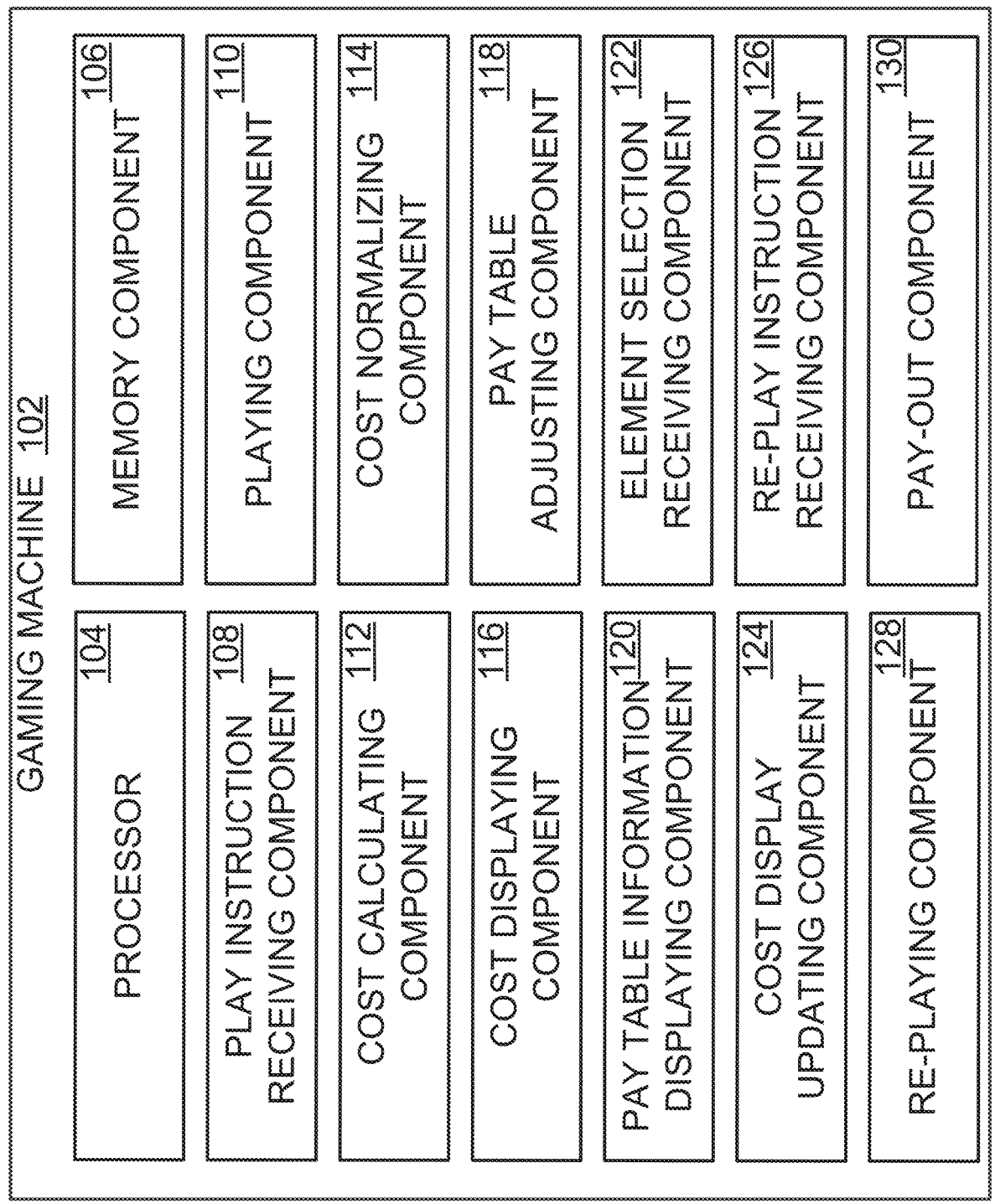
FIG. 11 shows a block diagram of an example system, in accordance with at least some of the example implementations.

Next, FIG. 11 is a block diagram 100 depicting an example implementation of a gaming machine 102 arranged to perform operations in accordance with example implementations described herein. The gaming machine 102 may take any of a variety of forms, including for example a dedicated gaming machine, a personal computer, a server computer, a personal digital assistant, a mobile phone, a tablet device, or some other computing device. The gaming machine may provide a reel-type slot machine with one or more reels (e.g., five reels), with each reel including a plurality of symbols.

The gaming machine 102 may be arranged to implement any of the methods as described herein. The gaming machine 102 may include a processor 104 arranged to execute the functions of various components, which may be provided by hardware or by software units executing on the gaming machine 102. The software units may be stored in a memory component 106, and instructions may be provided to the processor 104 to carry out the functionality of the described components. The various components can include one or more from among: a play instruction receiving component 108, a playing component 110, a cost calculating component 112, a cost normalizing component 114, a cost displaying component 116, a pay table adjusting component 118, a pay table information displaying component 120, an element selection receiving component 122, a cost display updating component 124, a re-play instruction receiving component 126, a re-playing component 128, or a pay-out component 130.

The play instruction receiving component 108 may be arranged to receive a play instruction from a user. For example, the play instruction may result from the user making a selection via a keyboard, a keypad, a touchscreen, and/or a graphical user interface of the gaming machine 102.

The playing component 110 may be arranged to determine a random outcome for all elements of the multi-element game played on the gaming machine 102. The elements of the multi-element game, for example, may be reels of a slot-based game, numbers for a bingo game, cards of a card game, or results of a scratch card game. In at least some implementations, the play instruction received from the user is for all elements of the game, at an initial play of the game. In at least some other implementations, the play instruction received from the user is for one or more elements of the game at various stages of the game.

A random number generating component may form part of the processor 104, and may determine a random value for one or more elements upon receiving a play instruction. In at least some implementations, the random number generating component determines a random value for each and every element of the multi-element game upon receiving any play instruction.

The cost calculating component 112 may be arranged to determine re-play costs for an element of the game, while the cost normalizing component 114 may be arranged to normalize the determined cost to a pre-determined or pre-set value.

In some embodiments, more than one element may be selected at a time for re-playing. In such embodiments, the cost calculating component 112 may further be arranged to determine the cost of different possible re-play combinations, where each re-play combination is a subset of the elements of the game. For instance, the cost calculating component 112 may calculate a cost for re-playing each element, for example each reel in a reel-based slot game, individually, as well as a cost for re-playing any combination of up to N-1 elements of the machine. In a reel-based slot game embodiment with five reels, the cost for re-spinning any combination of up to four reels may be calculated. At the same time that any reel or reels are re-spun, the remaining reels are held in their current condition. The cost to re-spin any combination of 1 to N-1 reels is accordingly the same as if the cost is expressed in a manner that describes which of the remaining N-1 to 1 reels are held.

In at least some implementations, the gaming machine 102 includes five reels. As an example, the five reels can be arranged to spin about a respective actual or virtual horizontal axis. Moreover, the five reels can be adjacent to one another so as to form five adjacent columns. When considering that there are five reels which may be numbered 1 to 5 (e.g., from left to right), the cost may be calculated for selection(s) of reels that may be re-spun, and with corresponding selection(s) of reels that may be held at the same time, as set out in the following table. The reel numbered 1 can correspond to the first reel 314 shown in FIG. 13 and the first reel 514 shown in FIG. 23. The reel numbered 2 can correspond to the second reel 316 shown in FIG. 13 and the second reel 516 shown in FIG. 23. The reel numbered 3 can correspond to the third reel 318 shown in FIG. 13 and the third reel 518 shown in FIG. 23. The reel numbered 4 can correspond to the fourth reel 320 shown in FIG. 13 and the fourth reel 520 shown in FIG. 23. The reel numbered 5 can correspond to the fifth reel 322 shown in FIG. 13 and the fifth reel 522 shown in FIG. 23.

| Number of reels to re-spin: | Possible numbers and combinations of reels to re-spin: | Corresponding numbers and combinations of reels to hold: |
| --- | --- | --- |
| 1 | 1; | 2, 3, 4 and 5; |
|   | 2; | 1, 3, 4 and 5; |
|   | 3; | 1, 2, 4 and 5; |
|   | 4; | 1, 2, 3 and 5; |
|   | 5. | 1, 2, 3 and 4. |
| 2 | 1 and 2; | 3, 4 and 5; |
|   | 1 and 3; | 2, 4 and 5; |
|   | 1 and 4; | 2, 3 and 5; |
|   | 1 and 5; | 2, 3 and 4; |
|   | 2 and 3; | 1, 4 and 5; |
|   | 2 and 4; | 1, 3 and 5; |
|   | 2 and 5; | 1, 3 and 4; |
|   | 3 and 4; | 1, 2 and 5; |
|   | 3 and 5; | 1, 2 and 4; |
|   | 4 and 5. | 1, 2, and 3. |
| 3 | 1, 2, and 3; | 4 and 5; |
|   | 1, 2 and 4; | 3 and 5; |
|   | 1, 2 and 5; | 3 and 4; |
|   | 1, 3 and 4; | 2 and 5; |
|   | 1, 3 and 5; | 2 and 4; |
|   | 1, 4 and 5; | 2 and 3; |
|   | 2, 3 and 4; | 1 and 5; |
|   | 2, 3 and 5; | 1 and 4; |
|   | 2, 4 and 5; | 1 and 3; |
|   | 3, 4 and 5. | 1 and 2. |
| 4 | 1, 2, 3 and 4; | 5; |
|   | 1, 2, 3 and 5; | 4; |
|   | 1, 2, 4 and 5; | 3; |
|   | 1, 3, 4 and 5; | 2; |
|   | 2, 3, 4 and 5. | 1. |

The cost for the 30 different potential re-spin combinations in the table may therefore be calculated to allow a user to select any reel for re-spinning or any combination of up to N-1 reels as a re-spin combination. The 30 re-spin combinations and calculations have 30 corresponding hold combinations, as set out in the table. The calculated cost may be expected to be the same whether a user selects to re-spin four reels (thereby holding the remaining one in its current position), or whether the user selects to hold only one particular reel (thereby spinning the other four). The relative advantage provided to a user is the same irrespective of how the reels to be re-spun or held are selected by a user. The manner in which the reels are selected for holding or spinning does not impact the relative advantage to the user.

Figure 19:
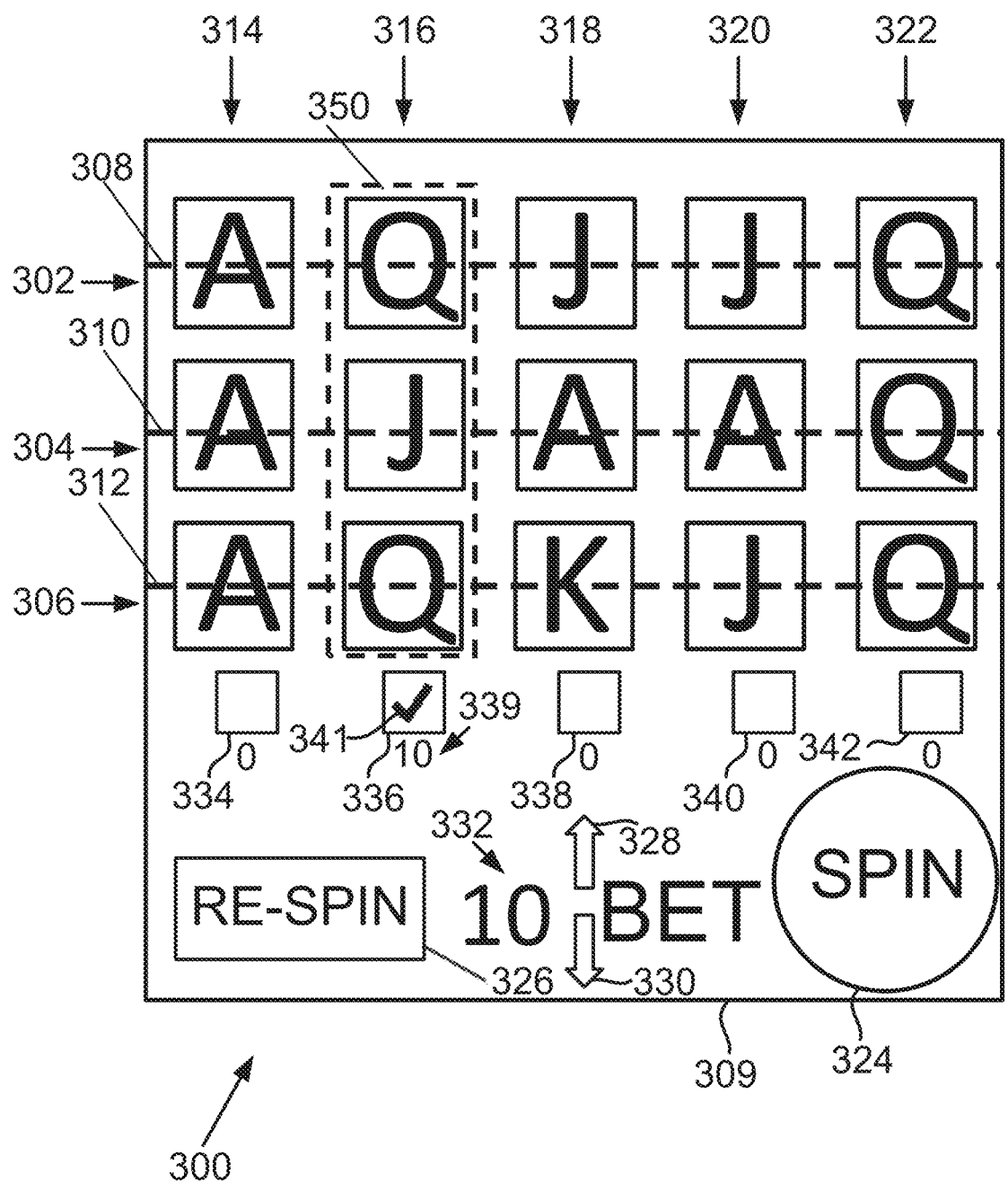
FIG. 19 is a fifth screenshot of a display screen, in accordance with at least some of the example implementations.

The cost displaying component 116 may be arranged to display the cost to select an element for re-playing on the graphical user interface 18. The cost may be displayed to add an individual element at a position on the graphical user interface 18 so that the cost appears to be associated with such element. FIG. 19 shows a cost 339 associated with re-spinning the second reel 316.

The pay table adjusting component 118 may be arranged to adjust the potential pay output in line with the extent of normalization applied by the cost normalizing component 114. Where no normalizing has taken place for a particular element, no potential pay output adjustment needs to be made for potential pay outputs achievable by replaying such element. Where normalizing has been applied to the cost of a particular element, the potential pay output achievable by re-playing such element may be adjusted accordingly. It should be noted that adjustments need only to be made to pay outputs that are possible, for example aspects in a pay table that may be achieved/obtained by re-playing a particular element.

The pay table information displaying component 120 may be arranged to display on the graphical user interface 18 details of the adjustments made to the potential pay output, for example the pay table. As an example, the adjustment details may be displayed in proximity to the current value and or aspects of achievable pay outputs by re-playing a particular element. This may be, for example, a pop-up on the graphical user interface 18 showing a new value of a potential pay output that the gaming machine 102 may output if a particular element is re-played.

The element selection receiving component 122 may be arranged to receive a selection of an element to be re-played. For example, the selection of the element to be re-played may result from a user making a selection via a keyboard, a keypad, a touchscreen, and/or a graphical user interface of the gaming machine 102.

For implementations in which multiple elements for a re-play may be selected (separately, or simultaneously at the same time), the cost display updating component 124 may be arranged to update the costs of selecting and adding additional elements for re-playing, as applicable. For example, in an implementation in which reels for re-spinning during a re-play are selectable and in which reel 1 has already been selected for re-spinning during the re-play, a respective cost may be displayed at or in proximity to reels 2, 3, 4 and 5. Each respective cost will be the cost associated with re-spinning the reel corresponding to the respective cost together with reel 1. The selection of any additional reel may then add the selected reel for re-spinning. So long as N−1 reels have not been selected for re-spinning during the re-play, the cost display updating component 124 may update the respective cost associated with re-spinning (during the re-play) any remaining, currently un-selected reel. In at least some implementations, the cost may be updated by overriding a previously displayed cost for selecting a currently, un-selected reel with a new cost associated re-spinning that reel during the re-play. In at least some other implementations, updating the cost for a currently un-selected reel may include adding the additional cost associated with selecting that reel to the previous cost associated with selecting that reel.

Figure 13:
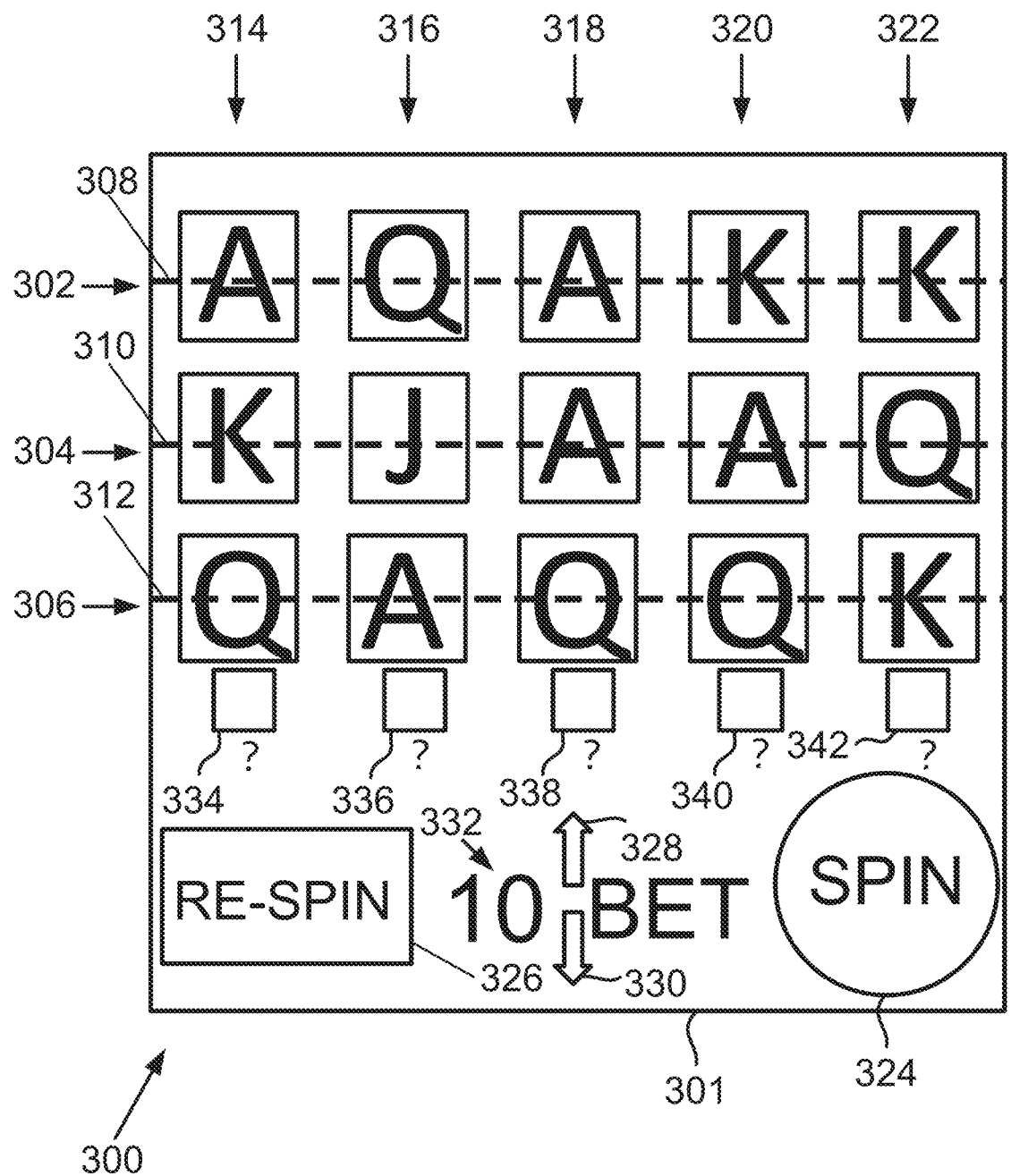
FIG. 13 is a first screenshot of a display screen, in accordance with at least some of the example implementations.

The re-play instruction receiving component 126 may be arranged to receive a re-play instruction in response to use of a user control, such as a re-spin button 326 shown in FIG. 13. The re-playing component 128 may be arranged to re-play the combination of one or more elements (e.g., units or reels) selected for re-playing (and hold the elements explicitly selected for holding or to be held by implication) upon such user instruction and at the cost previously calculated and displayed on the graphical user interface 18 when the one or more elements were selected.

The pay-out component 130 may be arranged to provide a pay output according to a pre-determined pay table. The pay table may be influenced by the size of a bet input received by the gaming machine 102 for the specific spin or initial spin at which time all of the reels were spun, and may have been altered by the pay table adjusting component 118 as detailed above. In at least some implementations, the pay-out component 130 may provide a pay output after a play of all elements of the game, or after re-playing only some elements of the game. In at least some other implementations, the pay-out component 130 pays out a first pay output earned during a play of all elements before a re-play of only some of the elements of the game, and a second pay output earned as a result of the re-play after the re-play has occurred.

C. Example Method Pertaining to Gaming Machine Implementations

Figure 12:
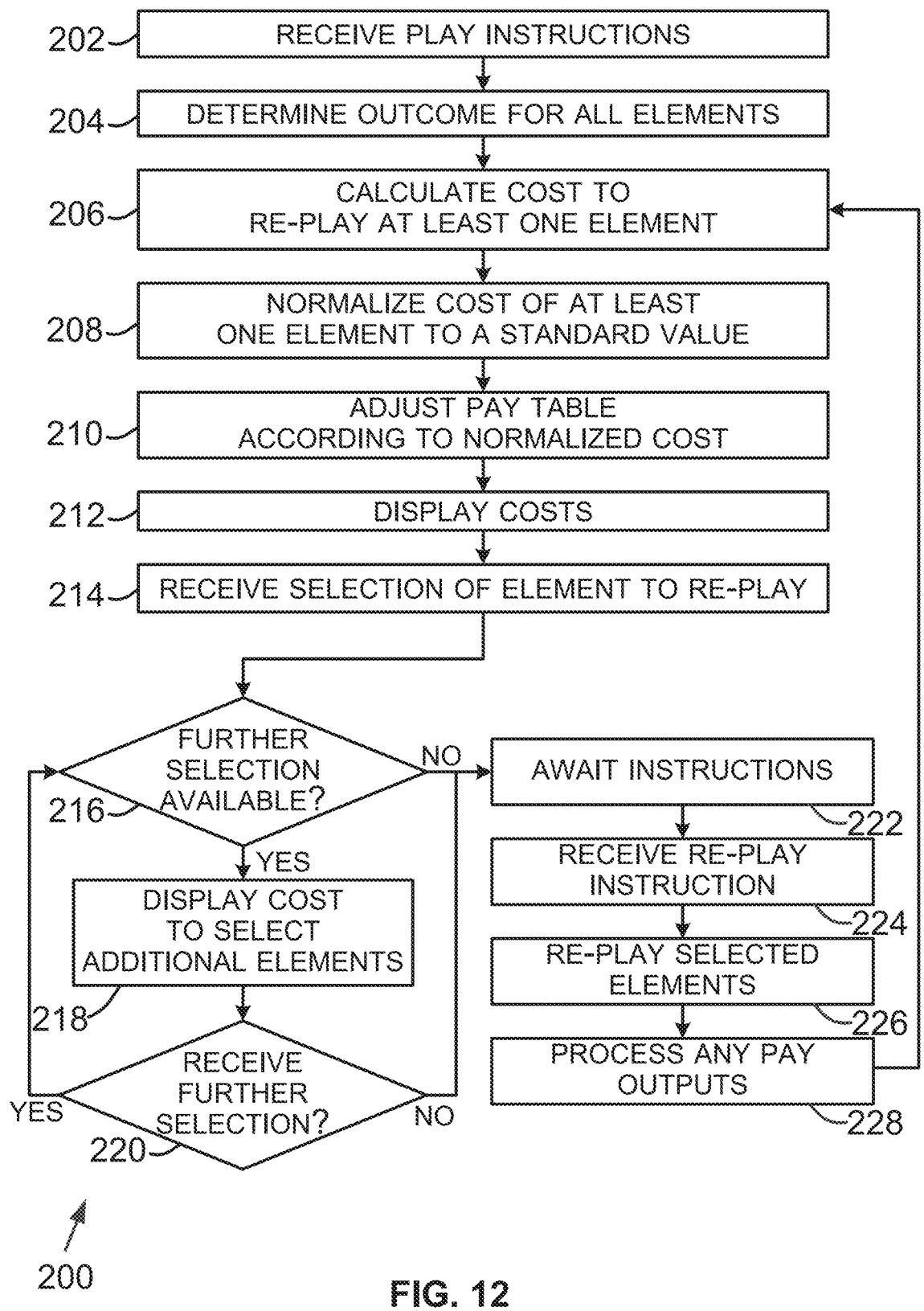
FIG. 12 is a flowchart showing an example method, in accordance with at least some of the example implementations.

FIG. 12 depicts a flowchart that illustrates a method 200 that may be carried out using a control device, such as the control device 12, or using a gaming machine, such as the gaming machine 102 of FIG. 11. Operations of the method 200 are shown within blocks 202 to 228. The method 200 can relate to performing outcome events, such as wager games. Any operation described below, or elsewhere in this description, with respect to FIG. 12, can be performed, at least in part, by a processor, such as the processor 22, 104 executing software program instructions. In the implementation represented by the present flow chart, a user selects elements (e.g., units) of a multi-element game (e.g., a multi-unit game), presently a reel-based slot game, for re-playing, or re-spinning. Non-selected reels are held in position upon re-spinning of any selected reels.

Block 202 includes receiving a play instruction. A processor (e.g., the processor 22, 104) can receive the play instruction. The play instruction may be provided via and/or in response to use of a button, such as a dedicated basic spin button. The play instruction can initiate an iteration of the game, such as a reel-based game controlled by the processor. The play instruction can include an instruction to spin all reels of the gaming machine, presently five reels for at least some implementations. The play instruction may have a bet input associated therewith, which the user may be allowed to adjust as desired prior to commencement of the game iteration. The machine itself may also specify the bet input. The bet level may affect a potential basic pay output size, should the reels come to rest in a position that translates to a pay output for the user. Typically, a bet level is directly related to the return achieved by a pay output subsequent to such bet level. A pay table may specify the relationship between a bet level and a pay output, taking into account the value of the symbols aligned on the reels.

Next, responsive to receiving the play instruction, block 204 includes determining an outcome for all of the elements (e.g., units) of the game. These elements are currently the reels of the gaming machine, presently five reels. Determining an outcome for the reels can include spinning the reels, and bringing the reels to a stop at positions determined by a random number generator associated with the gaming machine. The method is applicable to gaming machines that use a quantity of reels other than five reels. As an example the quantity of reels could include three or four reels.

The reels may come to rest in a position that results in a pay output to the user or in a position that does not result in a pay output. Should the reels be in a position that achieves a pay output, the gaming machine 49, 102 may provide a corresponding pay output according to a bet level and a pay table associated with the gaming machine 49, 102.

Next, block 206 includes calculating the cost to re-play at least one of the elements (e.g., units and/or reels) in the current embodiment. It may include calculating the costs to re-play each element (e.g., re-spin each unit or reel), and/or each possible combination of elements. As an example, potential combinations of reels that may be selected for re-playing may include, for an embodiment where the gaming machine 102 includes five reels, all combinations of two, three or four reels, as well as each of the individual reels. In at least some implementations, the cost to re-play does not include a cost to re-play based on a selection of all elements (e.g., units or reels) as that type of re-play is essentially repeating the play instruction of block 204.

The basic, initial cost for re-playing any element, or any combination of elements, may be expected to be based on a variety of factors. In a reel-based slot game, these factors may include, but are not limited to, a size of a bet input received by the gaming machine 49, 102, the size of a possible pay output based on the specific combination of reels that may be selected for re-playing (or re-spinning), the likelihood of achieving a pay output based on re-playing the reels, any pay output that is assured if only certain reels are re-played, any multipliers that are removed from a pay line, and the like. An assured pay output may arise, for example, if a number of symbols on a pay line has resulted in a pay output, and a user re-spins only some of the reels, while leaving sufficient symbols on the pay line that will still lead to a pay output irrespective of the outcome of the re-spun reel or reels. Some embodiments may, however, be operable not to allow a pay output on symbols that simply remain as is, without any improvement in their use in a pay output combination. It will be apparent that many additional factors may be taken into account and may influence the cost. For example, the likelihood of achieving a pay output can be based on an RTP used by the gaming machine 49, 102. An RTP is a typically a predetermined portion of the player's wagers that is expected—on average—to be received by the player. Various wager games may have RTP values in the range of 85% to 95% for example. Different types of slot games may also include different features that may need to be considered in determining the cost of re-playing a reel or combinations of reels.

In some examples, determining a re-play cost may involve simulating multiple possible resulting element or reel positions for a given re-play combination of reels. A re-play cost may then be determined as an expected outcome by calculating an unweighted average or a weighted average of expected results from each of the possible resulting reel positions. For instance, 10's, 100's, or 1,000's of possible outcomes may be simulated in order to determine a re-play cost for a reel-based slot game. Other types of games with elements that may be re-played may involve similar types of calculations.

In at least some implementations, determining the initial cost for replaying any element or any combination of elements includes the processor 22, 104 calculating the initial cost using Equation 3 or Equation 9 (both shown below).

Next, block 208 includes normalizing the cost of at least one of the elements to a standard value. The standard value may be a predetermined value set by a game provider, by the user themselves, or by regulatory or similar requirements. As an example, the standard value may be the same as an original bet input, not more than twice the value of the original bet input, or another value. In some embodiments, all costs may be normalized such that the cost to re-play each element is the same, for example 10 credits if an original bet input was 10 credits. In some other embodiments, only re-play costs determined to be more than a certain threshold, for example more than the original bet input, may be normalized. Then, costs that are lower than the original cost may remain at the original, lower cost, without any normalizing applied. It will be apparent that the extent and impact of normalizing may take on various forms and specific implementations.

In at least some implementations, normalizing the cost of at least one of the elements to a standard value includes the processor 22, 104 normalizing the cost as described with respect to Equation 5, Equation 7 or Equation 8, all of which are shown below.

Next, block 210 includes adjusting a pay table according to the normalized cost applied to in block 208. As an example, an original bet input of 10 credits may lead to a potential pay output of 50 credits by re-playing only a single reel. However, calculations performed at block 206 may determine that the cost to re-play the particular reel should be 20 credits. The likelihood of achieving a pay output of 50 credits is therefore such that a cost to re-play the particular reels should be 20 credits given their relative advantage. The gaming machine, however, may be set up that a user should not be charged more than their original bet input, i.e. 10 credits in the present embodiment. Normalization of the re-play cost of the particular reel may thus be used to change the cost to 10 credits, rather than 20 credits. The potential pay output to the user would now need to be adjusted, given that a user's potential pay output at a reduced bet input cannot be the same, as the game's return to player configuration may be affected by such a disproportionate return. To remedy this, the potential pay output, and thus the pay table aspect relating to that potential pay output, may be adjusted. Thus, the potential return for the particular re-play is also halved to 25 credits, from the original 50 credits. This corresponds to a reduction the bet input from 20 credits to 10 credits.

Next, block 212 includes displaying the cost re-play any element via the a graphical user interface, such as the graphical user interface 18. The cost may be to initiate re-play of only that specific element or, where more than one element may be re-played at the same time, the cost shown may be the cost to add such an element for re-playing. The cost may be displayed so that it indicates its association with the specific element or reel that may be re-played. It should be noted that this cost may be an original cost, or a normalized cost, as appropriate for a particular element. If a normalized cost is shown, a user may also be shown the adjusted potential pay output associated with the normalized cost. For example, a pop-up window on the graphical user interface may show a potential pay output to be 25 credits, rather than 50 credits, as described above at block 210.

In practice, however, the operations of block 206 to block 212 will ideally be performed rapidly and the operations of block 208 to block 212 will follow almost immediately upon the operations of block 206 and at substantially the same time. For at least some implementations, it may be preferred that the calculation of costs in block 206, the normalizing in block 208, and the adjustment of the pay table (if applicable) in block 210 be performed as speedily as possible such that block 212 appear to be performed almost simultaneously with the previous three blocks. Nevertheless, in so much as the operations of block 206 to block 212 take a finite time to be executed prior to the operations of block 214, a general spinning instruction, initiating a basic play of the game with all elements thereof being played, may be provided during such execution as well and the method may then return back to block 202. All of the re-spin costs calculated in block 206, the normalizing costs in block 208, the pay table adjustments of block 210, and the display of the costs in block 212 may be determined before proceeding to block 214 to ensure that the necessary information is available to provide a responsive user interface in response to user selections.

Figure 23:
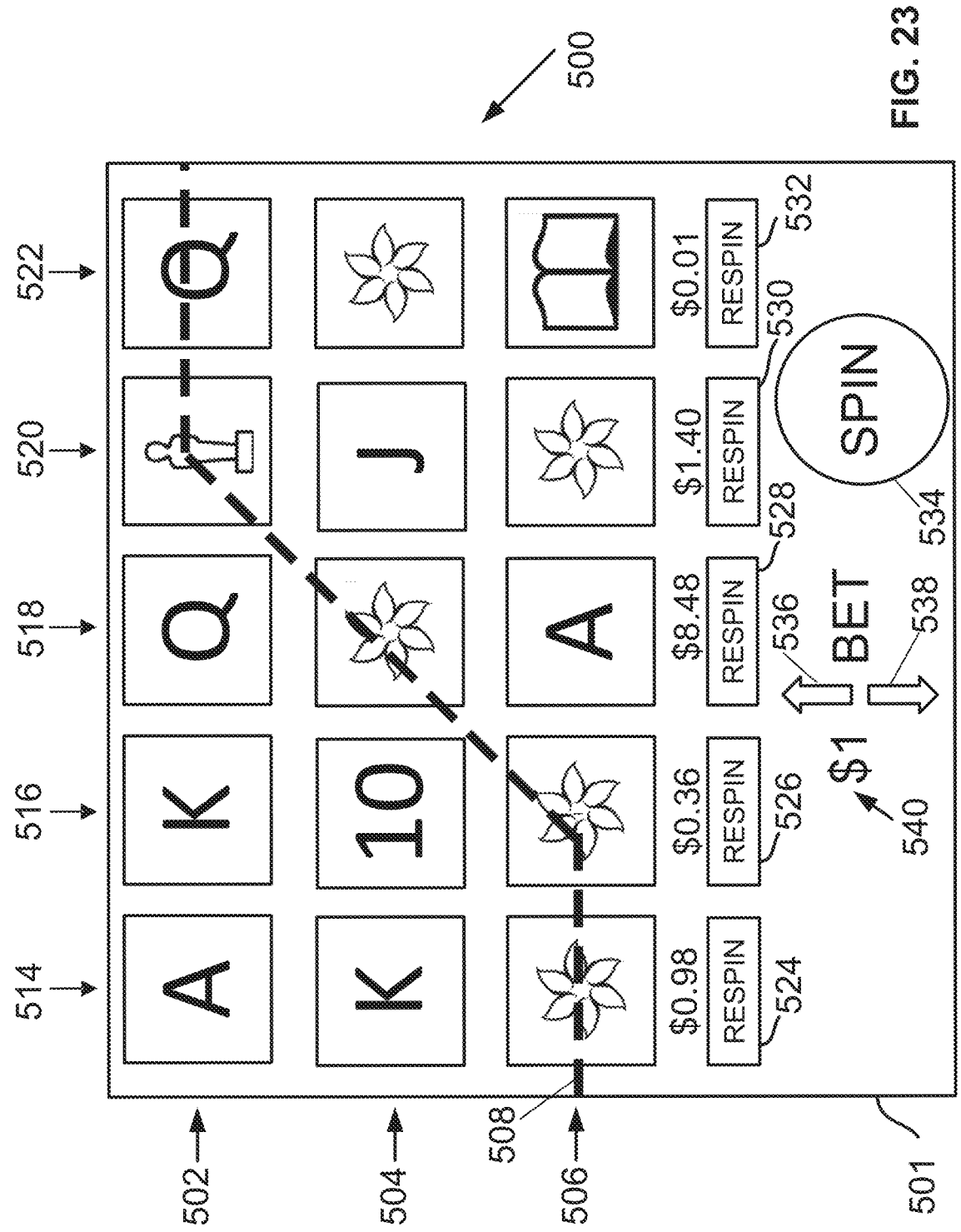
FIG. 23 is a screenshot of a second display screen, in accordance with at least some of the example implementations.

Next, block 214 includes receiving a selection of an element to re-play. In at least some implementations, the processor 22, 104 receives the selection of the element to replay by detecting a selection of a tick box that corresponds to a selected elements. In at least some implementations, the tick box is displayed on a graphical user interface or corresponds to a hardware key or button. A user may trigger the selection being received by using the tick box or hardware key. The tick box 334, 336, 338, 340, 342 shown in FIG. 13 is an example of a tick box that corresponds to a selectable element. In at least some other implementations, the processor 22, 104 receives the selection of the element to replay by detecting a selection of a re-spin button corresponding to a respective element. The re-spin button 524, 526, 528, 530, 532 shown in FIG. 23 is an example of such a re-spin button.

If any additional elements are available for selection at block 216, the cost to select additional elements may be displayed at block 218. If not, the gaming machine may await instructions at block 222.

If further selections are received at block 220, the gaming machine may again check, at block 216, if more selections are available. Again, if there are, the cost for such additional selection may be displayed at block 218. If not, the gaming machine may await further instructions at block 222. If, at block 220, no further selections are received, the gaming machine may also await further instructions at block 222.

In at least some implementations, any adjustment(s) made to the pay table can be displayed to the user at an appropriate time before, during or after selection of an element for re-playing, but presumably before re-playing such elements.

Next, block 224 includes receiving a re-play instruction (e.g., one or more re-play instructions). The re-play instruction may be received after waiting for the instruction at block 222. For implementations based at least in part on the display 300 shown in FIG. 19, the processor 22, 104 may receive the re-play instruction in response to a selection of the re-spin button 326. For implementations based at least in part on the display 500 shown in FIG. 23, the processor 22, 104 may receive the re-play instruction in response to a selection of the re-spin button 524, 526, 528, 530, 532.

Next, block 226 includes re-playing the selected element (s) at the cost(s) previously displayed on the display 300 and/or the graphical user interface 18. The gaming machine 49, 102 may initiate the re-play in response to the re-play instruction received at block 224.

In at least some implementations, receiving, at block 214, the selection of an element to re-play includes receiving an instruction to proceed with the re-play. In these implementations, the method 200 may proceed directly from block 214 to block 226. As an example, receiving a selection of an element to re-play along with an instruction to proceed with the re-play may be made via a specific button associated with re-playing a particular element. The re-spin button 524, 526, 528, 530, 532 shown in FIG. 23 may be operable to signal to the processor 22, 104 a selection of an element to re-play along with an instruction to proceed with the re-play.

After re-playing one or more elements, a pay output may be processed at block 228. Processing a pay output may include the gaming machine 49, 102 providing the pay output. Providing the pay output may include the gaming machine 49, 102 transferring an amount corresponding to the pay amount into a user account or wallet associated with the game or outputting an appropriate amount of currency (e.g., bills and/or coins) or tokens via a coin or bill return. A pay output may be based on any adjustments made to the pay table, as appropriate.

In at least some implementations, after processing any pay outputs at block 228, the method 200 may return to block 206, where the processor 22, 104 may again calculate cost(s) to re-play at least one element of the multiple available elements of the game.

In order to initiate a general play of the game, i.e., to generate results for all elements of the game instead of for a subset of the elements, the gaming machine 49, 102 can receive a play instruction similar to a play instruction received at block 202, thereby initiating a further iteration of the game. A primary spin button may be provided for such an action; however, the gaming machine 49, 102 may permit the bet level of a bet input to be adjusted before the play instruction is received by the processor 22, 104. A primary spin button, such as the primary spin button 324, 534 shown in FIG. 13 and FIG. 23, on the gaming machine 49, 102 can be operable to initiate the general play of the game at any stage, and not just after a re-spin action. For example, all of the elements of the gaming machine 49, 102 may be played in response to receiving a play instruction for a general play of the game at any time between block 206 and 226. Receiving the play instruction may thus cause the gaming machine 49, 102 to override and ignore any selection of one or more elements to re-play. A user may, for example, change their mind after selecting one or more elements for re-playing, and simply select the primary spin button, or a bet button for some implementations, to play all elements and re-start the method at block 202.

Notably, the feature of normalizing the costs of re-playing one or more elements may allow a user to better budget for a playing session, and may allow them to control expenses during play. In addition, for users that chase a specific feature or pay output, the cost to achieve such goal may be controlled. In at least some implementations, the calculations of costs, normalized or otherwise, can take place immediately upon the display 300 and/or the graphical user interface 18 displaying results of played elements and displaying the cost to add an element re-playing can guide a user of the gaming machine 49, 102 to make informed decisions before selecting a reel for re-spinning. Displaying adjustments made to the pay table on the display 300 and/or the graphical user interface 18 can further guide a user of the gaming machine 49, 102 with respect to making further selections of buttons or tick boxes of the gaming machine 49, 102. Additionally, in some implementations, re-play costs may be determined in parallel with animating play after a final randomized element result or value has been determined but not yet displayed in order to provide a responsive user interface. In some implementations, calculations may occur only once after any play so that re-calculating the costs after each selection or deselection of elements is not required. Only the display of such costs may need to be updated. This may speed up a user's play and may lead to a more responsive playing experience.

Additionally, the processing capabilities of the gaming machine 49, 102 may only be needed after each play event, which may prevent continuous use thereof after each selection or deselection action.

Furthermore, in examples where the re-play costs are determined by a server remote from the gaming machine 49, 102, continuous network communication after each selection or deselection action may be avoided.

By allowing the selection of individual or multiple elements for re-playing, the graphical user interface may allow a user to incrementally build up a reel position to obtain a pay output or to reach a bonus round. Allowing selection of multiple elements for re-playing may allow a user to more quickly build up the overall reel position than if only a single reel was selectable. This may allow a user to seek a particular game feature, for example a particular bonus feature or feature game. In addition, a user may be allowed to adjust a bet input during build-up of the reels to a desired position. By balancing the potential pay output (i.e., the pay table) with the bet input and relative advantage provided to the user due to the advantageous reel positions that remain in place, the return to player values of a game may remain stable whilst a user is still provided with the opportunity to reach a desired bonus feature or round.

Any of the blocks of a flowchart or a component in a block diagram may be provided by hardware and/or by software associated with one or more electronic devices, such as a multimedia computer, a mobile device, or a server. These electronic devices may be embodied by one or more of a personal computer, laptop computer, personal digital assistant, smartphone, feature phone, satellite phone, server computer, phablet, tablet, wearable computer, or the like. Appropriate components may form part of such device for the operation of the required method on that device. Further, the electronic devices may be operable to communicate wirelessly or over a wired communication network. The various components forming part of each electronic device may be operable to communicate with each other via an appropriate communication interface, while an appropriate external communication interface may facilitate communication with other electronic devices, whether forming part of the present systems or not.

D. Example Screen Shots Pertaining to Gaming Machine Implementations

FIG. 13 to FIG. 15 and FIG. 18 to FIG. 22 depict screen shots of a display 300 showing a graphical user interface (GUI) that a control device controls in accordance with an example implementation. Like reference numerals in these figures represent like features and components. One or more of the screen shots in these figures represent the inputting of instructions, such as a re-performance instruction, or a result of inputting the instructions. For at least some of those instructions, a unit (e.g., a reel) is selected for re-playing (e.g., re-spinning), with the implication that unselected unit(s) (e.g., reel(s)) are, effectively, selected for holding.

Next, FIG. 13 shows a screen shot 301 of the display 300 when play is initiated, with reels of the slot game in random positions. The example game of the present embodiment is a five-reel slot game, having three pay lines. Three symbols of each reel are shown at a time, forming a matrix-like display. A pay line is provided on each row of the matrix, and the reels form the columns of the matrix. The three rows include a row 302, 304, 306, and a pay line 308, 310, 312 correspond to the row 302, 304, 306, respectively.

A first reel 314 corresponds to a first column that is a left-most column in the screen shot 301. A second reel 316 corresponds to a second column that is a column immediately to the right of the first reel 314. A third reel 318 corresponds to a third column that is a column immediately to the right of the second reel 316. A fourth reel 320 corresponds to a fourth column that is a column immediately to the right of the third reel 318. A fifth reel 322 corresponds to a fifth column that is a column immediately to the right of the fourth reel 320.

The first reel 314, the second reel 316, the third reel 318, the fourth reel 320, the fifth reel 322 corresponds to a tick box 334, 336, 338, 340, 342, respectively. In at least some implementations, the tick box 334, 336, 338, 340, 342 is located underneath a corresponding reel and/or a corresponding column. In accordance with the implementations based at least in part on aspects shown in FIG. 13, the tick box 334, 336, 338, 340, 342 is operable as a control to signal to a processor 22, 104 that a reel corresponding to the tick box 334, 336, 338, 340, 342 has been selected for re-spinning. A cost to re-spin a specific reel or to include that specific reel in a selected combination of reels for re-spinning is shown below each reel's tick box and may already have been calculated by the gaming machine upon completion of a spin or at the time that the randomized reel position became known. As explained above with reference to FIG. 12, the cost to re-spin any selected combination of reels up to N−1 reels may be calculated at the same time.

A primary spin button 324 is provided which may be selected by a user to provide a spin instruction and spin all of the reels at the same time. Selecting the primary spin button 324 may initiate a method, such as the method of FIG. 12. A re-spin button 326 is provided and selection thereof may cause a re-spin instruction to be provided to the control device and re-spinning of selected reels.

A first arrow button 328 is operable to increase the size of a bet input corresponding to a game displayable on the display 300, possibly to a maximum level, and a second arrow button 330 is operable to decrease the size of the bet input. A bet level 332 corresponding to the bet input adjustable using the first arrow button 328 and/or the second arrow button 330 is output on the display 300 and/or the graphical user interface 18. The bet level 332 is shown to be 10 credits.

One or more of the primary spin button 324, the re-spin button 326, the first arrow button 328, the second arrow button 330, or the tick box 334, 336, 338, 340, 342 may be arranged as a physical button associated with the gaming machine 49, 102 or may be provided on and selectable via a touch-sensitive display screen to trigger sending a corresponding input to the processor 22, 104. Alternatively, a pointing device such as a computer mouse may be used to select a button or tick box when applicable.

To simplify the disclosure, only four different basic symbols are included in the matrix, notably Jacks (depicted by a "J"), Queens (depicted by a "Q"), Kings (depicted by a "K"), and Aces (depicted by an "A"). It will be apparent that many different types of symbols may be provided in the implementations that use symbols.

The symbol arrangement shown in FIG. 13 may be an initial symbol arrangement at the start of a game. For a pay output to occur in the present game, three or more of the same symbols must appear on a pay line starting from the first reel 314, that is, the same symbol must appear on the first reel 314, the second reel 316, and on the third reel 318. Another one of the same symbols on the fourth reel 320 will increase the pay output, and a further symbol on the fifth reel 322 will increase the pay output even further. The size of the pay output is generally detailed in a pay table that may be displayed on the graphical user interface 18 and/or the display 300, and is further described below. Generally, different symbols may lead to different sizes of pay outputs, generally as a percentage or multiple of the bet input received by the gaming machine 49, 102. In at least some implementations, four symbols on a pay line will lead to a larger pay output than three symbols on the pay line, and five symbols on the pay line will result in an even larger pay output. Of course, the chance of landing three identical adjacent symbols on a pay line is much greater than the chance of landing four identical adjacent symbols on the pay line. Similarly, the chance of landing five identical symbols on the pay line is even smaller than the chance of landing four identical adjacent symbols on the pay line.

After initiating the game and the graphical user interface 18 or the display 300 appearing as shown in FIG. 13, the primary spin button 324 can be selected to initiate a spin of the first reel 314, the second reel 316, the third reel 318, the fourth reel 320, and/or the fifth reel 322. The bet input shown by the bet level 332 may have been adjusted using the first arrow button and/or the second arrow button 330 after initiation of the game, but before selection of the primary spin button 324.

Figure 14:
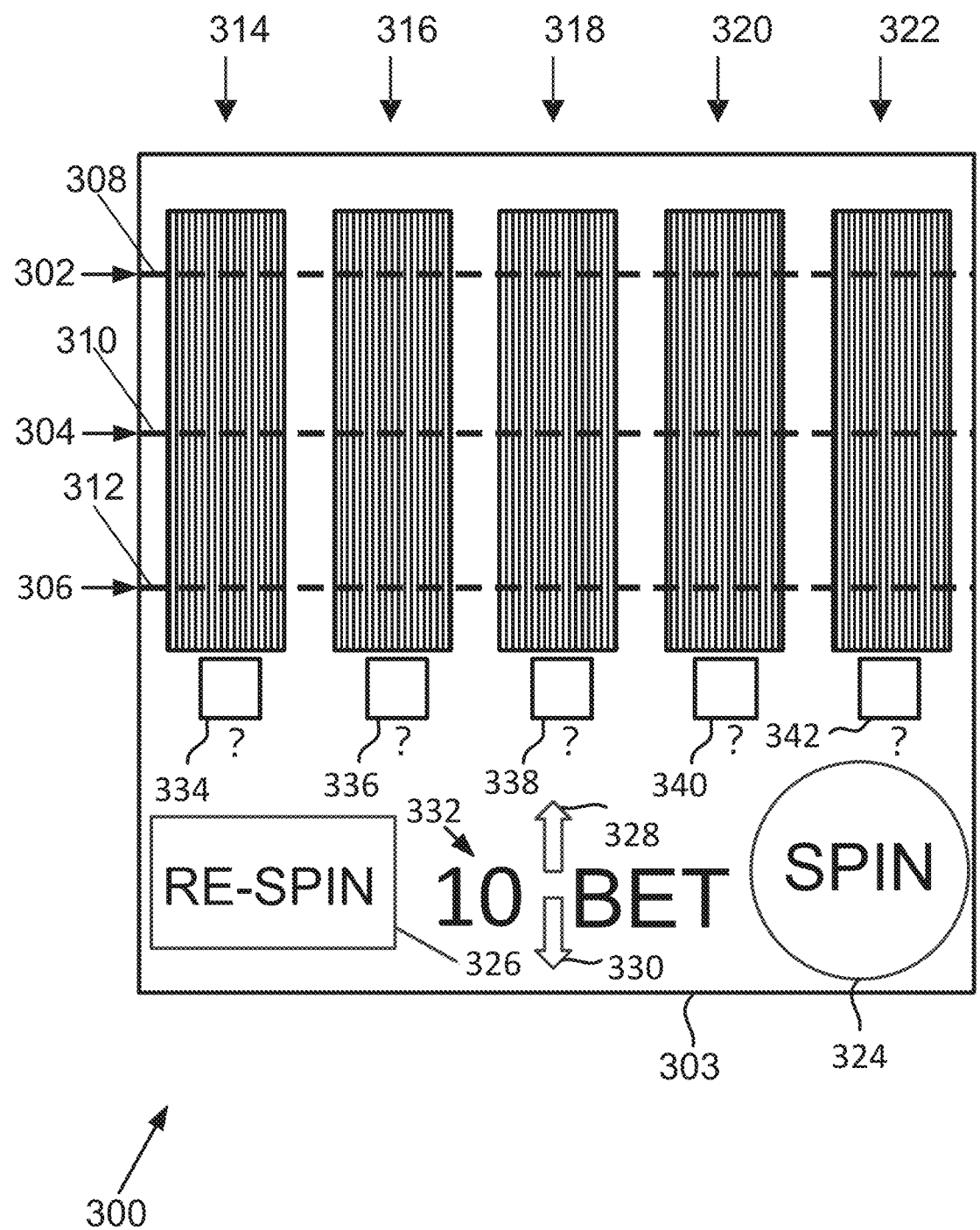
FIG. 14 is a second screenshot of a display screen, in accordance with at least some of the example implementations.

Next, FIG. 14 shows a screen shot 303 of the display 300. The screen shot 303 represents that the first reel 314, the second reel 316, the third reel 318, the fourth reel 320, the fifth reel 322 is spinning. The control device 12 can cause the first reel 314, the second reel 316, the third reel 318, the fourth reel 320, the fifth reel 322 to stop spinning and come to rest in a position as shown in FIG. 15.

Figure 15:
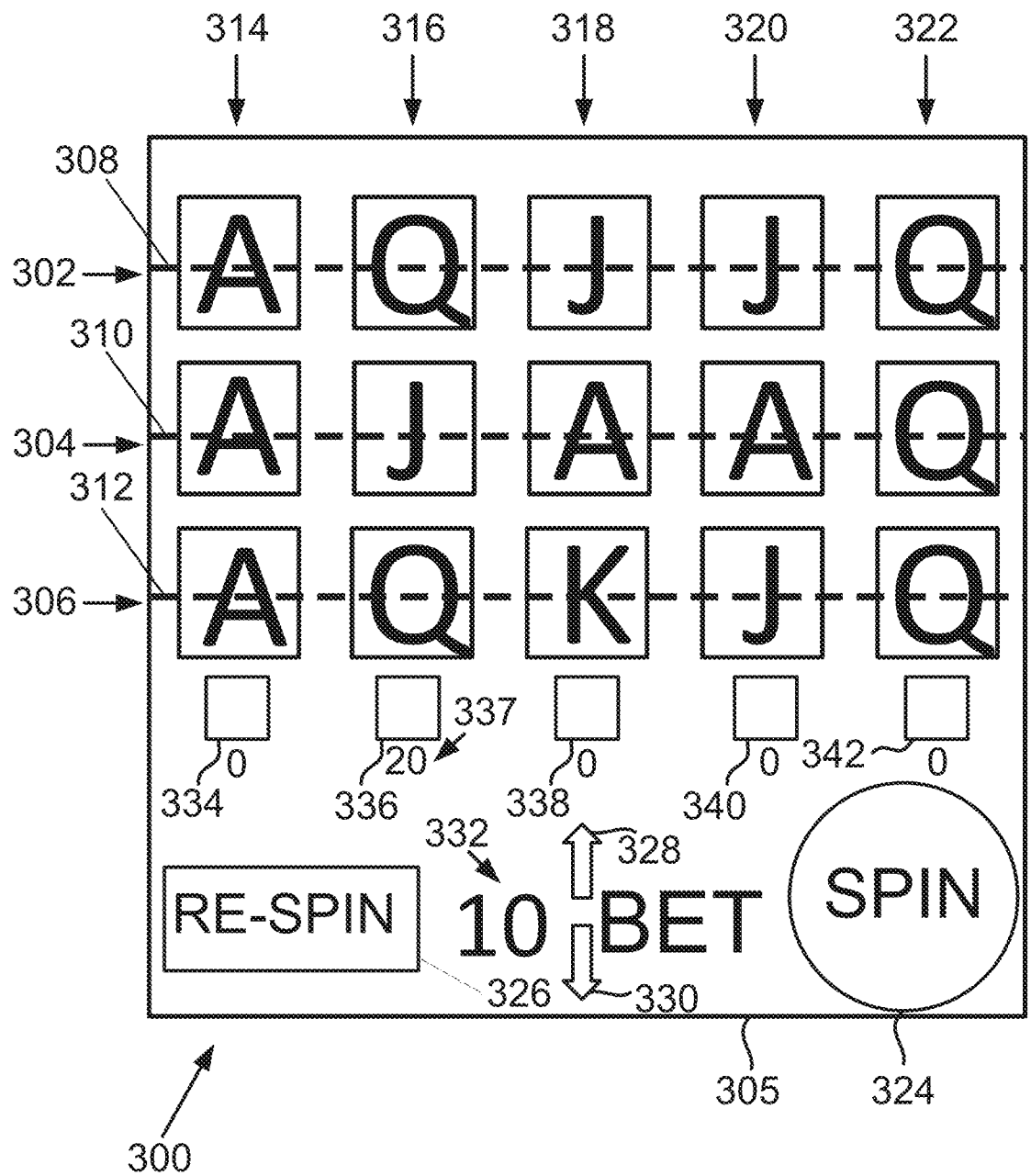
FIG. 15 is a third screenshot of a display screen, in accordance with at least some of the example implementations.

Next, FIG. 15 shows a screen shot 305 of the display 300. The screen shot 305 represents an occurrence when the pay line 308, 310, 312 does not show a symbol arrangement that achieves a pay output. However, on the pay line 310, an Ace appears on the first reel 314, the third reel 318, the fourth reel 320. A Queen appears on the pay line 310 and on the fifth reel 322. A Jack appears on the pay line 310 and on the second reel 316.

If the Jack on the pay line 310 and the second reel 316 were instead an Ace, a pay output would be achieved on the pay line 310 as four Aces would appear consecutively from the left-most position thereon.

In at least some implementations, based on the symbol arrangement shown in the screen shot 305, the gaming machine 49, 102 allows, at a cost, only the second reel 316 to be re-spun, as that is the only reel that can be re-spun such that a pay output might be achieved with the remaining reels held in place. The cost to re-spin the second reel 316 to attempt to also obtain an Ace on the pay line 310 is dependent on the relative advantage provided to the user due to the first, third and fourth symbol position already being populated by the same symbol. The configuration of a reel strip associated with the second reel 316, the desired return-to-player (RTP) of the game, the likelihood of achieving the possible pay output, and the value of the possible pay output is taken into account when calculating an original cost of re-spinning the second reel 316. This is further explained below.

FIG. 15 shows an initial input value 337 (i.e., an input value that may need to be normalized) that the processor 22 can determine with respect to re-spinning the second reel 316. The initial input value 337 is below the tick box 336. The initial input value 337 for the second reel 316 is 20 credits. The screen shot 305 is an example only and may not be output on the graphical user interface 18.

Next, FIG. 16 shows a pay table 400 that may be associated with one or more example implementations, such as an implementation based on the gaming machine shown in FIG. 11 or the method 200, 600 shown in FIG. 12, 25, respectively. The processor 22, 104 may use the pay table 400 to calculate initial re-spin costs. The pay table 400 shows the value of achieving a specific symbol combination on a pay line and from the left-most symbol positions, with the pay output being a multiple of an original bet input placed by the user. According to the pay table 400, three Jacks will return half the original bet input, four Jacks the same as the original bet input, and five Jacks 1.5 times the original bet input. According to the pay table 400, three Queens will return the original bet input, four Queens twice the original bet input, and five Queens three times the original bet input. According to the pay table 400, three Kings will return 1.5 times the original bet input, four Kings three times the original bet input, and five Kings 4.5 times the original bet input. According to the pay table 400, three Aces will return twice the original bet input, four Aces four times the original bet input, and five Aces six times the original bet input.

As an example, if an original bet input is 10 credits, and a reel spin output includes four Aces on a pay line, a pay output will be four times the original bet input, therefore 40 credits.

A gaming machine may need to adhere to a return-to-player (RTP) rating, i.e., may always need to, on average, return a predetermined percentage of bet inputs to players in the form of pay outputs. As an example, a game executed on the gaming machine may have an RTP of 90%. Thus, the gaming machine should on average (i.e., over extended periods of gameplay) return 90% of all bet inputs received by the gaming machine as pay outputs to players. Every re-spin should thus also have an RTP of 90%, otherwise the game's RTP may be impacted and may deviate from the desired RTP. RTP may be expressed as a percentage, and according to the following formula:

$$RTP = \frac{(\text{Probability of Achieving Pay Output})(\text{Potential Pay Output})}{\text{Cost of Spin}} \quad (\text{Eqn. 1})$$

wherein the "Potential Pay Output" may be defined as:

$$(\text{Multiplier for Potential Pay Output})(\text{Initial Bet Input}) \quad (\text{Eqn. 2})$$

And the cost of spin may also be the cost of a re-spin (listed as "ReSpin" in the equations). Thus, the formula may be re-written and re-arranged to provide:

$$\text{Cost of } ReSpin = \frac{(\text{Probability of Achieving Pay Output})(\text{Multiplier of pay output})(\text{Initial Bet Input})}{RTP}. \quad (\text{Eqn. 3})$$

The processor 22 may use Equation 3 to calculate a cost to be charged for a re-spin. Assuming a 45% probability of achieving the desired four Aces (based on a layout of a virtual reel associated with the second reel 316), with the 4× multiplier, 10 credit initial bet, and a 90% RTP, the following initial re-spin cost may be calculated:

$$\text{Cost of } ReSpin = \frac{45\%(4)(10)}{90\%} = 20 \text{ credits.} \quad (\text{Eqn. 4})$$

The cost of the above re-spin should thus, under normal circumstances, be 20 credits, twice the original bet input In at least some implementations, however, the cost of a re-spin is normalized to equal the original bet input, i.e. 10 credits. The user is not presented with a cost of 20 credits as shown in FIG. 15. In order to ensure that the RTP of the game is not affected by charging a lower cost for the re-spin, the pay table is adjusted so that the value of the potential pay output achievable is reduced proportionately. In other words, the formula may be adjusted as follows:

$$\text{Cost of } ReSpin = 10 \text{ credits} = \frac{45\%(4N)10}{90\%}. \qquad \text{(Eqn. 5)}$$

In Eqn. 5, N is a normalizing factor. In some instances, N equals 0.5, which is then the factor with which the potential pay output, as set out in the pay table, should also be adjusted. The newly adjusted pay table 450 may then be as shown in FIG. 17, where the multiplier for four Ace symbols has been changed to 2, which equal the original 4 times N, or 4 times 0.5, being 2.

In practice, only the values in a pay table that could in reality be achieved by re-spinning a particular reel need to be adjusted. Currently, this is four Ace symbols. The other possible pay outputs cannot be achieved, so need not be adjusted. It may therefore not be necessary to adjust all of the pay table's values if all values cannot be obtained. However, it may be a game provider's decision to adjust all of the values of the pay table according to the normalizing value. This may provide an experience to a user that illustrates that all potential pay outputs are reduced, instead of only the one that is achievable.

Figure 18:
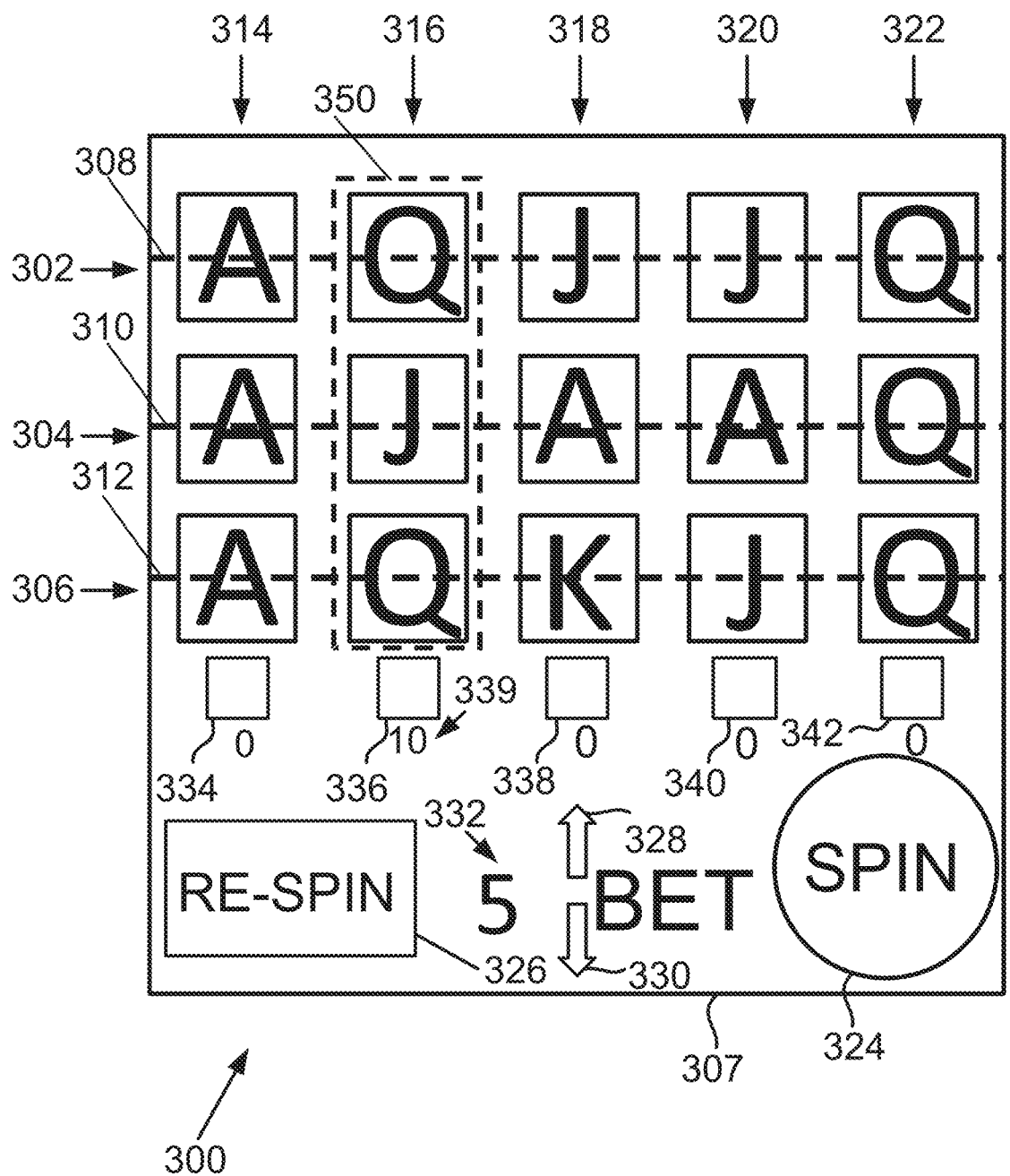
FIG. 18 is a fourth screenshot of a display screen, in accordance with at least some of the example implementations.

The cost 339 of a re-spin of the second reel 316 is reflected in the display 300 shown in FIG. 18, where the cost 339 of a re-spin associated with the second reel 316 and second tick box 336 is shown to be 10 credits, the same as the original bet input. The cost 339 is an adjusted cost, as discussed above.

A highlighted border 350 is drawn around the second reel 316 to indicate on the display 300 and/or the graphical user interface 18 that adjustments have been made to the pay table, and such adjustments will apply when the second reel 316 is re-spun, leading to a pay output. Any suitable method of indicating those aspects the display 300 and/or the graphical user interface 18 may be employed. A maximum potential pay output, a percentage of original pay output, and/or a currently modified pay table may be output on the display 300 and/or the graphical user interface 18. Those items may be displayed, before, during and/or after selection of a particular reel for re-spinning.

It should be noted that the cost associated with re-spinning any of the other reels is shown as zero credits. This is because re-spinning any other reels cannot lead to a pay output with the current symbol positions and pay lines of the game. There are no symbols lined up on any of the other pay lines that could result in a pay output. To re-spin any such reels may therefore be provided free of charge. In at least some implementations, the gaming machine 49, 102 may charge a fee only if symbols are lined up such that re-spinning a particular reel may lead to a pay output. In at least some implementations, the gaming machine 49, 102 may charge a nominal fee for re-spinning a reel even if their likelihood of achieving a pay output is small or zero. In at least some implementations, the display 300 and/or the graphical user interface 18 always displays any potential pay output can be achieved by re-spinning a reel.

In at least some implementations, a core of the calculations is that an adjustment is made to the normal pay output based on changing the typical input values. In at least some of those implementations, other factors may form part of the calculation of a re-spin cost, and the associated normalizing thereof.

In accordance with implementations in which the gaming machine 49, 102 provides pay outputs based on at least three symbols appearing on a pay line starting from the fifth reel 322, the gaming machine 49, 102 could provide a re-spin cost corresponding to the fifth reel 322 in that three Jacks could appear on the pay line 308 if a Jack symbol lands on the row 302 of the fifth reel 322 after re-spinning the fifth reel 322. The re-spin cost corresponding to the fifth reel 322 in this implementation could also be based on the possibility that a Queen symbol on the fifth reel 322 lands on the row 304 after re-spinning the fifth reel 322.

Next, FIG. 19 includes a screen shot 309 that shows an indication that the second reel 316 has been selected for re-spinning. In other words, a tick 341 appears in the tick box 336 associated with the second reel 316. The bet level 332 indicates that the bet input is still 10 credits. In at least some implementations, the gaming machine 49, 102 allows selection of only a single reel for re-spinning. In accordance with at least some of those implementations, the tick-boxes corresponding to the remaining, unselected reels can be greyed out. A selection of the re-spin button 326 with second reel 316 selected can trigger the processor 22, 104 to re-spin only the second reel 316. The first arrow button 328 and second arrow button 330 may not be available at this stage, as the re-spin cost may not be adjustable. However, as described further below, it may in some instances be possible to adjust the cost of a re-spin, and these buttons may be available and usable to adjust the re-spin cost at this stage.

Figure 20:
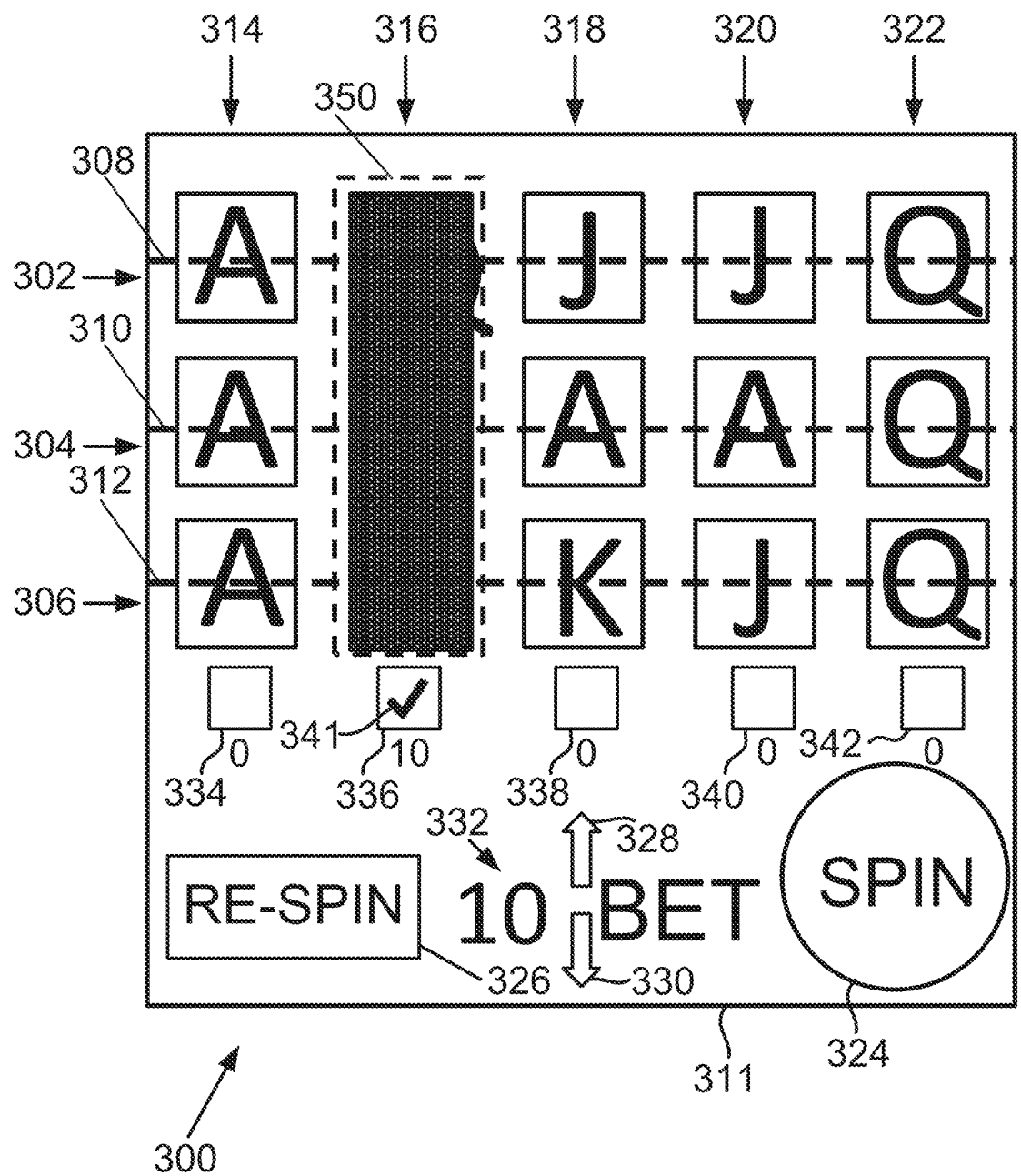
FIG. 20 is a sixth screenshot of a display screen, in accordance with at least some of the example implementations.

Next, FIG. 20 shows a screen shot 311 that represents that the re-spin button 326 has been selected, the second reel 316 is the only reel spinning, and the first reel 314, the third reel 318, the fourth reel 320 and the fifth reel 322 are locked in position.

Figure 21:
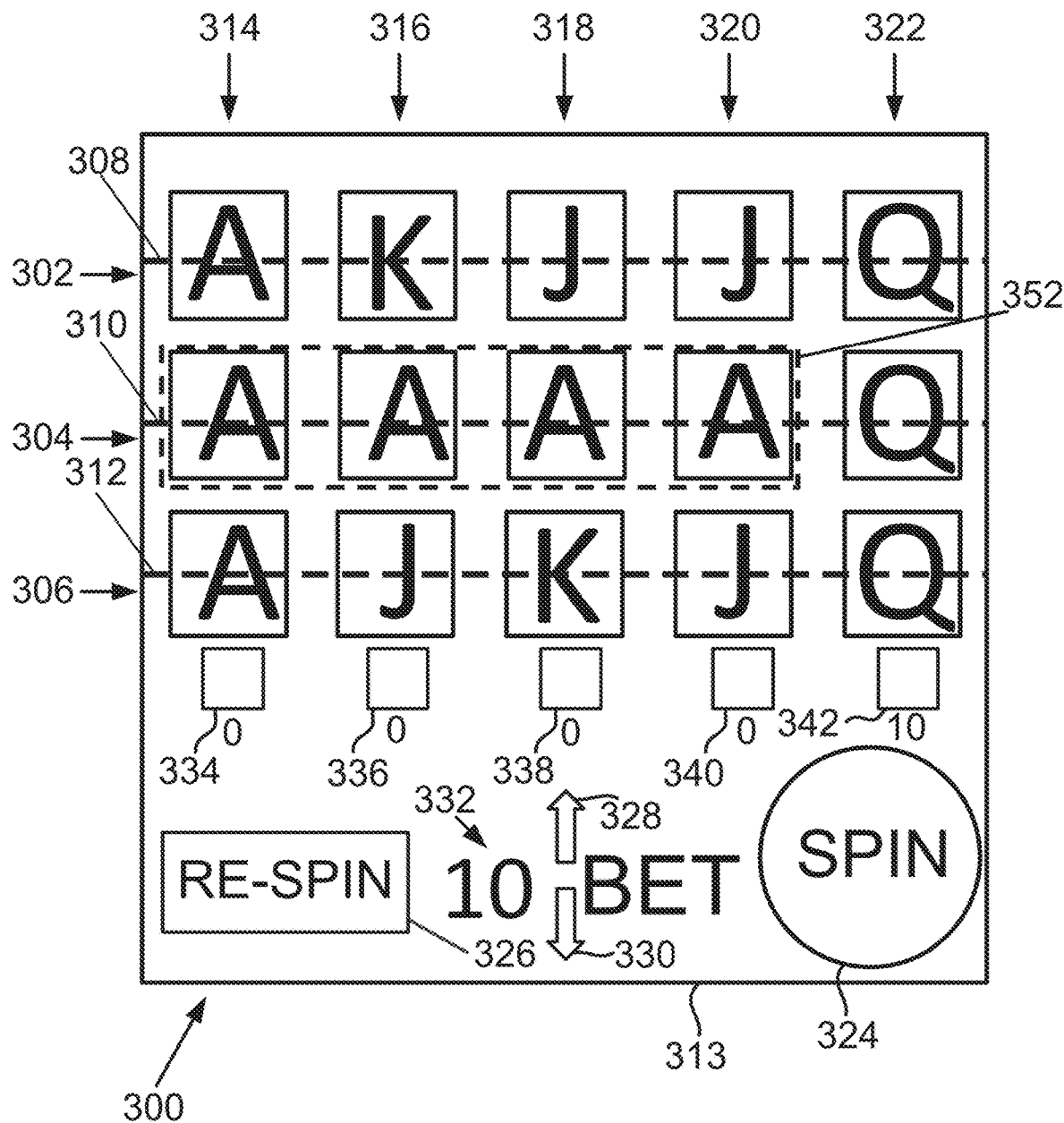
FIG. 21 is a seventh screenshot of a display screen, in accordance with at least some of the example implementations.

Next, FIG. 21 shows a screen shot 313 that represents that the second reel 316 has come to a halt. Another Ace symbol has landed on the pay line 310, completing a sequence of four Aces on the pay line 310 that the user was trying to obtain. A border 352 is shown around the four Aces, highlighting the symbols that result in a pay output.

It should be noted that the cost to re-spin the fifth reel 322 is now shown as 10 credits, below the tick box 342. Despite the user achieving a pay output with four Aces on the pay line 310, the user may still wish to try and obtain the bigger prize associated with five Aces on the pay line 310. The fifth reel 322 will then need to be re-spun with the goal of landing another Ace symbol on the pay line 310 and fifth reel 322. Again, the cost may be normalized to 10 credits, as shown, with the potential pay output resulting from obtaining all five Aces on the pay line 310 being reduced accordingly, as explained above with reference to re-spinning of the second reel 316. Accordingly, the potential pay output from re-spinning the fifth reel 322 and landing another Ace on the pay line 310 may be lower than the six times shown in the pay table of FIG. 16.

Figure 22:
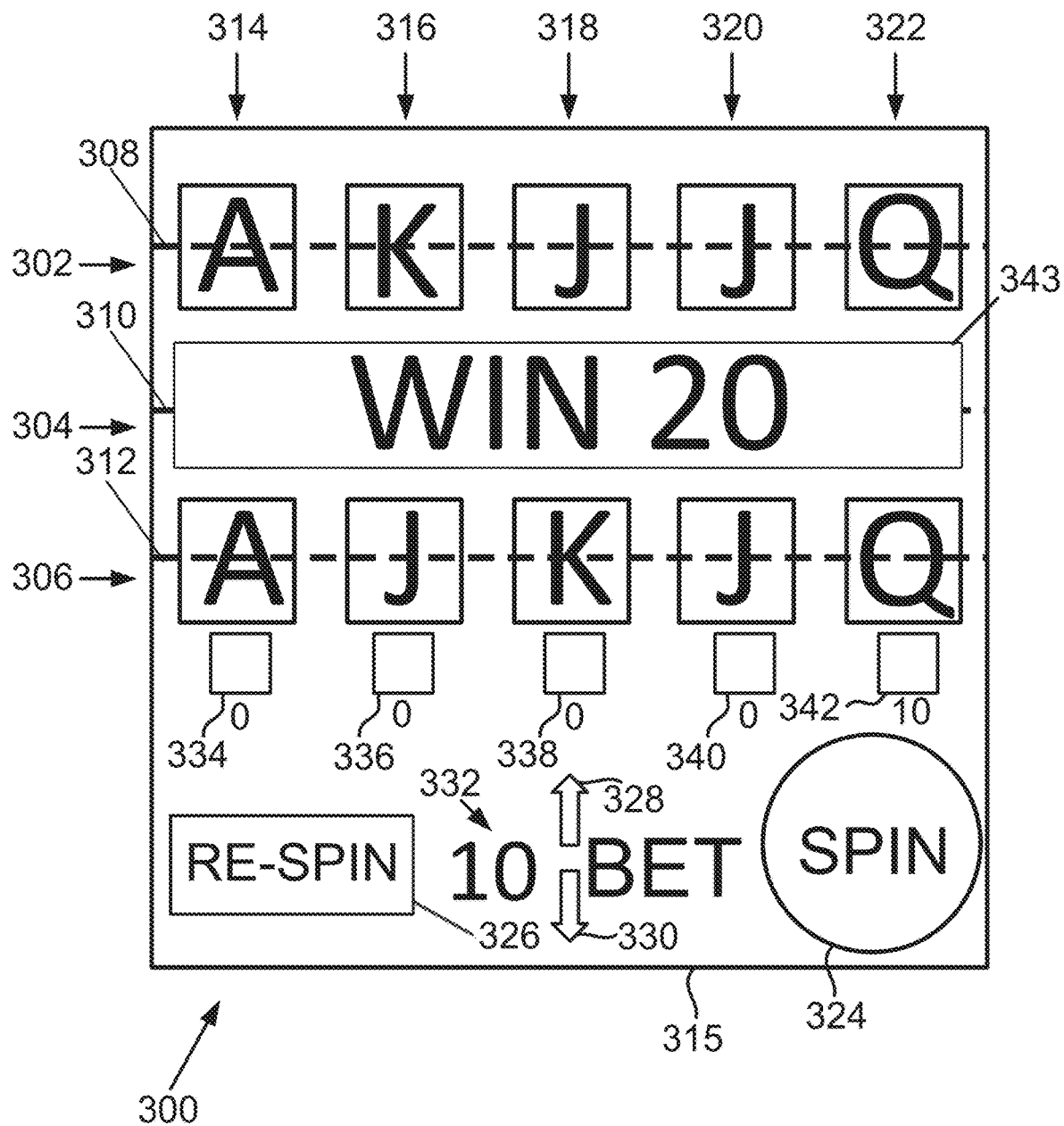
FIG. 22 is an eighth screenshot of a display screen, in accordance with at least some of the example implementations.

Next, FIG. 22 shows a screen shot 315 representing that the gaming machine 49, 102 may provide a pay output based on the outcome shown in FIG. 21, and according to the modified pay table as shown in FIG. 17. The pay output is an adjusted 20 credits, which may, for example, be paid into a user account or wallet associated with the game or via coins or tokens. A banner 343 may flash over the display 300 to indicate the pay output. In the present embodiment, the banner 343 flashes over the pay line 310, which is the pay line that lead to the pay output. It will be appreciated that any appropriate method may be used to indicate a pay output on the display 300 and/or the graphical user interface 18.

After the gaming machine 49, 102 has output a pay output, the gaming machine 49, 102 may proceed to re-spin any one or more reels (depending on the particular implementation) if selection of the re-spin button 326 is detected, or may proceed to spin all five reels of selection of the primary spin button 324 is detected.

A user may use the re-spinning of reels to not only search for a symbol that is missing for a particular arrangement on the display, but may wish to build up a symbol position reel by reel until they arrive at a desired symbol arrangement. This may allow the user to achieve a pay output of their choosing, activate a particular bonus feature, enter a particular mode of the game, progress the game's storyline, or the like. By normalizing a pay output associated with re-spinning individual reels, the user's input costs may be managed whilst the potential pay output is adjusted such that the game's RTP remains as it should.

The allowed input value, i.e., the allowed bet input for re-spinning a reel, may be set by a game developer, for example as equal to the original bet input (such as in the example provided above), as a percentage or multiple of such bet input, or as a specific number of credits or monetary value (for example, 20 credits or 2 dollars, irrespective of what the user's original bet input was. This limit may also be set by a user themselves, prior to or during gameplay. A user may wish to set up their own limits for gameplay, allowing them control over their expenditure during gameplay for budgeting purposes. By setting a limit to every play of the game, the user may know that they are able to spin a set number of times, for example 100 times, irrespective of whether or not they spin all reels, or only a single reel. The gaming machine 49, 102 is operable to receive the allowed input value from the game developer, the user or otherwise.

The example implementations arranged as a method may be used with reel-based slot games that incorporate pay lines (as per the example provided above), with scatter symbols, or in any other type of reel-based slot game. The core concept of adjusting a potential pay output based on adjusting a possible input value may be applied in any such game, taking into account the relative advantage provided to the user by having specific symbols remain in place. Other types of games, for example bingo, scratch cards, or the like may utilize similar systems and methods involving the re-playing of certain elements from multiple available game elements.

As mentioned previously, the gaming machine 49, 102 allows for selecting one or more reels for spinning, or any one or more reels for holding. The likelihood of achieving a pay output from the gaming machine 49, 102 by randomly determining the value of the selected combination of reels may then be used to calculate an initial cost, and also a normalizing factor to be applied to reduce the cost of re-spinning and the potential pay output.

The formula, $$\text{Cost of } ReSpin = \frac{(\text{Probability of Achieving Pay Output})(\text{Multiplier of Pay Output})(\text{Initial Bet Input})}{RTP} \quad \text{(Eqn. 6)}$$

where 45% is the likelihood of achieving a pay output, 4 is the factor to be applied to a bet input in the event of a pay output, 10 is the potential pay output, 90% is the RTP of the game, and the cost of a re-spin is fixed at 10 credits, may be written as $$\text{Cost of } ReSpin = 10 \text{ credits} = \frac{45\%(4N)10}{90\%}. \quad \text{(Eqn. 7)}$$

In Eqn. 7, N is a normalizing factor. In the above example, the normalizing factor N is used to balance the formula by incorporating the normalizing factor into the pay output multiplier, and therefore by adjusting the potential pay output. In the example corresponding to Eqn. 7, the normalizing factor N equals 0.5. In this example, the potential pay output is thus reduced by fifty percent in order to keep the bet input at 10 credits and the RTP at 90%.

Alternatively, the normalizing factor, N, can be incorporated into the initial bet input term. Eqn. 7 may thus be written as follows:

$$\text{Cost of } ReSpin = 10 \text{ credits} = \frac{45\%(4)(10N)}{90\%} \quad \text{(Eqn. 8)}$$

to show the incorporation of the normalization factor as part of the initial bet input for calculation purposes of the gaming machine 49, 102. In Eqn. 8, N is a normalizing factor. Therefore, instead of adjusting the multiplier to be applied to the pay output, the gaming machine 49, 102 may adjust the value of the initial bet input placed for the re-spin. The user would still be charged the pre-determined 10 credits, however, in the event of a pay output, instead of multiplying the initial bet input (i.e., 10 credits) by the value in the pay table applicable to the resulting achieving the pay output, the gaming machine 49, 102 would multiply the modified (normalized) initial bet input (i.e., 5 credits (i.e., initial bet input (10 credits) times N (0.5))) received by the gaming machine 49, 102 with the value in the pay table applicable to the resulting achieving the pay output. This may avoid the need to modify the pay table itself. In accordance with these examples, the gaming machine 49, 102 may display on the graphical user interface 18 a value of a potential pay output (e.g., a reduced potential pay output that may be achieved by a re-spin) and/or a potential multiplier that may be applied to a bet input.

The systems and methods of the present disclosure may allow a user to set an input value at any stage and before any re-spin. For example, a user may wish to build up to a particular reel and symbol configuration where they are only one symbol away from a potentially big pay output, or a particular feature, story mode, bonus game, or the like. The user may be allowed to build up their symbol position at a low cost, and then adjust the bet input for the later spin. However, the normalization factor may still be considered by the gaming machine 102 when determining any pay output. A particular symbol arrangement may, according to a pay table of a game, offer a return of 10 times an original bet input. At a symbol arrangement approaching such particular arrangement, the initial cost determined for a relevant re-spin may be calculated to be, for example, 50 credits, where a user's original bet input was 10 credits. The graphical user interface 18 may show a normalized re-spin cost, for example 10 credits, five times lower, while a potential multiplier associated with the re-spin is reduced by the same factor, five times. This results in a potential return of two times the re-spin cost, a fifth of the original ten times multiplier.

Now, the gaming machine 49, 102 may be operable to adjust a re-spin cost to a cost a user is willing to pay and adjust their potential pay outputs according to the same, normalized ratio. For example, if the gaming machine 49, 102 receives a bet input of 20 credits, the gaming machine 49, 102 would double the potential pay output compared to the previously suggested re-spin cost equal to 10 credits. The gaming machine 49, 102 would still, however, offer a potential multiplier of two times the re-spin cost, providing a potential 40 credit return. Normalization is thus still used to adjust the pay table in this example, as the gaming machine 49, 102 may provide a pay output twice the original bet input instead of ten times the original bet input. By applying the game's RTP in calculating the normalization factor to be applied to a re-spin, the gaming machine 49, 102 may ensure that the game's overall RTP remains as required or specified.

In some implementations, the gaming machine 49, 102 allows a normalized re-spin cost to be increased and/or decreased. It is envisaged that normalization will still be used to adjust the potential pay output(s) associated with the re-spin.

In some implementations, the gaming machine 49, 102 is operable to set normalization limits according to a user's preference. As an example, a user may wish to always be in a position to achieve a pay output 1,000 times their initial bet input. As example, a user may enter into the gaming machine 49, 102 a bet input of 100 credits on spinning all reels of a game, and may wish that any re-spin costs are configured such that they could still achieve a pay output 1,000 times their original 100 credit bet input. Normalization should then be implemented such that the re-spin costs allow a user to achieve a pay output of 100,000 credits. While the re-spin costs required to achieve this may be significant, it may cater to the requirements of certain users.

In some implementations, the gaming machine 49, 102 normalizes downwards only, i.e., to reduce re-spin costs down to a certain level (for example down from an initially determined 50 credit cost to a 10-credit cost). In some other implementations, the gaming machine 49, 102 may allow normalization to be applied to all reels. For example, where a likelihood of achieving a pay output is low enough, or a potential pay output is low enough, that an initially determined re-spin cost is less than the original bet input, for example five credits as a re-spin cost compared to a ten-credit initial cost, normalization may increase the re-spin cost. In such embodiments, the re-spin costs of all reels may be set to be, for example, ten credits. Then, normalization may be used to increase the re-spin cost of reels with initially determined re-spin costs lower than a pre-determined value. In the foregoing implementation, the re-spin cost may then be doubled from five credits to ten credits. The multiplier applied to the potential pay output in the return should then also be doubled. This may ensure that a user is always charged the same cost for a re-spin, further contributing to a user's ability to budget for their number of spins.

It will be apparent that games in which the present disclosure is implemented may have complex pay tables, with significantly more symbols and pay lines than shown in the above examples. Accordingly, the calculations required to determine the re-spin costs of each reel may be may be particularly complex, as all possible pay output results may need to be determined. The gaming machine 49, 102 may determine a separate re-spin cost for each reel. Accordingly, the gaming machine 49, 102 may perform calculations for various possible symbol positions that include, for example, considering and combining the likelihood of multiple different potential pay output outcomes, multiple normalization adjustments, and the like. Given the complex nature of such calculations, and the need for provision of near-instant results, the present disclosure is particularly suited to implementation in a computer-implemented environment. Each reel may have its own unique cost after every spin.

In at least some implementations, the gaming machine 49, 102 may not provide a pay output based on a set of symbols that remain in position on a pay line after a re-spin unless the pay output is based on at least one more symbol on the pay line beyond the set of symbols that remain in place. For example, if three symbols in the first three positions on the pay line resulted in a pay output, the gaming machine 49, 102 can allow a fourth reel, adjacent to the third reel, to be re-spun for a chance to achieve a pay output based on four symbols on the pay line. Similarly, if four symbols in the first four positions on the pay line resulted in a pay output, the gaming machine 49, 102 can allow a fifth reel, adjacent to the fourth reel, to be re-spun for a chance to achieve a pay output based on five symbols on the pay line.

In at least some implementations, the gaming machine 49, 102 may not provide a pay output based only on a set of symbols that remain in position on a pay line after a re-spin. In other words, the gaming machine 49, 102 may not provide a pay output based on only a portion of the set of symbols that resulted in the previous pay output. For example, if each symbol in the first four positions on the pay line is an Ace, the gaming machine 49, 102 may not provide a pay output if the re-spun fourth reel does not include an Ace on the payline. In other words, the gaming machine 49, 102 may not provide a pay output based on the first three positons of the payline showing an Ace after the fourth reel is re-spun if the fourth position does not show an Ace. As another example based on a situation in which an each symbol in the first four positions on the pay line is an Ace, the gaming machine 49, 102 may provide a pay output if the third reel is re-spun and an Ace lands in the same position on the third pay line.

In at least some implementations, the gaming machine 49, 102 is operable to set any limit to a re-spin cost. As an example, the gaming machine 49, 102 can limit a re-spin cost based on a credit value, a monetary value, a factor of an original bet input received by the gaming machine 49, 102, a percentage of the user's wallet share, a percentage of the user's daily sum of bet input limit, or the like.

The gaming machine 49, 102 is operable to select a primary spin button 324, 534 at any time to initiate spinning all available reels, whereafter new re-spin costs and normalization values may be determined and applied. It will be appreciated that a user may not be allowed to initiate a re-spin or a spin of all reels while any one or more reels are still spinning from a previous instruction.

Initial re-spin costs may not always work out to round values, and, accordingly, normalization may result in potential pay output multipliers that are also not round values.

FIG. 23 shows a screen shot 501 of a display 500 with a more complex embodiment of a reel-based slot game, where a more complex initial re-spin cost calculation by the gaming machine 49, 102 has been performed. A re-spin cost adjacent to a re-spin button 524, 526, 528, 530, 532 is not yet normalized.

The implementation shown in in FIG. 23 is a five-reel slot game, with three rows. Ten pay lines form part of the game. Three symbols of each reel are shown at a time, forming a matrix-like display. The three rows are row 502, 504, 506. For illustrative purposes, a pay line 508 is the only pay line explicitly marked on the display 500.

Figure 24:
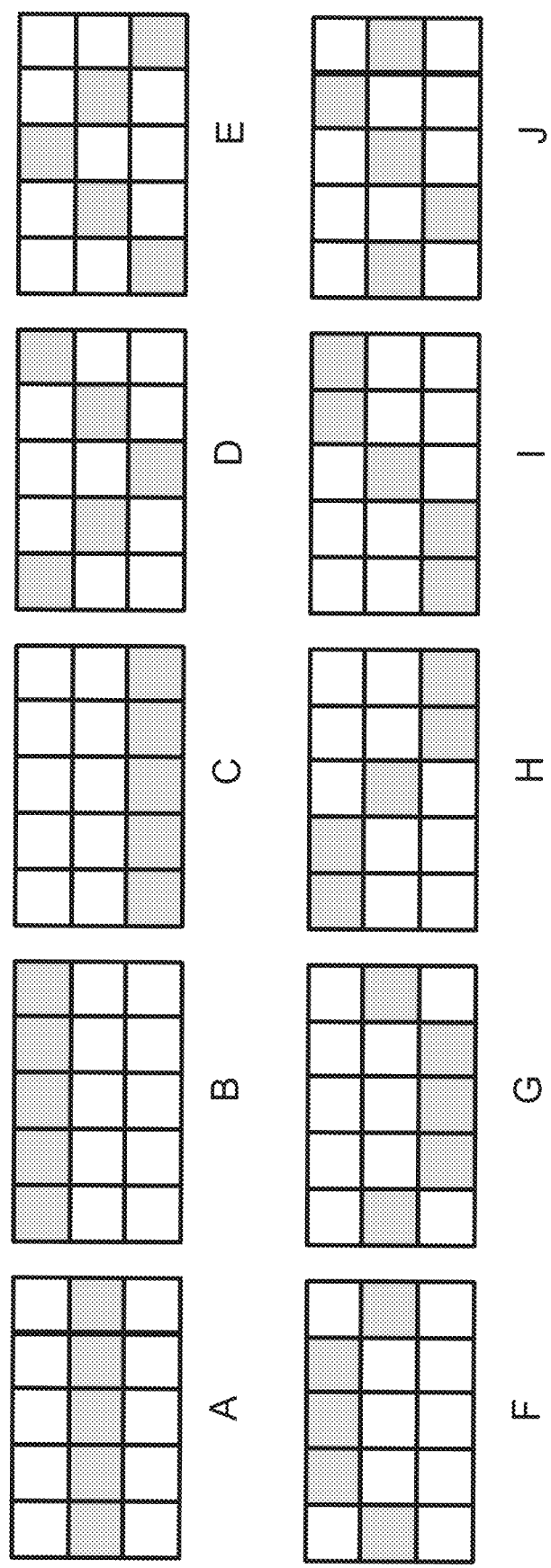
FIG. 24 is an assortment of matrices showing pay lines, in accordance with at least some of the example implementations.

FIG. 24 shows a representation of all ten pay lines associated with the matrix of FIG. 23, numbered A to J. The shaded positions in the matrixes of FIG. 24 correspond to the pay lines forming part of FIG. 23.

A first reel 514 corresponds to a first column that is a left-most column in the screen shot 501. A second reel 516 corresponds to a second column that is a column immediately to the right of the first reel 514. A third reel 518 corresponds to a third column that is a column immediately to the right of the second reel 516. A fourth reel 520 corresponds to a fourth column that is a column immediately to the right of the third reel 518. A fifth reel 522 corresponds to a fifth column that is a column immediately to the right of the fourth reel 520.

The first reel 514, the second reel 516, the third reel 518, the fourth reel 520, the fifth reel 522 corresponds to a re-spin button 524, 526, 528, 530, 532, respectively. A cost for re-spinning each individual reel is displayed above the appropriate re-spin button.

A primary spin button 534 is provided which may be selected by a user to provide a spin instruction and spin all of the reels at the same time. Selecting the primary spin button 534 may initiate a method, such as the method of FIG. 12.

A first arrow button 536 is operable to increase the size of a bet input corresponding to a game displayable on the display 500, possibly to a maximum level, and a second arrow button 538 is operable to decrease the size of the bet input. A bet level 540 corresponding to the bet input adjustable using the first arrow button 536 and/or the second arrow button 538 is output on the display 500 and/or the graphical user interface 18. The bet level 540 is shown to be one dollar (i.e., $1).

One or more of the primary spin button 534, the re-spin button 524, 526, 528, 530, 532, the first arrow button 536, or the second arrow button 538 may be arranged as a physical button associated with the gaming machine 49, 102 or may be provided on and selectable via a touch-sensitive display screen to trigger sending a corresponding input to the processor 22, 104. Alternatively, a pointing device such as a computer mouse may be used to select a button when applicable.

Various symbols form part of the virtual reel strips associated with each reel. The display 500 currently shows Aces ("A"), Kings ("K"), Queens ("Q"), Jacks ("J"), tens ("10"), a statue, a book, and flowers as symbols. Other symbols are also provided as part of the reel strips but are not currently shown on the display 500.

An initial cost shown above the re-spin button 524, 526, 528, 530, 532 has been determined according to the potential pay outputs the gaming machine 49, 102 may provide if re-spinning the corresponding reel occurs, the probability of such pay output happening, and the RTP of the game. In at least some implementations, an initial bet input of $1, as shown by the bet level 540, is used in all initial re-spin cost calculations.

The pay line 508 indicated in FIG. 23 is pay line I, the ninth pay line in FIG. 24. The pay line 508 results in the gaming machine 49, 102 providing a pay output due to the three flower symbols appearing on the pay line 508 from the left-most position on the pay line 508. The pay output for three flower symbols in the present implementation is three times the original bet input, (i.e., the pay output is $3). In accordance with this implementation, symbols must appear from the left-most position on a pay line to lead to a pay output. However, some implementations may not have pay lines (for example, scatter-based games), or may also or alternatively pay from right to left, top to bottom, bottom to top, or the like. The gaming machine 49, 102 allows any reel to be re-spun at the re-spin cost shown. In at least some implementations, the gaming machine 49, 102 does not permit repeating the current pay output by re-spinning the fourth reel 520 or the fifth reel 522. In those or in other implementations, the gaming machine 49, 102 does permit repeating the current pay output by re-spinning the first reel 514, the second reel 516, or the third reel 518 and a flower symbol landing in the same position on the re-spun reel.

The initial re-spin cost for the first reel 514 is shown to be $0.98. If the first reel 514 is re-spun, the display 500 may show another flower symbol on the row 506 of the first reel 514, such that the ninth pay line (i.e., the pay line 508) results in the same pay output as provided by the gaming machine 49, 102 for the symbol arrangement shown in the screen shot 501. A flower symbol may also land on the row 504, which would lead to a pay output according to the tenth pay line, marked "J" in FIG. 24. The gaming machine 49, 102 considered at least the pay outputs possible for the ninth and tenth pay lines when determining the initial cost for the first reel 514.

The initial re-spin cost for the second reel 516 is shown to be $0.36. A flower symbol landing on the third row of the second reel 516 would lead to the same pay output as provided by the gaming machine 49, 102 for the symbol arrangement shown in the screen shot 501. Another possible pay output can result from an Ace symbol landing on the row 504 of the second reel 516, which would lead to a pay output based on three Aces appearing on the fourth pay line, marked D in FIG. 24. Both of these possible pay outputs were taken into account in determining initial re-spin cost for the second reel 516. The potential pay outputs and/or the likelihood of achieving such pay outputs would be lower than the potential pay outputs and/or the likelihood of achieving such pay outputs associated with re-spinning the first reel 514, therefore the re-spin cost for the second reel 516 is less than the re-spin cost for the first reel 514.

The initial re-spin cost for the third reel 518 is shown to be $8.48. If a re-spin of the third reel 518 results in a flower symbol landing on the row 504 of the third reel 518, the gaming machine 49, 102 will provide another return of $3, repeating the current pay output. If a re-spin of the third reel 518 results in a flower symbol landing on the row 506 of the third reel 518, the gaming machine 49, 102 will provide a pay output for four flower symbols, as per the third pay line, marked "C" in FIG. 24. In the present implementation, the pay output for four flower symbols on a pay line is 10 times the original bet input, (i.e., the pay output is $10). Further, if a re-spin of the third reel 518 results in a King symbol landing on the row 502 of the third reel 518, the gaming machine 49, 102 will provide a pay output for three King symbols on the sixth pay line, marked "F" in FIG. 24. All three these possible pay outputs were taken into account by the gaming machine 49, 102 when determining the initial re-spin cost for the third reel 518.

The initial re-spin cost for the fourth reel 520 is shown to be $1.40. The method of arriving at an initial re-spin cost, and then normalizing the cost, will be explained with reference to this reel.

As explained previously, the gaming machine 49, 102 may not permit the fourth reel 520 to be re-spun and then provide a pay output for the three flower symbols already appearing from the left on the ninth pay line, marked "I" in FIG. 24. The gaming machine 49, 102 can, however, land a fourth flower symbol on the ninth pay line, thereby increasing a potential pay output to that corresponding with four flower symbols, being 10 times the original $1 bet input, or $10. In at least some implementations, a virtual reel strip associated with the fourth reel 520 includes a total of 52 symbols, of which five are flower symbols and two are wild symbols. The wild symbols may substitute for any other symbol, and if such a wild symbol lands on the first row of the fourth reel 520, on the ninth pay line "I", it would substitute for a flower symbol and also lead to a pay output of ten times the original bet input. The likelihood (probability) of landing a flower symbol, or a symbol that will be considered a flower symbol, on the ninth pay line "I", can be given as 7/52 (seven out of a possible 52 symbols will lead to this result. The row 502 on the fourth reel 520 corresponds to the only place where a symbol may land that will lead to a pay output by spinning the fourth reel 520. No other symbols on the first three reels are aligned with any other pay line of FIG. 24 such that re-spinning the fourth reel 520 leads to a pay out. Only the likelihood of landing a fourth flower symbol on the ninth pay line "I" need to be considered.

The probability of achieving a pay output is 7/52 (approximately 0.134615385, or 13.46%). The potential pay output associated with this probable result is $10, or 1,000 cents. The original bet input was $1, or 100 cents. The RTP of the game is 96.5%. The following formula may then be used to calculate the initial re-spin cost:

$$ReSpin\ cost = \frac{(Probability\ of\ Achieving\ Pay\ Output)(Potential\ Pay\ Output)}{RTP} \quad (Eqn.\ 9)$$

$$= \frac{\left(\frac{7}{52}\right)(1,000)}{96.5\%} \quad (Eqn.\ 10)$$

$$= \frac{\left(\frac{7}{52}\right)(1,000)}{96.5\%} \quad (Eqn.\ 11)$$

$$= 139.49780789 \quad (Eqn.\ 12)$$

The gaming machine 49, 102 may be programed to round up or round down the initial re-spin cost. In at least some implementations, the initial re-spin cost is rounded up, to provide a total of 140 cents. As shown in FIG. 23, this is the initial re-spin cost corresponding to the re-spin button 530. The initial re-spin cost may be normalized.

In at least some implementations, the gaming machine 49, 102 is set up so that any re-spins are charged at the same cost as the original bet input. For the original $1 bet input in this example, the re-spin cost must therefore also be $1. A normalization factor of 1/1.4, or approximately 0.7142857, should therefore be applied to normalize the re-spin cost. This factor must then also be applied to the potential pay output. This then provides 10*(1/1.4) as a potential return on the $1 re-spin cost, being approximately $7.142857143. Again, the gaming machine 49, 102 may round up, or round down, this potential pay output to the nearest cent. If the pay output is rounded up, the gaming machine 49, 102 may provide a pay output of $7.15 in the event of a fourth flower symbol landing in row 502 of the fourth reel 520. If the pay output is rounded down, the gaming machine 49, 102 may provide a pay output of $7.14 in the event of a fourth flower symbol landing in row 502 of the fourth reel 520.

Prior to selecting the re-spin button, the display 500 and/or the graphical user interface 18 may display an amount of this reduced potential pay output. This may be via an information banner or the like appearing on the display 500 and/or the graphical user interface 18 before the re-spin is initialized. The gaming machine 49, 102 may, for example, wait to receive a selection confirming that the re-spin is to proceed at the reduced potential pay output.

Similarly, the re-spin cost for the third reel 518 may be reduced down to $1, with an associated reduction in potential pay output. The different potential pay outputs may similarly be output on the display 500 and/or the graphical user interface 18 prior to initiating re-spinning of the third reel 518.

The cost shown to re-spin the fifth reel 522 is shown to be $0.01. This is a nominal fee charged to re-spin the fifth reel 522, as no symbols are suitably lined up to allow any pay output by re-spinning the fifth reel 522. A user may, however, try to align symbols on the fifth reel 522 in position before re-spinning the fourth reel 520. As an example, landing a flower symbol on the fifth reel 522 on the row 502 may allow the user to have four out of a possible five flower symbols on the ninth pay line, labelled "I" in FIG. 14. Should a flower symbol land in this position, the initial cost of re-spinning the fourth reel 520 may be significant, given the potential of obtaining five flower symbols along this pay line (which in the current embodiment provides a return of 75 times the bet input received by the gaming machine 49, 102. Normalization of the re-spin cost of the fourth reel 520 down to $1 will then significantly reduce the potential pay output.

It will be apparent that the initial re-spins costs, as shown in FIG. 23, will not typically be displayed on the display 500 or the graphical user interface 18. Rather, the display 500 or the graphical user interface 18 may show the normalized re-spin costs instead of the initial re-spin costs. These normalized re-spin costs may be a maximum of $1, with initial costs over this cost being normalized. The re-spin costs may, however, be modified in any appropriate way as discussed above. The gaming machine 49, 102 may be operable to set the re-spin cost in various ways, such as a monetary value, in the form of a number of credits, as a factor of an original bet input, as a factor of the user's available funds, to achieve a desired potential outcome, or the like.

In some implementations, the gaming machine 49, 102 may determine a suggested combination of elements, or reels, to be re-played. Thus, the gaming machine 49, 102 may recommend or suggest a selection of elements to be re-played. This suggestion may be based on determined re-play costs. It may also be based on input received from a user, where the user has indicated details of a prize, elements, bonus feature, bonus round or the like of the game that the user wishes to achieve or reach. In some implementations, the gaming machine 49, 102 may be adapted to use machine learning or artificial intelligence to recommend re-spin combinations to the user. The gaming machine 49, 102 may track and record previous re-spins in order to predict pay outputs, bonus rounds or the like that the user may wish to achieve. Appropriate suggestions for re-spin combinations may then be suggested to the user. This may be beneficial in games with very high numbers of pay lines or symbols, where a potential pay output that could be reached by re-playing a particular element may be difficult to follow and/or accurately predict for the user themselves. The display of the gaming machine 49, 102 (e.g., the graphical user interface 18) may display an indication of the suggested combination of elements to the user. In some such embodiments, the suggested combination of elements comprises at least two elements, and an option is provided, on the display of the gaming machine 49, 102, to simultaneously select each element of the at least two elements. Additionally, an option may be provided on the display to enable automatic selection of the suggested combination of elements.

In at least some implementations related to reel-based slot games, pay lines may not be used or required, at least not for all types of pay outputs that may be achieved in such games. One example relates to a reel-based slot game referred to as the "ways" type. In the ways-type reel based slots game, no pay lines are specified and symbols may land in any position on adjacent reels to achieve a pay output. Another example is a reel-based slot game in which a pay output can be achieved when a specified quantity of scatter symbols land in any position in the displayed symbol matrix and on any one or more reels (e.g., any row on any one or more reels). A scatter symbol is a particular symbol designated for achieving such pay outputs. For implementations in which the gaming machine 49, 102 executes one or more these additional types of reel-based slot games, the gaming machine 49, 102 can perform calculations using one or more the equations described above.

As an example, the gaming machine 49, 102 may use Equation 3 to determine a re-spin cost of a reel-based slots game that includes scatter symbols on its reels and is programmed to provide pay outputs for the specified quantity of scatter symbols landing on the displayed symbol matrix. When, for example, three scatter symbols are needed on the display and/or graphical user interface 18 to achieve a particular pay output, and 2 scatter symbols landed on one or more reels for an earlier spin of the reels, the processor 22, 104 can calculate a re-spin cost of a particular reel on which no such scatter symbol appears in the displayed symbol matrix by considering: i) the likelihood of obtaining a third scatter symbol landing on the particular reel if re-spun; ii) the multiplier associated with the pay output in the event that the third scatter symbol lands on the particular reel if re-spun, iii) an initial bet input, and iv) the RTP of the reel-based slot game.

Furthermore, in some implementations, the gaming machine 49, 102 is operable to change a quantity and/or mix of symbols on one or more reels used for a reel-based slot game. Changing the quantity of symbols for any given instance of changing the quantity of symbols can include increasing the quantity of symbols or decreasing the quantity of symbols. Changing the quantity of symbols on a reel can including changing the mix of symbols on the reel. Changing the mix of symbol on a reel includes changing a proportion of a given symbol on the reel with respect to the quantity of all other symbols on the reel. For example, eight percent of the symbols on the reel can be "K" symbols before changing the quantity of symbols on the reel and ten percent of the symbols on the reel after changing the quantity of symbols on the reel.

In some implementations, the gaming machine 49, 102 changes the quantity and/or mix of symbols per reel, if at all, only before an initial spin. In those implementations, the quantity and/or mix of symbols on the reels is fixed at the same or some other constant number for any re-spin of one or more of the reels.

For implementations in which the quantity and/or mix of symbols on a reel changes between spins of the reels, the impact of such changing quantity and/or mix of symbols may be incorporated into the calculations performed by the gaming machine 49, 102. In implementations in which the quantity and/or mix of symbols on a reel may change between spins (initial spin and/or re-spin), the likelihood of a achieving a pay output may be impacted, and the gaming machine 49, 102 can use pay tables based on the modified reel(s) when calculating an initial spin cost or re-spin cost.

E. Further Example Method Pertaining to Gaming Machine Implementations

Figure 25:
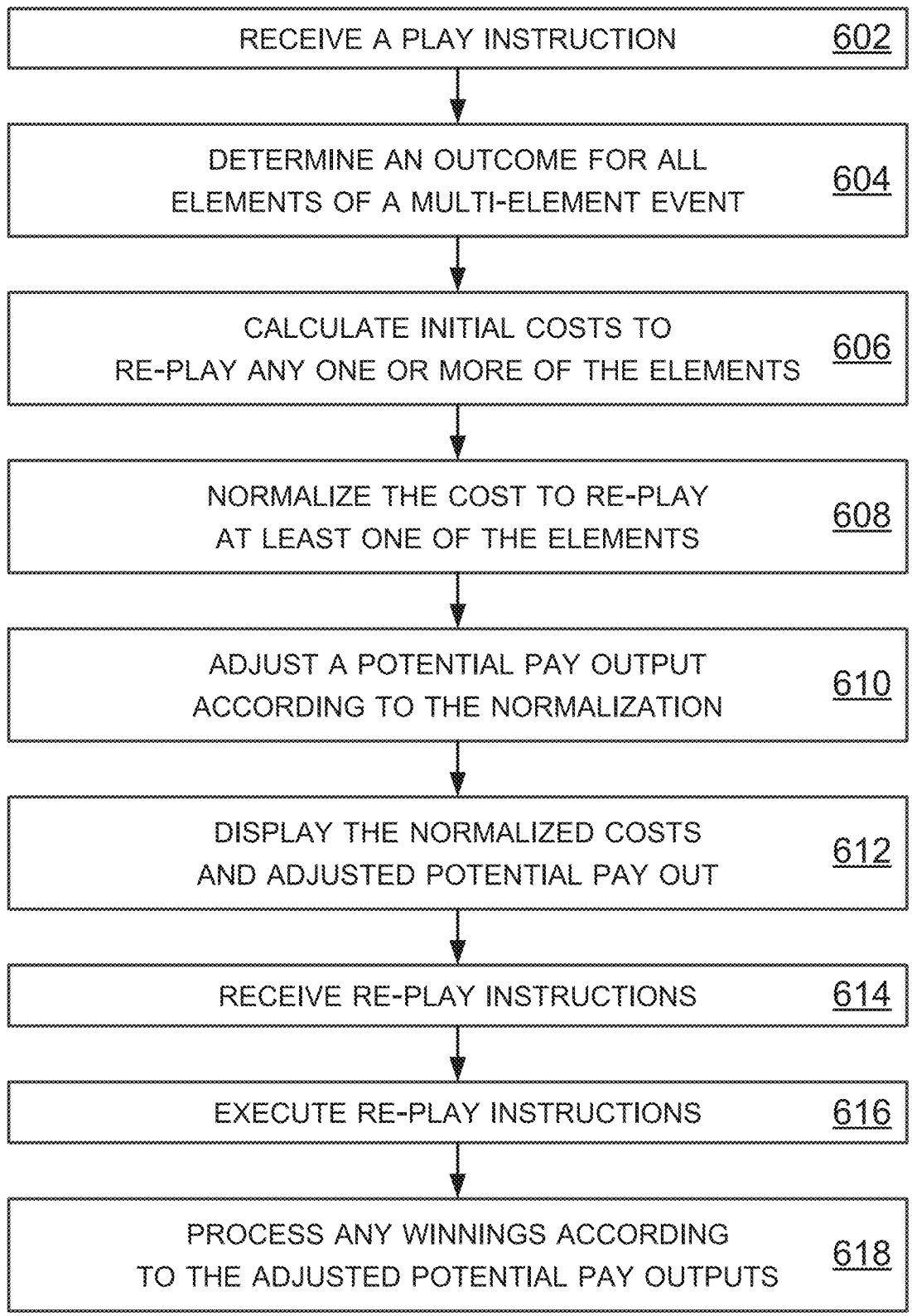
FIG. 25 is a flowchart showing an example method, in accordance with at least some of the example implementations.

Next, FIG. 25 depicts a flowchart showing operations of a method 600. In at least some implementations, the method 600 is carried out using the control device 12, the gaming machine 102, or a different computing device with a display. Additionally, certain aspects of a method 600 could also be carried out by a remote server as well. Furthermore, it is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 25. Where used, program code can be stored on any type of computer-readable medium, for example, such as a storage device including a disk or hard drive and/or the memory device 24.

In addition, each block of the flowchart shown in FIG. 25 may represent circuitry that is wired to perform the specific logical functions in the process. Unless specifically indicated, functions in the flowchart shown in FIG. 25 may be executed out of order from that shown or discussed, including substantially concurrent execution of separately described functions, or even in reverse order in some examples, depending on the functionality involved, so long as the overall functionality of the described method is maintained.

Block 602 includes receiving a play instruction. A processor (e.g., the processor 22, 104) can receive the play instruction. In at least some implementations, the play instruction may be received in response to use of a button, such as the primary spin button 324 shown, for example, in FIG. 13.

Block 604 includes determining an outcome for all elements of a multi-element outcome event. As an example, the processor 22, 104 can determine this outcome.

Block 606 includes calculating the initial cost to re-play at least one of the elements. As an example, the processor 22, 104 can calculate the initial cost.

Block 608 includes normalizing the cost to re-play at least one of the elements. Normalization may be performed according to rules set by the user themselves, or by a provider of the game. As an example, the processor 22, 104 can normalize the cost to re-play at least one of the elements.

Block 610 includes adjusting a potential pay output, possibly as defined in a pay table, according to the normalization applied in block 608. The factor with which the cost of re-playing an element was modified is applied to the potential pay output achievable by re-playing that element. As an example, the processor 22, 104 can adjust the potential pay output.

Block 612 includes displaying the normalized costs and adjusted potential pay outputs. The graphical user interface 18 can display the normalized costs and adjusted potential pay outputs. If any cost were not adjusted, they may also be displayed on a graphical user interface, such as the graphical user interface 18. Displaying the normalized costs, adjusted potential pay outputs, and/or the non-adjusted cost can be instructive to guide a user as to whether to make a selection to cause occurrence of a re-play. In at least some implementations, the processor 22, 104 outputs the normalized costs and adjusted potential pay outputs to the GUI over an HDMI cable or to a network for transmission to a client device including a display to present the GUI.

Block 614 includes receiving re-play instructions. The re-play instructions may relate to a single element (e.g., a single unit or single reel), or to more than one element at a time. Some implementations include re-playing multiple elements at once (i.e., simultaneously). As an example, the processor 22, 104 can receive the re-play instructions over the communication link 28, 32, 44.

Block 616 includes executing the re-play instructions received in block 614. As an example, the processor 22, 104 can execute the re-play instructions. In at least some implementations, the processor 22 executes the instruction code 26 to execute the re-play instructions.

Next, block 618 includes processing any pay outputs received due to the new results of any re-played elements according to the adjusted potential pay outputs. As an example, the processor 22, 104 can process the pay outputs.

In at least some implementations in the form of a method including one or more operations of the method 200, 600, determining re-play costs is performed after displaying the elements on the display of the machine.

In at least some implementations in the form of a method including one or more operations of the method 200, 600, determining the plurality of re-play costs is performed after a randomized element result for each element of the plurality of elements has been determined, but before animation of the determining of the plurality of elements is complete.

In at least some implementations in the form of a method including one or more operations of the method 200, 600, determining the plurality of re-play costs is performed before displaying the first re-play cost.

In at least some implementations in the form of a method including one or more operations of the method 200, 600, determining the plurality of re-play costs includes requesting and receiving the plurality of re-play costs from a server remote from the machine.

In at least some implementations in the form of a method including one or more operations of the method 200, 600, the plurality of re-play combinations represents each possible subset of elements from the plurality of elements.

In at least some implementations in the form of a method including one or more operations of the method 200, 600, the plurality of re-play costs is based on expected outcomes associated with re-playing each of the plurality of re-play combinations.

In at least some implementations, a further method including one or more the operations of the method 200, 600 may also include displaying, on the display of the machine, a re-play cost associated with the selected combination of reels.

In at least some implementations, a further method including the operations of the method 200, 600 may also include, after receiving the input data indicating to include the first element in the selected combination of elements, providing, on the display of the machine, an option to remove the first element from the selected combination of elements.

In at least some implementations in the form of a method including one or more operations of the method 200, 600, the option to include the first element includes a pair of check boxes. A first check box of the pair of check boxes is associated with re-playing the first element. A second check box of the pair of check boxes is associated with holding the first element. Additionally, in some such embodiments, one check box of the pair is always selected, and selection of a check box of the pair removes selection of the other check box of the pair.

In at least some implementations in the form of a method including one or more operations of the method 200, 600, the option to include the first element is one of a plurality of options corresponding to the plurality of elements. In at least some of these implementations, the plurality of options makes up a radio button array.

In at least some implementations, a further method including one or more the operations of the method 200, 600 may also include determining a suggested combination of elements for selection based on the determined plurality of re-play costs, and causing the display of the machine to display an indication of the suggested combination of elements. In at least some of these implementations, the suggested combination of elements can include at least two elements, and an option is provided, on the display of the machine, to simultaneously select each element of the at least two elements. Additionally, an option may be provided on the display to enable automatic selection of the suggested combination of elements.

In at least some implementations in the form of a method including one or more operations of the method 200, 600, the processor 22, 104 or some other computing device may normalize the re-spin costs of all reels such that all re-spin costs are the same.

In at least some implementations in the form of a method including one or more operations of the method 200, 600, the processor 22, 104 or some other computing device may only normalize the cost of a re-spin that is more than a pre-determined value.

In at least some implementations in the form of a method including one or more operations of the method 200, 600, a user is able to set a desired re-spin cost, while other implementations only allow re-spin costs to be set by a game provider or game developer.

IV. Conclusion

Thus, from one perspective, there have now been described methods and devices for a feedback loop system, associated with delivery of content related to a software application, are disclosed. A method includes determining, for the content, a difference between a target output and a performance output. The performance output is an aggregate of respective unit outputs for unit(s) of the content. The method includes determining an input value required to re-perform at least one of the units. The re-performance can modify the difference. The input value, based on a probabilistic calculation of possible outcomes of the re-performance, is normalized based on a pre-determined baseline input value. The method includes determining, based on the normalized input value, an adjusted unit output associated with the re-performance. The method includes generating, based on the respective unit outputs and the adjusted unit output, and providing for display on a GUI, a graphical display layout comprising a visual representation of the unit(s).

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be operable, substituted, combined, separated, and designed in a wide variety of different configurations, all of which are explicitly contemplated herein.

With respect to any or all of the flow charts, scenarios, or message flow diagram in the figures and as discussed herein, each block, operation, determination, step and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be operable to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random-access memory (RAM). The computer-readable media can include non-transitory computer-readable media that stores program code and/or data for longer periods of time, such as secondary or persistent long-term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the example implementations can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the claims that appear after the following enumerated example embodiments.

Implementations of the present disclosure may thus relate to one of the enumerated example embodiments (EEEs) listed below.

EEE 1 is a control device for a feedback loop system associated with delivery of content related to a software application, the control device comprising: a memory device; and a processor in communication with the memory device, wherein the memory device stores instruction code that when executed by the processor causes the control device to perform operations comprising: determining, for the content, a difference between a target output and a performance output, wherein the performance output is an aggregate of respective unit outputs for one or more units of the content; determining an input value required to re-perform at least one of the units, wherein the re-performance modifies the difference, and wherein the input value is based on a probabilistic calculation of possible outcomes of the re-performance; normalizing the input value based on a pre-determined baseline input value; determining, based on the input value as normalized, an adjusted unit output associated with the re-performance; generating, based on the respective unit outputs and the adjusted unit output, a graphical display layout comprising a visual representation of the one or more units; and providing for display, on an interactive graphical user interface, the graphical display layout.

EEE 2 is the control device of EEE 1, wherein the instruction code, when executed by the processor, causes the control device to perform operations comprising: receiving, by way of the interactive graphical user interface, a re-performance instruction indicating the at least one unit for re-performance; responsive to the receiving of the re-performance instruction, providing the at least one unit for re-performance; and responsive to an outcome of the re-performance, updating the performance output based on the adjusted unit output.

EEE 3 is the control device of any one of EEE 1 or 2, wherein the software application controls performance testing of a mechanical device, the one or more units comprise one or more modules of the performance testing, and the performance output is a measurable output for the performance testing.

EEE 4 is the control device of EEE 3, wherein the performance testing of the mechanical device comprises a performance testing of a vehicle on a track.

EEE 5 is the control device of EEE 3, wherein the performance testing of the mechanical device comprises a performance testing of a mechanical robot performing a task.

EEE 6 is the control device of any one of EEE 1-3, wherein the content comprises gaming content, the one or more units comprise one or more plays of the gaming content, and the performance output is an output for the gaming content.

EEE 7 is the control device of any one of EEE 1-3, wherein the software application controls an exercise equipment, the one or more units comprise one or more modules of an exercise workout performed with the exercise equipment, and the target output is a measurable fitness goal for the exercise workout.

EEE 8 is the control device of any one of EEE 1-7, wherein the instruction code, when executed by the processor, causes the control device to perform operations comprising: determining an input value required for one or more combinations of units, wherein each combination comprises, for each unit, an option to re-perform the unit or an option not to re-perform the unit, and wherein providing for display the graphical display layout comprises providing for display the input value required for the one or more combinations of units.

EEE 9 is the control device of EEE 8, wherein the instruction code, when executed by the processor, causes the control device to perform operations comprising: receiving a user indication to re-perform the at least one unit, and wherein the normalizing of the input value comprises normalizing the input value for a combination of the one or more combinations of units, and wherein the combination includes an option to re-perform the at least one unit.

EEE 10 is the control device of EEE 8, wherein the instruction code, when executed by the processor, causes the control device to perform operations comprising: receiving a user indication not to re-perform a unit different from the at least one unit, and wherein normalizing of the input value comprises normalizing the input value for a combination of the one or more combinations of units, and wherein the combination includes an option not to re-perform the unit different from the at least one unit.

EEE 11 is the control device of any one of EEE 1-10, wherein the instruction code, when executed by the processor, causes the control device to perform operations comprising: receiving, by way of the interactive graphical user interface, a sequence of re-performance instructions indicating respective units for re-performance; responsive to receiving of each instruction of the sequence of re-performance instructions, repeatedly providing the respective units for re-performance; and responsive to an outcome of a repeated re-performance of the at least one unit, updating the performance output based on potential adjusted unit outputs for each re-performance.

EEE 12 is the control device of any one of EEE 1-11, wherein the instruction code, when executed by the processor, causes the control device to perform operations comprising: receiving a user preference for the pre-determined baseline input value; and setting the pre-determined baseline input value based on the user preference.

EEE 13 is the control device of any one of EEE 1-12, wherein the input value is maintained below one or more of a credit value, a monetary value, a factor related to the content, a percentage of an account value, and a percentage of a spending limit.

EEE 14 is the control device of any one of EEE 1-13, wherein the determining of the input value comprises: multiplying an initial input value by a probability of a desirable outcome of the re-performance; and dividing an output of the multiplying by the target output.

EEE 15 is the control device of EEE 14, wherein the normalizing of the input value comprises multiplying the input value by a numerical factor that is greater than 0 and less than 1. In some cases, this numerical factor could be greater than 1.

EEE 16 is the control device of EEE 14, wherein the normalizing of the input value comprises dividing the pre-determined baseline input value by the determined input value.

EEE 17 is the control device of any one of EEE 1-16, wherein the instruction code, when executed by the processor, causes the control device to perform operations comprising: training a machine learning model to determine, based on a history of user behavior data, a likelihood that a user will select an option to re-perform the at least one unit, wherein the normalizing of the input value comprises applying the trained machine learning model to predict the input value as normalized, and wherein providing for display the graphical display layout comprises providing for display the predicted input value as normalized.

EEE 18 is the control device of any one of EEE 1-17, wherein the instruction code, when executed by the processor, causes the control device to perform operations comprising: training a machine learning model to determine, based on a history of user behavior data, a likelihood that a user will select a combination of the one or more units, wherein the combination comprises, for each unit, an option to re-perform or an option not to re-perform the unit; and applying the trained machine learning model to predict that the combination has a likelihood of selection that is above a predetermined threshold, wherein providing for display the graphical display layout comprises recommending the predicted combination.

EEE 19 is the control device of any one of EEE 1-18, wherein the instruction code, when executed by the processor, causes the control device to perform operations comprising: training a machine learning model to determine, based on a history of user behavior data, the target output for a user; applying the trained machine learning model to predict the target output; and responsive to an outcome of a re-performance, updating the performance output based on the adjusted unit output, wherein providing for display the graphical display layout comprises providing a difference between the predicted target output and the updated performance output.

EEE 20 is the control device of any of EEEs 17-19, wherein the user behavior data is associated with a plurality of users.

EEE 21 is the control device of any one of EEE 1-20, wherein the graphical display layout comprises a virtual environment simulating performance of the one or more units.

EEE 22 is the control device of any one of EEE 1-3, 6, or 8-21, wherein the content comprises gaming content, and wherein the control device is a multimedia gaming server streaming the gaming content.

EEE 23 is the control device of any one of EEE 1-3 or 8-21, wherein the software application pertains to a reel-based slot game, the target output is based on a return-to-player value, the units are spins of one or more reels, the unit outputs are pay outputs, the performance output is an aggregate of the pay outputs, the input value is an initial cost to re-spin the one or more reels, the probabilistic calculation of possible outcomes is a likelihood of achieving potential pay outputs, and the adjusted unit output is an adjusted pay output.

EEE 24 is the control device of EEE 23, wherein the aggregate of the pay outputs is a sum of the pay outputs.

EEE 25 is the control device of EEE 23, wherein the aggregate of the pay outputs is the weighted average of the pay outputs.

EEE 26 is the control device of any one of EEE 23-25, wherein the baseline input value is a factor greater than 0 and less than 1.

EEE 27 is the control device of any one of EEE 23-25, wherein the baseline input value is a factor greater than or equal to 1.

EEE 28 is the control device of any one of EEE 23-27, wherein the one or more reels include a quantity of symbols that increases or decreases between two consecutive units.

EEE 29 is the control device of any one of EEE 23-28, wherein the graphic display layout includes a matrix of symbols.

EEE 30 is the control device of any one of EEE 23-29, wherein the matrix of symbols includes a three by five matrix of symbols.

EEE 31 is the control device of any one of EEE 29-30, wherein the processor determines pay outputs when a specified quantity of scatter symbols land in any position in the matrix of symbols and on any one or more reels.

EEE 32 is the control device of any one of EEE 23-30, wherein the reel-based slot game includes one or more pay lines the processor uses to determine the unit outputs.

EEE 33 is the control device of any one of EEE 23-30, wherein the reel-based slot game includes no paylines and the processor determines the pay outputs based on certain symbols landing on adjacent reels.

EEE 34 is a computer-implemented method for a feedback loop system associated with delivery of content related to a software application, the method comprising: determining, for the content, a difference between a target output and a performance output, wherein the performance output is an aggregate of respective unit outputs for one or more units of the content; determining an input value required to re-perform at least one of the units, wherein the re-performance can modify the difference, and wherein the input value is based on a probabilistic calculation of possible outcomes of the re-performance; normalizing the input value based on a pre-determined baseline input value; determining, based on the normalizing, an adjusted unit output associated with the re-performance; generating, based on the respective unit outputs and the adjusted unit output, a graphical display layout comprising a visual representation of the one or more units; and providing for display, on an interactive graphical user interface, the graphical display layout.

EEE 35 is the computer-implemented method of EEE 34, wherein the method further comprises: receiving, by way of the interactive graphical user interface, a re-performance instruction indicating the at least one unit for re-performance; responsive to the receiving of the re-performance instruction, providing the at least one unit for re-performance; and responsive to an outcome of the re-performance, updating the performance output based on the adjusted unit output.

EEE 36 is the computer-implemented method of any one of EEE 34 or 35, wherein the software application controls performance testing of a mechanical device, the one or more units comprise one or more modules of the performance testing, and the performance output is a measurable output for the performance testing.

EEE 37 is the computer-implemented method of EEE 36, wherein the performance testing of the mechanical device comprises a performance testing of a vehicle on a track.

EEE 38 is the computer-implemented method of EEE 36, wherein the performance testing of the mechanical device comprises a performance testing of a mechanical robot performing a task.

EEE 39 is the computer-implemented method of any one of EEE 34-36, wherein the content comprises gaming content, the one or more units comprise one or more plays of the gaming content, and the performance output is an output for the gaming content.

EEE 40 is the computer-implemented method of any one of EEE 34-36, wherein the software application controls an exercise equipment, the one or more units comprise one or more modules of an exercise workout performed with the exercise equipment, and the target output is a measurable fitness goal for the exercise workout.

EEE 41 is the computer-implemented method of any one of EEE 34-40, wherein the method further comprises: determining an input value required for one or more combinations of units, wherein each combination comprises, for each unit, an option to re-perform the unit or an option not to re-perform the unit, and wherein providing for display the graphical display layout comprises providing for display the input value required for the one or more combinations of units.

EEE 42 is the computer-implemented method of EEE 41, wherein the method further comprises: receiving a user indication to re-perform the at least one unit, and wherein the normalizing of the input value comprises normalizing the input value for a combination of the one or more combinations of units, and wherein the combination includes an option to re-perform the at least one unit.

EEE 43 is the computer-implemented method of EEE 41, wherein the method further comprises: receiving a user indication not to re-perform a unit different from the at least one unit, and wherein normalizing of the input value comprises normalizing the input value for a combination of the one or more combinations of units, and wherein the combination includes an option not to re-perform the unit different from the at least one unit.

EEE 44 is the computer-implemented method of any one of EEE 34-43, wherein the method further comprises: receiving, by way of the interactive graphical user interface, a sequence of re-performance instructions indicating respective units for re-performance; responsive to receiving of each instruction of the sequence of re-performance instructions, repeatedly providing the respective units for re-performance; and responsive to an outcome of a repeated re-performance of the at least one unit, updating the performance output based on potential adjusted unit outputs for each re-performance.

EEE 45 is the computer-implemented method of any one of EEE 34-44, wherein the method further comprises: receiving a user preference for the pre-determined baseline input value; and setting the pre-determined baseline input value based on the user preference.

EEE 46 is the computer-implemented method of any one of EEE 34-45, wherein the input value is maintained below one or more of a credit value, a monetary value, a factor related to the content, a percentage of an account value, and a percentage of a spending limit.

EEE 47 is the computer-implemented method of any one of EEE 34-46, wherein the determining of the input value comprises: multiplying an initial input value by a probability of a desirable outcome of the re-performance; and dividing an output of the multiplying by the target output.

EEE 48 is the computer-implemented method of EEE 47, wherein the normalizing of the input value comprises multiplying the input value by a numerical factor that is greater than 0 and less than 1. In some cases, this numerical factor could be greater than 1.

EEE 49 is the computer-implemented method of EEE 47, wherein the normalizing of the input value comprises dividing the pre-determined baseline input value by the determined input value.

EEE 50 is the computer-implemented method of any one of EEE 34-49, wherein the method further comprises: training a machine learning model to determine, based on a history of user behavior data, a likelihood that a user will select an option to re-perform the at least one unit, wherein the normalizing of the input value comprises applying the trained machine learning model to predict the input value as normalized, and wherein providing for display the graphical display layout comprises providing for display the predicted input value as normalized.

EEE 51 is the computer-implemented method of any one of EEE 34-50, wherein the method further comprises: training a machine learning model to determine, based on a history of user behavior data, a likelihood that a user will select a combination of the one or more units, wherein the combination comprises, for each unit, an option to re-perform or an option not to re-perform the unit; and applying the trained machine learning model to predict that the combination has a likelihood of selection that is above a predetermined threshold, wherein providing for display the graphical display layout comprises recommending the predicted combination.

EEE 52 is the computer-implemented method of any one of EEE 34-51, wherein the method further comprises: training a machine learning model to determine, based on a history of user behavior data, the target output for a user; applying the trained machine learning model to predict the target output; and responsive to an outcome of a re-performance, updating the performance output based on the adjusted unit output, wherein providing for display the graphical display layout comprises providing a difference between the predicted target output and the updated performance output.

EEE 53 is the computer-implemented method of any of EEEs 50-52, wherein the user behavior data is associated with a plurality of users.

EEE 54 is the computer-implemented method of any one of EEE 34-53, wherein the graphical display layout comprises a virtual environment simulating performance of the one or more units.

EEE 55 is the computer-implemented method of any one of EEE 34-36, 39, or 41-54, wherein the content comprises gaming content, and wherein the control device is a multimedia gaming server streaming the gaming content.

EEE 56 is the computer-implemented method of any one of EEE 34-36 or 41-54, wherein the software application pertains to a reel-based slot game, the target output is based on a return-to-player value, the units are spins of one or more reels, the unit outputs are pay outputs, the performance output is an aggregate of the pay outputs, the input value is an initial cost to re-spin the one or more reels, the probabilistic calculation of possible outcomes is a likelihood of achieving potential pay outputs, and the adjusted unit output is an adjusted pay output.

EEE 57 is the computer-implemented method of EEE 56, wherein the aggregate of the pay outputs is a sum of the payouts.

EEE 58 is the computer-implemented method of EEE 56, wherein the aggregate of the pay outputs is the weighted average of the pay outputs.

EEE 59 is the computer-implemented method of any one of EEE 56-58, wherein the baseline input value is a factor greater than 0 and less than 1.

EEE 60 is the computer-implemented method of any one of EEE 56-58, wherein the baseline input value is a factor greater than or equal to 1.

EEE 61 is the computer-implemented method of any one of EEE 56-60, wherein the one or more reels include a quantity of symbols that increases or decreases between two consecutive units.

EEE 62 is the computer-implemented method of any one of EEE 56-61, wherein the graphic display layout includes a matrix of symbols.

EEE 63 is the computer-implemented method of any one of EEE 56-62, wherein the matrix of symbols includes a three by five matrix of symbols.

EEE 64 is the computer-implemented method of any one of EEE 62-63, wherein the processor determines pay outputs when a specified quantity of scatter symbols land in any position in the matrix of symbols and on any one or more reels.

EEE 65 is the computer-implemented method of any one of EEE 56-63, wherein the reel-based slot game includes one or more pay lines the processor uses to determine the unit outputs.

EEE 66 is the computer-implemented method of any one of EEE 56-63, wherein the reel-based slot game includes no paylines and the processor determines the pay outputs based on certain symbols landing on adjacent reels.

EEE 67 is a computer-readable medium comprising computer-implementable instructions configured to cause a processor of a control device for a feedback loop system associated with delivery of content related to a software application, to perform operations comprising: determining, for the content, a difference between a target output and a performance output, wherein the performance output is an aggregate of respective unit outputs for one or more units of the content; determining an input value required to re-perform at least one of the units, wherein the re-performance can modify the difference, and wherein the input value is based on a probabilistic calculation of possible outcomes of the re-performance; normalizing the input value based on a pre-determined baseline input value; determining, based on the normalizing, an adjusted unit output associated with the re-performance; generating, based on the respective unit outputs and the adjusted unit output, a graphical display layout comprising a visual representation of the one or more units; and providing for display, on an interactive graphical user interface, the graphical display layout.

EEE 68 is a computer-readable medium comprising computer-implementable instructions configured to cause a processor of a control device for a feedback loop system associated with delivery of content related to a software application, to perform operations in accordance with any one of EEE 34-66.

The invention claimed is:

1. A control device for a feedback loop system associated with delivery of gaming content related to a software application, the control device comprising:
 a memory device; and
 a processor in communication with the memory device, wherein the memory device stores instruction code that when executed by the processor causes the control device to perform operations comprising:
  receiving a bet input and initiating an iteration of a game to play one or more units of the gaming content,
  determining, for the gaming content, a difference between a target output and a performance output, wherein the performance output is an aggregate of respective unit outputs for the one or more units of the gaming content;

determining an input value required to re-perform at least one of the units, wherein the re-performance modifies the difference, and wherein the input value is based on a probabilistic calculation of possible outcomes of the re-performance;

normalizing the input value based on a ratio of the bet input and the input value;

determining, based on the input value as normalized, an adjusted unit output associated with the re-performance;

generating, based on the respective unit outputs and the adjusted unit output, a graphical display layout comprising a visual representation of the one or more units; and providing for display, on an interactive graphical user interface, the graphical display layout.

2. The control device of claim 1, wherein the instruction code, when executed by the processor, causes the control device to perform operations comprising:

receiving, by way of the interactive graphical user interface, a re-performance instruction indicating the at least one of the units for re-performance;

responsive to the receiving of the re-performance instruction, providing the at least one of the units for re-performance; and responsive to an outcome of the re-performance, updating the performance output based on the adjusted unit output.

3. The control device of claim 1, wherein the software application controls performance testing of a mechanical device, the one or more units comprise one or more modules of the performance testing, and the performance output is a measurable output for the performance testing.

4. The control device of claim 1, wherein the one or more units comprise one or more plays of the gaming content, and the performance output is an output for the gaming content.

5. The control device of claim 1, wherein the instruction code, when executed by the processor, causes the control device to perform operations comprising:

determining an input value required for one or more combinations of units, wherein each combination comprises, for each unit, an option to re-perform the unit or an option not to re-perform the unit, and wherein providing for display the graphical display layout comprises providing for display the input value required for the one or more combinations of units.

6. The control device of claim 5, wherein the instruction code, when executed by the processor, causes the control device to perform operations comprising:

receiving a user indication to re-perform the at least one of the units, and wherein the normalizing of the input value comprises normalizing the input value for a first combination of the one or more combinations of units, and wherein the first combination includes an option to re-perform the at least one of the units, and/or receiving a user indication not to re-perform a unit different from the at least one of the units, and wherein normalizing of the input value comprises normalizing the input value for a second combination of the one or more combinations of units, and wherein the second combination includes an option not to re-perform the unit different from the at least one of the units.

7. The control device of claim 1, wherein the instruction code, when executed by the processor, causes the control device to perform operations comprising:

receiving, by way of the interactive graphical user interface, a sequence of re-performance instructions indicating respective units for re-performance;

responsive to receiving of each instruction of the sequence of re-performance instructions, repeatedly providing the respective units for re-performance; and responsive to an outcome of a repeated re-performance of the at least one of the units, updating the performance output based on potential adjusted unit outputs for each re-performance.

8. The control device of claim 1, wherein the instruction code, when executed by the processor, causes the control device to perform operations comprising:

receiving a user preference for a pre-determined baseline input value; and adjusting the bet input based on the pre-determined baseline input value, wherein normalizing the input value based on the ratio of the bet input and the input value includes normalizing the input value based on the adjusted bet input and the input value.

9. The control device of claim 1, wherein the input value is maintained below one or more of a credit value, a monetary value, a factor related to the gaming content, a percentage of an account value, or a percentage of a spending limit.

10. The control device of claim 1, wherein the determining of the input value comprises:

multiplying an initial input value by a probability of a desirable outcome of the re-performance; and dividing an output of the multiplying by the target output.

11. The control device of claim 10, wherein normalizing the input value comprises multiplying the input value by the ratio, which is greater than 0 and less than 1, or dividing the ratio by the determined input value.

12. The control device of claim 1, wherein the instruction code, when executed by the processor, causes the control device to perform operations comprising:

training a machine learning model to determine, based on a history of user behavior data, a likelihood that a user will select an option to re-perform the at least one of the units, wherein the normalizing of the input value comprises applying the trained machine learning model to predict the input value as normalized, and wherein providing for display the graphical display layout comprises providing for display the predicted input value as normalized.

13. The control device of claim 1, wherein the instruction code, when executed by the processor, causes the control device to perform operations comprising:

training a machine learning model to determine, based on a history of user behavior data, a likelihood that a user will select a combination of the one or more units, wherein the combination comprises, for each unit, an option to re-perform or an option not to re-perform the unit; and applying the trained machine learning model to predict that the combination has a likelihood of selection that is above a predetermined threshold, wherein providing for display the graphical display layout comprises recommending the predicted combination.

14. The control device of claim 1, wherein the instruction code, when executed by the processor, causes the control device to perform operations comprising:

training a machine learning model to determine, based on a history of user behavior data, the target output for a user;

applying the trained machine learning model to predict the target output; and responsive to an outcome of a re-performance, updating the performance output based on the adjusted unit output, wherein providing for display the graphical display layout comprises providing a difference between the predicted target output and the updated performance output.

15. The control device of claim 14, wherein the user behavior data is associated with a plurality of users.

16. The control device of claim 1, wherein the graphical display layout comprises a virtual environment simulating performance of the one or more units.

17. The control device of claim 1, wherein the control device is a multimedia gaming server streaming the gaming content.

18. The control device according to claim 1, wherein each unit of the one or more units includes a reel having multiple symbols, and wherein the reel is configured to be spun and stopped.

19. The control device according to claim 1, wherein determining the adjusted unit output associated with the re-performance includes adjusting the unit output associated with the re-performance using the ratio of the bet input and the input value.

20. A computer-implemented method for a feedback loop system associated with delivery of gaming content related to a software application, the method comprising:

receiving a bet input and initiating an iteration of a game to play one or more units of the gaming content, determining, for the gaming content, a difference between a target output and a performance output, wherein the performance output is an aggregate of respective unit outputs for the one or more units of the gaming content;

determining an input value required to re-perform at least one of the units, wherein the re-performance can modify the difference, and wherein the input value is based on a probabilistic calculation of possible outcomes of the re-performance;

normalizing the input value based on a ratio of the bet input and the input value;

determining, based on the normalizing, an adjusted unit output associated with the re-performance;

generating, based on the respective unit outputs and the adjusted unit output, a graphical display layout comprising a visual representation of the one or more units; and providing for display, on an interactive graphical user interface, the graphical display layout.

21. A non-transitory computer-readable memory comprising computer-implementable instructions configured to cause a processor of a control device for a feedback loop system associated with delivery of gaming content related to a software application, to perform operations comprising:

receiving a bet input and initiating an iteration of a game to play one or more units of the gaming content, determining, for the gaming content, a difference between a target output and a performance output, wherein the performance output is an aggregate of respective unit outputs for the one or more units of the gaming content;

determining an input value required to re-perform at least one of the units, wherein the re-performance can modify the difference, and wherein the input value is based on a probabilistic calculation of possible outcomes of the re-performance;

normalizing the input value based on a ratio of the bet input and the input value;

determining, based on the normalizing, an adjusted unit output associated with the re-performance;

generating, based on the respective unit outputs and the adjusted unit output, a graphical display layout comprising a visual representation of the one or more units; and providing for display, on an interactive graphical user interface, the graphical display layout.

* * * * *